US012463350B2

(12) United States Patent
Toso et al.

(10) Patent No.: US 12,463,350 B2
(45) Date of Patent: Nov. 4, 2025

(54) TWO-DIMENSIONAL AND THREE-DIMENSIONAL DISCRETE CONSTRAINED LENSES WITH MINIMIZED OPTICAL ABERRATIONS

(71) Applicant: European Space Agency, Paris (FR)

(72) Inventors: Giovanni Toso, Noordwijk (NL); Piero Angeletti, Noordwijk (NL)

(73) Assignee: European Space Agency, Paris (FR)

( * ) Notice: Subject to any disclaimer, the term of this patent is extended or adjusted under 35 U.S.C. 154(b) by 177 days.

(21) Appl. No.: 18/263,521

(22) PCT Filed: Jan. 29, 2021

(86) PCT No.: PCT/EP2021/052202
§ 371 (c)(1),
(2) Date: Jul. 28, 2023

(87) PCT Pub. No.: WO2022/161633
PCT Pub. Date: Aug. 4, 2022

(65) Prior Publication Data
US 2024/0339764 A1 Oct. 10, 2024

(51) Int. Cl.
*H01Q 19/06* (2006.01)
*H01Q 15/06* (2006.01)
*H01Q 25/00* (2006.01)

(52) U.S. Cl.
CPC ........... *H01Q 19/062* (2013.01); *H01Q 15/06* (2013.01); *H01Q 25/00* (2013.01)

(58) Field of Classification Search
CPC ...... H01Q 19/062; H01Q 15/06; H01Q 25/00; H01Q 25/007; H01Q 3/26
See application file for complete search history.

(56) References Cited

U.S. PATENT DOCUMENTS 3,984,840 A * 10/1976 Dell-Imagine ....... H01Q 19/062 343/754
4,825,216 A * 4/1989 DuFort .............. H01Q 21/0031 342/372

(Continued)

OTHER PUBLICATIONS

NPL Hoel "3D printed Rotman lens," 2017 47th European Microwave Conference (EuMC), Nuremberg, Germany, 2017, pp. 125-128. (Year: 2017).*

(Continued)

*Primary Examiner* — Dimary S Lopez Cruz
*Assistant Examiner* — Anna N Hamadyk
(74) *Attorney, Agent, or Firm* — Seed Intellectual Property Law Group LLP

(57) ABSTRACT

A beamforming network includes a three-dimensional discrete lens with front and back apertures, each comprising a plurality of discrete elements. Each discrete element of the back aperture is homologous to a respective discrete element of the front aperture. The discrete lens further comprises a plurality of transmission lines connecting respective pairs of homologous discrete elements. The beamforming network can further include a feed array that illuminates the back aperture when the lens is working in transmission, and/or receives signals from the back aperture, when the lens is working in reception. A ratio of a size of the back aperture and a size of the front aperture defines a zooming factor whose value is different from unity, so that angles of emergence of beams of electromagnetic radiation emitted by the front aperture are either tilted towards or away from a center axis compared to angles of incidence on the back aperture.

3 Claims, 24 Drawing Sheets

(56) References Cited

U.S. PATENT DOCUMENTS

| | | | | | |
|---|---|---|---|---|---|
| 2010/0060521 | A1* | 3/2010 | Hayes | H01Q 25/00 | 343/834 |
| 2010/0207833 | A1* | 8/2010 | Toso | H01Q 25/008 | 343/753 |

OTHER PUBLICATIONS

R. C. Hansen, "Design Trades for Rotman Lenses" (Year: 1991).*

Devore, H.B. et al., "Microwave Optics Between Parallel Conducting Sheets", RCA Review, vol. 9, Dec. 1948, 8 pages.

Rotman, W. et al., "Wide-Angle Microwave Lens for Line Source Applications", IEEE Transactions on Antennas and Propagation, 1963, 10 pages.

Rao, J. B. L. "Bispherical Constrained Lens Antennas", IEEE Transactions on Antennas and Propagation, vol. AP-30, No. 6, Nov. 1982, 5 pages.

Rao, J. B. L. "Multifocal Three-Dimensional Bootlace Lenses", IEEE Transactions on Antennas and Propagation, vol. AP-30, No. 6, Nov. 1982, 7 pages.

Rappaport, C.M. et al., "Optimized Three-Dimensional Lenses for Wide-Angle Scanning", IEEE Transactions on Antennas and Propagation, vol. AP-33, No. 11, Nov. 1985, 10 pages.

McGrath, D.T. "Planar Three-Dimensional Constrained Lenses", IEEE Transactions on Antennas and Propagation, vol. AP-34, No. 1, Jan. 1986, 5 pages.

Sole, G.C. et al., "Multiple beam forming for planar antenna arrays using a three-dimensional Rotman Lens", IEE Proceedings, vol. 134, Pt. H, No. 4, Aug. 1987, 11 pages.

Hansen, R.C. "Design Trades for Rotman Lenses", IEEE Transactions on Antennas and Propagation, vol. 39, No. 4, Apr. 1991, 9 pages.

Rappaport, C.M. et al., "A Five Focal Point Three-Dimensional Bootlace Lens With Scanning in Two Planes", IEEE, 1992, 4 pages.

Dong, J. et al., "Phase-error performance of multi-focal and non-focal two-dimensional Rotman lens designs", IET Microw. Antennas Propag., vol. 4, Iss. 12, 2010 www.ietdl.org, 7 pages.

Kushwah, R.P.S. et al., "Design of 2D-Bootlace Lens with Five Focal Feed for Multiple Beam Forming", J. Electromagnetic Analysis & Applications, 2011, 4 pages.

Fonseca, N. J. et al., "On the Reduction of Phase-Aberrations in Three-Dimensional Rotman Lens Design", IEEE, 2012, 8 pages.

Tekkouk, K. et al., "SIW Rotman Lens Antenna With Ridged Delay Lines and Reduced Footprint", IEEE Transactions on Microwave Theory and Techniques, vol. 66, No. 6, Jun. 2018, 9 pages.

International Search Report for International Application No. PCT/EP2021/052202, dated Dec. 7, 2021, 5 pages.

International Preliminary Report on Patentability and Written Opinion for International Application No. PCT/EP2021/052202, dated Jul. 31, 2023, 29 pages.

* cited by examiner

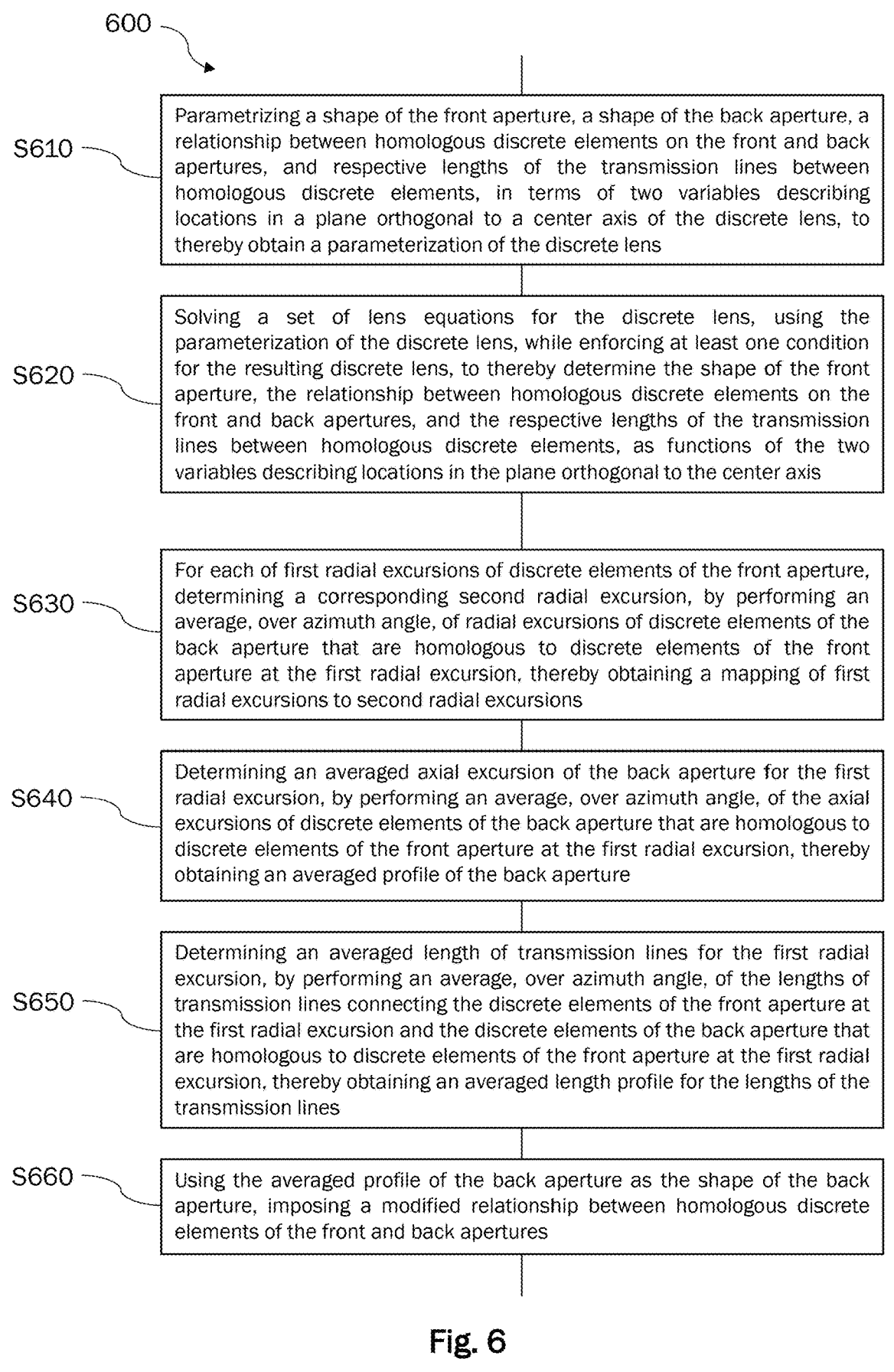

600

S610 — Parametrizing a shape of the front aperture, a shape of the back aperture, a relationship between homologous discrete elements on the front and back apertures, and respective lengths of the transmission lines between homologous discrete elements, in terms of two variables describing locations in a plane orthogonal to a center axis of the discrete lens, to thereby obtain a parameterization of the discrete lens S620 — Solving a set of lens equations for the discrete lens, using the parameterization of the discrete lens, while enforcing at least one condition for the resulting discrete lens, to thereby determine the shape of the front aperture, the relationship between homologous discrete elements on the front and back apertures, and the respective lengths of the transmission lines between homologous discrete elements, as functions of the two variables describing locations in the plane orthogonal to the center axis S630 — For each of first radial excursions of discrete elements of the front aperture, determining a corresponding second radial excursion, by performing an average, over azimuth angle, of radial excursions of discrete elements of the back aperture that are homologous to discrete elements of the front aperture at the first radial excursion, thereby obtaining a mapping of first radial excursions to second radial excursions S640 — Determining an averaged axial excursion of the back aperture for the first radial excursion, by performing an average, over azimuth angle, of the axial excursions of discrete elements of the back aperture that are homologous to discrete elements of the front aperture at the first radial excursion, thereby obtaining an averaged profile of the back aperture S650 — Determining an averaged length of transmission lines for the first radial excursion, by performing an average, over azimuth angle, of the lengths of transmission lines connecting the discrete elements of the front aperture at the first radial excursion and the discrete elements of the back aperture that are homologous to discrete elements of the front aperture at the first radial excursion, thereby obtaining an averaged length profile for the lengths of the transmission lines S660 — Using the averaged profile of the back aperture as the shape of the back aperture, imposing a modified relationship between homologous discrete elements of the front and back apertures

Fig. 6

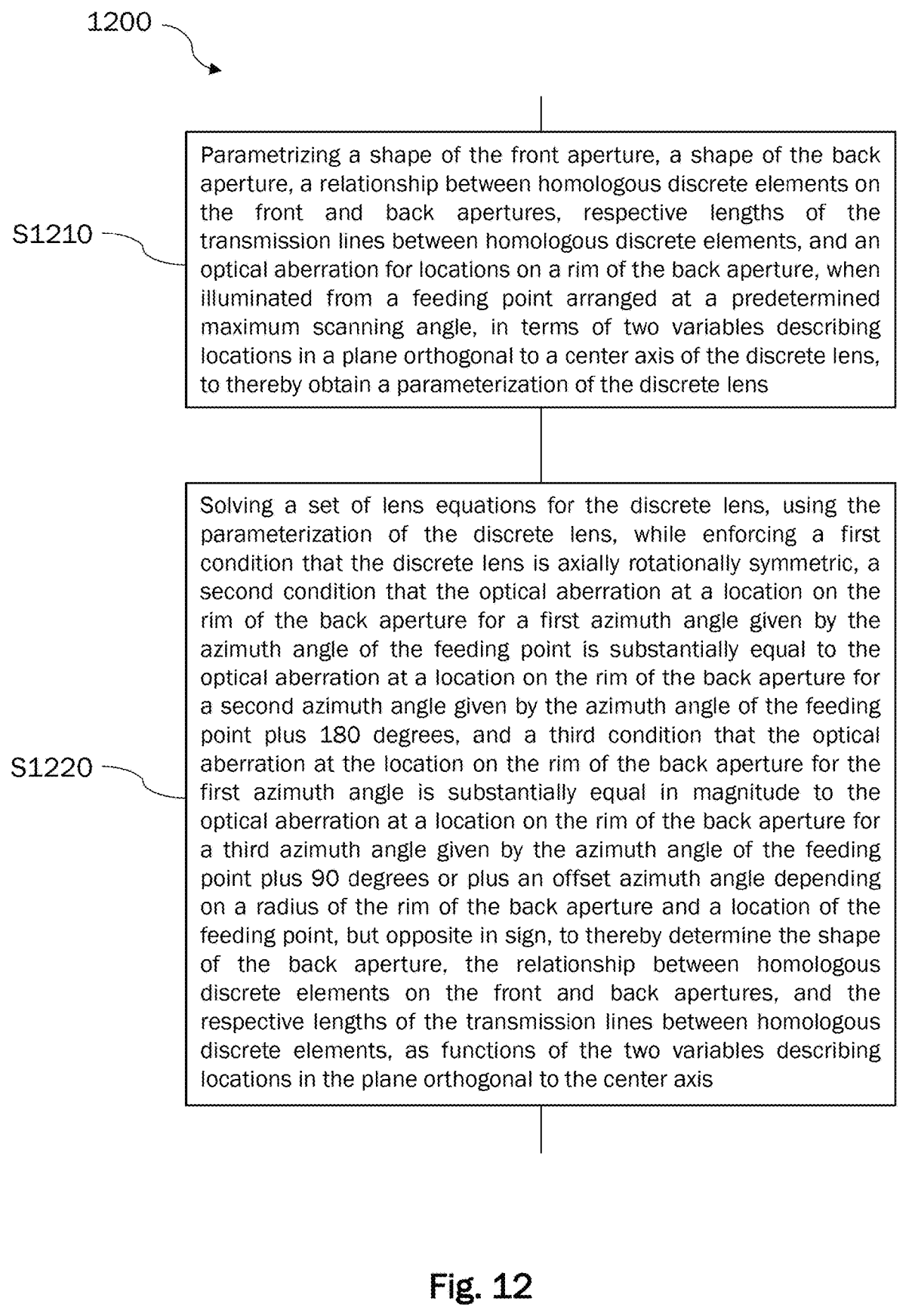

1200

S1210: Parametrizing a shape of the front aperture, a shape of the back aperture, a relationship between homologous discrete elements on the front and back apertures, respective lengths of the transmission lines between homologous discrete elements, and an optical aberration for locations on a rim of the back aperture, when illuminated from a feeding point arranged at a predetermined maximum scanning angle, in terms of two variables describing locations in a plane orthogonal to a center axis of the discrete lens, to thereby obtain a parameterization of the discrete lens S1220: Solving a set of lens equations for the discrete lens, using the parameterization of the discrete lens, while enforcing a first condition that the discrete lens is axially rotationally symmetric, a second condition that the optical aberration at a location on the rim of the back aperture for a first azimuth angle given by the azimuth angle of the feeding point is substantially equal to the optical aberration at a location on the rim of the back aperture for a second azimuth angle given by the azimuth angle of the feeding point plus 180 degrees, and a third condition that the optical aberration at the location on the rim of the back aperture for the first azimuth angle is substantially equal in magnitude to the optical aberration at a location on the rim of the back aperture for a third azimuth angle given by the azimuth angle of the feeding point plus 90 degrees or plus an offset azimuth angle depending on a radius of the rim of the back aperture and a location of the feeding point, but opposite in sign, to thereby determine the shape of the back aperture, the relationship between homologous discrete elements on the front and back apertures, and the respective lengths of the transmission lines between homologous discrete elements, as functions of the two variables describing locations in the plane orthogonal to the center axis

Fig. 12

α=15°

α=30°

α=45°

α=60°

TWO-DIMENSIONAL AND THREE-DIMENSIONAL DISCRETE CONSTRAINED LENSES WITH MINIMIZED OPTICAL ABERRATIONS

BACKGROUND

Technical Field

This application relates to discrete constrained lenses beamforming networks and to procedures for designing such beamforming networks. At this, the application relates to two-dimensional (2D) and three-dimensional (3D) discrete lenses.

Description of the Related Art

Discrete lens beamforming networks (BFNs) and antennas are also known as bootlace lenses, constrained lenses, or discretized array lenses. Two-dimensional (parallel plate configuration) bootlace lenses have been investigated intensively in the literature. The success of the two-dimensional lenses is justified by their design simplicity, their modularity and scalability and several other properties they share with three-dimensional discrete lenses. Two-dimensional constrained lenses can be designed to have more than one focal point. Wide angle scanning capabilities of these lenses in two dimensions is well established, being larger for higher number of focal points.

Three-dimensional lenses have been investigated less. J. B. L. Rao, "Multifocal Three-Dimensional Bootlace Lenses," IEEE Transactions on Antennas and Propagation, Vol. 30, No. 6 Nov. 1982, pp. 1050-1056 has investigated three-dimensional bootlace lenses having two, three, and four perfect focal points located in a plane containing the longitudinal axis of the lens. The results of the aperture phase error analysis showed that a lens with a larger number of focal points can be scanned to much larger angles in one plane at the expense of the scanning capability in the orthogonal plane. J. L. McFarland, J. S. Ajioka, "Multiple-beam constrained lens," Microwaves, vol. 2, no. 8, pp. 81-89, August 1963 have proposed a bispherical lens, composed by two portions of spheres with two identical radii, for three-dimensional scanning. J. B. L. Rao, "Bispherical constrained lens antenna," IEEE Transactions on Antennas and Propagation, Vol. 30, No. 6 Nov. 1982, 1986, pp. 1224-1228 has generalized this bispherical lens to include two spheres with different radii in order to control the accommodation of the lens as compared to its properties. D. T. McGrath, "Planar Three-Dimensional constrained lenses," IEEE Transactions on Antennas and Propagation, Vol. 34, No. 1 Jan. 1986, pp. 46-50 has introduced a simple three-dimensional lens with flat front and back profiles, homologous elements aligned radially and exhibiting two superimposed foci located in the lens axis. [9] G. C. Sole, M. S. Smith "Multiple beam forming for planar antenna arrays using a three-dimensional Rotman lens," IEEE Proceedings, Vol. 134, Pt. H, No. 4, August 1987 have introduced a three-dimensional lens with flat front profile, back profile with the shape of a saddle, and 4 focal points. They have shown that similar performance in terms of optical aberrations as compared to the lens of McGrath can be obtained adopting a more compact lens with curved back profile. C. M. Rappaport, A. Zaghloul, "Optimized Three Dimensional Lenses for Wide-Angle Two Dimensional Scanning," IEEE Transactions on Antennas and Propagation, November 1985, pp. 1227-1236 have studied three-dimensional lenses having two, three, and four focal points located in a plane containing the longitudinal axis of the lens so only able to perform a two-dimensional type of scanning. C. M. Rappaport, J. Mason, "A five focal point three-dimensional bootlace lens with scanning in two planes," IEEE Antennas and Propagation Society International Symposium 1992, Page 1340-1343 vol. 3 have considered a five foci three dimensional discrete lens; however, only a limited numerical investigation has been proposed. It is also important to note that a three-dimensional scanning can be obtained also by cascading two blocks of two-dimensional bootlace lenses. In order to improve the transfer of power within the lens and to control better the amplitude tapering and sidelobe level, radiating elements characterized by different apertures may be exploited. Moreover, three-dimensional constrained lenses have been shown to be operable both in transmission and reception mode.

As noted above, the aforementioned investigations only touch very specific lens configurations. Thus, there is a need for new three-dimension discrete lens configurations with 1, 2, 3, 4, or 5 foci (focal points). There is further need for such discrete lens configurations that are defined explicitly via analytical equations. There is further need for design procedures to derive rotationally symmetric afocal discrete lenses starting from rotationally asymmetric multifocal lenses. There is further need for a design procedure for identifying the focal surface minimizing optical aberrations. There is further need for three-dimensional discrete lenses with minimized optical aberrations. There is yet further need for new types of afocal discrete lenses optimized for large scanning angles. In these conditions the most severe optical aberrations are experienced.

BRIEF SUMMARY

In view of some or all of these needs, the present disclosure proposes beamforming networks, discrete lenses, and methods of designing discrete lenses as described herein.

A first aspect of the disclosure relates to a beamforming network. The beamforming network may be referred to as a discrete lens beamforming network. The beamforming network may include a three-dimensional discrete lens with a front aperture and a back aperture. The discrete lens may have a flat front aperture, for example. Additionally or alternatively, the discrete lens may have a concave back aperture, for example. Each of the front aperture and the back aperture may include a plurality of discrete elements. The front and back apertures may correspond to respective (two-dimensional) arrays of discrete elements. The front and back apertures may thus also be referred to as front and back arrays, respectively. The front aperture may be adapted for emitting electromagnetic waves in a plurality of beams, via its discrete elements. The discrete elements of the front aperture and/or the back aperture may be radiating elements. The beamforming network may further include a propagation part in which electromagnetic radiation can propagate and illuminate the back aperture of the discrete lens. For instance, the beamforming network may include a feed array that illuminates the back aperture when the lens is working in transmission, and/or receives signals from the back aperture when the lens is working in reception. Each discrete element of the back aperture may be homologous to a respective discrete element of the front aperture. In other words, each discrete element of the back aperture may be homologous to a respective single discrete element in the front aperture, and vice versa. That is, there may be a one-to-one relationship between the discrete elements of the front and back apertures. The discrete lens may further include a plurality of transmission lines connecting respective pairs of homologous discrete elements of the front aperture and the back aperture. A ratio of a size of the back aperture and a size of the front aperture may define a zooming factor that determines a relationship between an angle of incidence of electromagnetic radiation incident on the back aperture and an angle of emergence of a beam of electromagnetic radiation emitted by the front aperture in reaction to the electromagnetic radiation incident on the back aperture. The zooming factor may also be referred to as a magnification factor. The value of the zooming factor may be different from unity, so that angles of emergence of beams from the front aperture are either tilted towards a center axis of the discrete lens or tilted away from the center axis, compared to angles of incidence of corresponding beams on the back aperture. Therein, the sizes of the front and back apertures may differ from each other by more than 20% (e.g., in terms of (a linear extension of) the smaller one of the sizes). It is understood that the sizes of the front and back apertures are governed by the same size definition. For example, the size of the front aperture may be an extension (e.g., diameter) of a projection of the front aperture onto a plane orthogonal to the center axis (lens axis), and the size of the back aperture may be an extension (e.g., diameter) of a projection of the back aperture onto the plane orthogonal to the center axis. The extensions (e.g., diameters) of the (projections of the) apertures may mean the extension over which the discrete elements are spread. The angles of incidence and emergence may be defined with respect to the same plane. The relationship between the angle of incidence and the angle of emergence (pointing angle) may be a relationship between sines of these angles. For example, the zooming factor may be substantially equal to a ratio of sines of the angle of emergence and the angle of incidence. In some implementations, a first zooming factor may be defined for a first direction orthogonal to the center axis and a second zooming factor may be defined for a second direction orthogonal to the center axis and different from the first direction, with the first and second zooming factors being different.

Accordingly, the discrete lens design may accommodate to both large scanning angles and to volume/size constraints, depending on circumstances.

In some embodiments, the size of the back aperture may be smaller than the size of the front aperture, so that beams emitted by the front aperture have a reduced field of view compared to a range of angles of incidence of electromagnetic radiation incident on the back aperture. This may correspond to a zooming factor smaller than one, corresponding to a reduced pointing angle. Alternatively, the size of the back aperture may be larger than the size of the front aperture, so that beams emitted by the front aperture have an increased field of view compared to a range of angles of incidence of electromagnetic radiation incident on the back aperture. This may correspond to a zooming factor greater than one, corresponding to an increased pointing angle.

Specific embodiments and implementations of the beamforming network according to the first aspect are described next.

In some embodiments, the front aperture may be shaped as a flat surface. Further, the back aperture may be shaped as a portion of a sphere. Further, the lengths of the plurality of transmission lines may be chosen to be substantially equal. Further, for each pair of homologous discrete elements, a ratio between the radial excursions of the respective homologous discrete elements of the back aperture and the front aperture in the pair may be substantially equal to the zooming factor. Yet further, the discrete lens may have one focal point located in the propagation part on a center of the sphere.

In some embodiments, the front aperture may be shaped as a flat surface. Further, the back aperture may be shaped as a flat surface. Yet further, the discrete lens may have three focal points located in the propagation part off the center axis, in a common plane perpendicular to the center axis, with equal angular distances between their respective azimuth angles, the azimuth angles being defined in the common plane.

In some embodiments, shapes of the back aperture and the front aperture may each be axially rotationally symmetric with respect to the center axis of the discrete lens. Further, the back aperture may be shaped as a portion of a sphere. Further, the front aperture may be shaped as a portion of an ellipsoid (spheroid). Further, the lengths of the plurality of transmission lines may be chosen such that, apart from an optional common length offset, a length of a given transmission line is substantially equal to a distance, along the center axis, between the respective discrete element of the front aperture that the given transmission line connects to, and a discrete element of the front aperture on the center axis. The discrete element of the front aperture on the center axis may be referred to as a central discrete element or center discrete element. Yet further, the discrete lens may have four focal points located in the propagation part, one of them located on the center axis and the remaining three located off the center axis, in a common plane perpendicular to the center axis, with equal angular distances between their respective azimuth angles, the azimuth angles being defined in the common plane.

In some embodiments, a shape of the back aperture may be axially rotationally symmetric with respect to the center axis of the discrete lens. Further, the back aperture may be shaped as a portion of a sphere. Further, the front aperture may be shaped as a portion of a saddle surface with a single saddle point located on the center axis, and may be symmetric with respect to a first plane along the center axis and a second plane along the center axis, the first and second planes being orthogonal to each other. Therein, a plane along the center axis is understood to be a plane including the center axis. Yet further, the discrete lens may have four focal points located in the propagation part, with a first pair of focal points located in the first plane and a second pair of focal points located in the second plane. The first pair of focal points may be symmetric with respect to the center axis. Likewise, the second pair of focal points may be symmetric with respect to the center axis. The discrete lens may be a concave lens, for example.

In some embodiments, the relationship $f \cdot \cos(\alpha) = g \cdot \cos(\delta)$ may hold between focal lengths and inclination angles relative to the center axis for the focal points of the first and second pairs of focal points, where f is the focal length of the first pair of focal points, $\alpha$ is the inclination angle of the first pair of focal points, g is the focal length of the second pair of focal points, and $\delta$ is the inclination angle of the second pair of focal points. Focal lengths and inclination angles may be defined with respect to a location at which (a surface of) the back aperture intersects the center axis. The focal length and inclination angles may be common to respective pairs of focal points. That is, the focal distance f may be a common focal distance of the first pair of focal points. The focal distance g may be a common focal distance of the second pair of focal points. The inclination angle $\alpha$ may be a common inclination angle of the first pair of focal points. The inclination angle δ may be a common inclination angle of the second pair of focal points. In particular, the focal points within a given pair may be symmetric with respect to the center axis.

In some embodiments, for each pair of homologous discrete elements, the respective homologous discrete elements of the front aperture and the back aperture in the pair may have identical azimuth angles, the azimuth angles being defined in a plane orthogonal to the center axis of the discrete lens. Further, the front aperture may be shaped as a flat surface. Further, the back aperture may be shaped as a portion of a saddle surface with a single saddle point located on the center axis, and may be symmetric with respect to a first plane along the center axis and a second plane along the center axis, the first and second planes being orthogonal to each other. Yet further, the discrete lens may have four focal points located in the propagation part, with a first pair of focal points located in the first plane and a second pair of focal points located in the second plane.

In some embodiments, a first focal distance of the first pair of focal points and a second focal distance of the second pair of focal points may be substantially identical. Further, a first inclination angle relative to the center axis of the first pair of focal points may be different from a second inclination angle relative to the center axis of the second pair of focal points. The first focal distance may be a common focal distance of the first pair of focal points. The second focal distance may be a common focal distance of the second pair of focal points. The first inclination angle may be a common inclination angle of the first pair of focal points. The second inclination angle may be a common inclination angle of the second pair of focal points.

In some embodiments, for each pair of homologous discrete elements, the respective homologous discrete elements of the front aperture and the back aperture in the pair may have identical azimuth angles, the azimuth angles being defined in a plane orthogonal to the center axis of the discrete lens. Further, the discrete lens may have four focal points located in the propagation part, with a first pair of focal points located in a first plane along the center axis, and a second pair of focal points located in a second plane along the center axis, the first and second planes being orthogonal to each other. Yet further, the relationship $f\cdot\cos(\alpha)=g\cdot\cos(\delta)=g\cdot\sin(\alpha)$ may hold between focal lengths and inclination angles relative to the center axis for the focal points of the first and second pairs of focal points, where f is the focal length of the first pair of focal points, α is the inclination angle of the first pair of focal points, g is the focal length of the second pair of focal points, and δ is the inclination angle of the second pair of focal points.

In some embodiments, for each pair of homologous discrete elements, the length of the respective transmission line may be given by the three-dimensional distance between the pair of homologous discrete elements, plus an optional common length offset. Further, the discrete lens may have four focal points located in the propagation part, one of them located on the center axis of the discrete lens, and the remaining three located off the center axis, in a common plane perpendicular to the center axis, with equal angular distances between their respective azimuth angles, the azimuth angles being defined in the common plane.

In some embodiments, lengths of the plurality of transmission lines may be substantially identical. Further, the discrete lens may have four focal points located in the propagation part, with a first pair of focal points located in a first plane along the center axis of the discrete lens, and a second pair of focal points located in a second plane along the center axis, the first and second planes being orthogonal to each other.

In some embodiments, for each pair of homologous discrete elements, the respective homologous discrete elements of the front aperture and the back aperture in the pair may have substantial identical radial excursions from the center axis of the discrete lens. Further, the discrete lens may have four focal points located in the propagation part, one of them located on the center axis, and the remaining three located off the center axis, in a common plane perpendicular to the center axis, with equal angular distances between their respective azimuth angles, the azimuth angles being defined in the common plane. Alternatively, the discrete lens may have four focal points located in the propagation part, with a first pair of focal points located in a first plane along the center axis, and a second pair of focal points located in a second plane along the center axis, the first and second planes being orthogonal to each other.

In some embodiments, the discrete lens may have five focal points located in the propagation part in a common plane orthogonal to the center axis of the discrete lens, with one of the focal points located on the center axis, a first pair of focal points located off the center axis, in a first plane along the center axis, and a second pair of focal points located off the center axis, in a second plane along the center axis, the first and second planes being orthogonal to each other. Further, the relationship $f\cdot\cos(\alpha)=g\cdot\cos(\delta)$ may hold between focal lengths and inclination angles relative to the center axis for the focal points of the first and second pairs of focal points, where f is the focal length of the first pair of focal points, α is the inclination angle of the first pair of focal points, g is the focal length of the second pair of focal points, and δ is the inclination angle of the second pair of focal points. The first focal distance may be a common focal distance of the first pair of focal points. The second focal distance may be a common focal distance of the second pair of focal points. The first inclination angle may be a common inclination angle of the first pair of focal points. The second inclination angle may be a common inclination angle of the second pair of focal points. The discrete lens may be a concave lens, for example.

In some embodiments, a sum of the inclination angle α of the first pair of focal points and the inclination angle δ of the second pair of focal points may substantially equal 90 degrees. Additionally or alternatively, a pointing angle $\alpha_1$ corresponding to the first pair of focal points and a pointing angle $\delta_1$ corresponding to the second pair of focal points may each be substantially equal to 45 degrees. Preferably, angles α and δ are (sufficiently) different from each other, such as α=30° and δ=60° (or vice versa), for example.

In some embodiments, the front aperture may be shaped as a flat surface. Further, for each pair of homologous discrete elements, the respective homologous discrete elements of the back aperture and the front aperture in the pair may have substantial identical azimuthal angle. Further, for each pair of homologous discrete elements, a ratio between the radial excursions of the respective homologous discrete elements of the back aperture and the front aperture in the pair may be substantially equal to the zooming factor. Yet further, the discrete lens may have one focal point located in the propagation part on the center axis.

In some embodiments, for a given first density of discrete elements of the front aperture, respective homologous discrete elements of the back aperture may have a higher density compared to the first density in the vicinity of azimuthal angles of the focal points, and have a lower density compared to the first density for azimuthal angles substantially deviating from the azimuthal angles of the focal points. This may apply (only) to those of the aforementioned implementations that are not fully rotationally symmetric. Specifically, this may apply (only) to the discrete lens implementations with three or four focal points located off the center axis. For each of these discrete lens implementations, for a given first density of discrete elements of the front aperture at an azimuth angle of the respective focal point, a second density of discrete elements of the back aperture at the azimuth angle of the respective focal point is higher than the first density. This means, for instance, that for at least discrete elements of the front aperture that have azimuth angles within a margin around the azimuth angles of a respective focal point, corresponding homologous discrete elements of the back aperture have smaller angular distances from the azimuth angle of the respective focal point than the respective homologous discrete elements of the front aperture. On the other hand, for a given third density of discrete elements of the front aperture at an azimuth angle far from the values associated with the focal points, a fourth density of discrete elements of the back aperture at the azimuth angle far the values associated to the focal points may be lower than the third density.

In some embodiments, shapes of the back aperture and the front aperture may each be axially rotationally symmetric with respect to the center axis of the discrete lens. Further, a mapping between homologous discrete elements on the front and back apertures may be axially rotationally symmetric. Further, each discrete element of the back aperture and its respective homologous discrete element of the front aperture may have substantially identical azimuth angles, with the azimuth angles being defined in a plane orthogonal to the center axis. Further, a length profile of the lengths of the transmission lines may be axially rotationally symmetric with respect to the center axis. Yet further, optical aberrations associated with respective locations on the back aperture may be axially rotationally symmetric with respect to the center axis. Thus, the discrete lens may be fully axially rotationally symmetric. This means that all variables defining the discrete lens are axially rotationally symmetric. Accordingly, when considering an arbitrary discrete element of the front array characterized by a profile Z1, a radial dimension rho1, and an azimuth angle phi1, the homologous discrete element of the back array is characterized by the same azimuthal angle phi1 and by a profile Z and a radial dimension rho. The variables Z1, W (length of the transmission lines), Z, and rho change only as a function of rho1 but not as a function of phi1, i.e., they are rotationally symmetric. As such, the axially rotationally symmetric discrete lens may be obtained, for example, by (rotationally) averaging the aforementioned discrete lenses configurations that are not axially rotationally symmetric.

A second aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, the front aperture may be shaped as a flat surface. The back aperture may be shaped as a portion of a sphere. The lengths of the plurality of transmission lines may be chosen to be substantially equal. For each pair of homologous discrete elements, a ratio between the radial excursions of the respective homologous discrete elements of the back aperture and the front aperture in the pair may be substantially equal to a ratio of a size of the back aperture and a size of the front aperture (e.g., zooming factor). Yet further, the discrete lens may have one focal point located in the propagation part on a center of the sphere.

A third aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. For each pair of homologous discrete elements, the respective homologous discrete elements of the back aperture and the front aperture may be co-located. Further, the discrete lens may have a first focal point and a second focal point, located in the propagation part on a common plane along the center axis. When using a Cartesian coordinate system with coordinates (X,Y,Z), where X=0, Y=0 defines the center axis and Y=0 defines the common plane, a location of the first focal point may be given by $X=F \sin\alpha$, $Y=0$, $Z=F \cos\alpha$ and a location of the second focal point may be given by $X=-F \sin\alpha$, $Y=0$, $Z=F \cos\alpha$. Further, a shape of the back aperture may be given by $Z=F \cos\alpha-\sqrt{(F\cos\alpha)^2-(X\cos\alpha)^2-Y^2}$. Yet further, a length W of transmission lines between homologous discrete elements of the back and front apertures at a given value of the Z-coordinate may be given by $W=Z \cos\alpha$ or $W=-Z \cos\alpha$, with the + or − sign applying, respectively, to a configuration working as a reflectarray or transmitarray.

A fourth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, the front aperture may be shaped as a flat surface. The back aperture may be shaped as a flat surface. Yet further, the discrete lens may have three focal points located in the propagation part off the center axis, in a common plane perpendicular to the center axis, with equal angular distances between their respective azimuth angles, the azimuth angles being defined in the common plane.

A fifth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, shapes of the back aperture and the front aperture may each be axially rotationally symmetric with respect to the center axis of the discrete lens. The back aperture may be shaped as a portion of a sphere. The front aperture may be shaped as a portion of an ellipsoid. Further, the lengths of the plurality of transmission lines may be chosen such that, apart from an optional common length offset, a length of a given transmission line is substantially equal to a distance, along the center axis, between the respective discrete element of the front aperture that the given transmission line connects to, and a discrete element of the front aperture on the center axis. Yet further, the discrete lens may have four focal points located in the propagation part, one of them located on the center axis and the remaining three located off the center axis, in a common plane perpendicular to the center axis, with equal angular distances between their respective azimuth angles, the azimuth angles being defined in the common plane.

A sixth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, a shape of the back aperture may be axially rotationally symmetric with respect to the center axis of the discrete lens. The back aperture may be shaped as a portion of a sphere. The front aperture may be shaped as a portion of a saddle surface with a single saddle point located on the center axis, and may be symmetric with respect to a first plane along the center axis and a second plane along the center axis, the first and second planes being orthogonal to each other. Yet further, the discrete lens may have four focal points located in the propagation part, with a first pair of focal points located in the first plane and a second pair of focal points located in the second plane.

In some embodiments, the relationship $f\cdot\cos(\alpha)=g\cdot\cos(\delta)$ may hold between focal lengths and inclination angles relative to the center axis for the focal points of the first and second pairs of focal points, where f is the focal length of the first pair of focal points, $\alpha$ is the inclination angle of the first pair of focal points, g is the focal length of the second pair of focal points, and $\delta$ is the inclination angle of the second pair of focal points.

A seventh aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. For each pair of homologous discrete elements, the respective homologous discrete elements of the front aperture and the back aperture in the pair may have identical azimuth angles, the azimuth angles being defined in a plane orthogonal to the center axis of the discrete lens. Further, the front aperture may be shaped as a flat surface. The back aperture may be shaped as a portion of a saddle surface with a single saddle point located on the center axis, and may be symmetric with respect to a first plane along the center axis and a second plane along the center axis, the first and second planes being orthogonal to each other. Yet further, the discrete lens may have four focal points located in the propagation part, with a first pair of focal points located in the first plane and a second pair of focal points located in the second plane.

In some embodiments, a first focal distance of the first pair of focal points and a second focal distance of the second pair of focal points may be substantially identical. Further, a first inclination angle relative to the center axis of the first pair of focal points may be different from a second inclination angle relative to the center axis of the second pair of focal points.

An eighth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. For each pair of homologous discrete elements, the respective homologous discrete elements of the front aperture and the back aperture in the pair may have identical azimuth angles, the azimuth angles being defined in a plane orthogonal to the center axis of the discrete lens. Further, the discrete lens may have four focal points located in the propagation part, with a first pair of focal points located in a first plane along the center axis, and a second pair of focal points located in a second plane along the center axis, the first and second planes being orthogonal to each other. Yet further, the relationship $f\cdot\cos(\alpha)=g\cdot\cos(\delta)=g\cdot\sin(\alpha)$ may hold between focal lengths and inclination angles relative to the center axis for the focal points of the first and second pairs of focal points, where f is the focal length of the first pair of focal points, $\alpha$ is the inclination angle of the first pair of focal points, g is the focal length of the second pair of focal points, and $\delta$ is the inclination angle of the second pair of focal points.

A ninth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. For each pair of homologous discrete elements, the length of the respective transmission line may be given by the three-dimensional distance between the pair of homologous discrete elements, plus an optional common length offset. Yet further, the discrete lens may have four focal points located in the propagation part, one of them located on the center axis of the discrete lens, and the remaining three located off the center axis, in a common plane perpendicular to the center axis, with equal angular distances between their respective azimuth angles, the azimuth angles being defined in the common plane.

A tenth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, lengths of the plurality of transmission lines may be substantially identical. Yet further, the discrete lens may have four focal points located in the propagation part, with a first pair of focal points located in a first plane along the center axis of the discrete lens, and a second pair of focal points located in a second plane along the center axis, the first and second planes being orthogonal to each other.

An eleventh aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. For each pair of homologous discrete elements, the respective homologous discrete elements of the front aperture and the back aperture in the pair may have substantial identical radial excursions from the center axis of the discrete lens. Yet further, the discrete lens may have four focal points located in the propagation part, one of them located on the center axis, and the remaining three located off the center axis, in a common plane perpendicular to the center axis, with equal angular distances between their respective azimuth angles, the azimuth angles being defined in the common plane. Alternatively, the discrete lens may have four focal points located in the propagation part, with a first pair of focal points located in a first plane along the center axis, and a second pair of focal points located in a second plane along the center axis, the first and second planes being orthogonal to each other.

A twelfth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, the discrete lens may have five focal points located in the propagation part in a common plane orthogonal to the center axis of the discrete lens, with one of the focal points located on the center axis, a first pair of focal points located off the center axis, in a first plane along the center axis, and a second pair of focal points located off the center axis, in a second plane along the center axis, the first and second planes being orthogonal to each other. Yet further, the relationship $f \cdot \cos(\alpha) = g \cdot \cos(\delta)$ may hold between focal lengths and inclination angles relative to the center axis for the focal points of the first and second pairs of focal points, where f is the focal length of the first pair of focal points, $\alpha$ is the inclination angle of the first pair of focal points, g is the focal length of the second pair of focal points, and $\delta$ is the inclination angle of the second pair of focal points.

In some embodiments, a sum of the inclination angle $\alpha$ of the first pair of focal points and the inclination angle $\delta$ of the second pair of focal points substantially may equal 90 degrees. Additionally or alternatively, a pointing angle $\alpha_1$ corresponding to the first pair of focal points and a pointing angle $\delta_1$ corresponding to the second pair of focal points may each be substantially equal to 45 degrees.

A thirteenth aspect of the disclosure relates to another beamforming network. The in beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, the front aperture may be shaped as a flat surface. For each pair of homologous discrete elements, the respective homologous discrete elements of the back aperture and the front aperture in the pair may have substantial identical azimuthal angle. Further, for each pair of homologous discrete elements, a ratio between the radial excursions of the respective homologous discrete elements of the back aperture and the front aperture in the pair may be substantially equal to a ratio of a size of the back aperture and a size of the front aperture (e.g., zooming factor). Yet further, the discrete lens may have one focal point located in the propagation part on the center axis.

In some embodiments, for a given first density of discrete elements of the front aperture, respective homologous discrete elements of the back aperture may have a higher density compared to the first density in the vicinity of azimuthal angles of the focal points, and may have a lower density compared to the first density for azimuthal angles substantially deviating from the azimuthal angles of the focal points.

A fourteenth aspect of the disclosure relates to another beamforming network. The beamforming network may include a three-dimensional discrete lens with a front aperture and a back aperture, each comprising a plurality of discrete elements. The beamforming network may further include a propagation part in which electromagnetic radiation can propagate and illuminate the back aperture of the discrete lens. Therein, each discrete element of the back aperture may be homologous to a respective discrete element of the front aperture. The discrete lens may further include a plurality of transmission lines connecting between respective pairs of homologous discrete elements of the front aperture and the back aperture. Further, shapes of the back aperture and the front aperture may each be axially rotationally symmetric with respect to the center axis of the discrete lens. Further, a mapping between homologous discrete elements on the front and back apertures may be axially rotationally symmetric. Further, each discrete element of the back aperture and its respective homologous discrete element of the front aperture may have substantially identical azimuth angles, with the azimuth angles being defined in a plane orthogonal to the center axis. Further, a length profile of the lengths of the transmission lines may be axially rotationally symmetric with respect to the center axis. Yet further, optical aberrations associated with respective locations on the back aperture may be axially rotationally symmetric with respect to the center axis.

In some embodiments of the aforementioned second to fourteenth aspects, a ratio of a size of the back aperture and a size of the front aperture may define a zooming factor that determines a relationship between an angle of incidence of electromagnetic radiation incident on the back aperture and an angle of emergence of a beam of electromagnetic radiation emitted by the front aperture in reaction to the electromagnetic radiation incident on the back aperture. Therein, the value of the zooming factor may be different from unity, so that angles of emergence of beams from the front aperture are either tilted towards a center axis of the discrete lens or tilted away from the center axis, compared to angles of incidence of corresponding beams on the back aperture.

In some embodiments, the size of the back aperture may be smaller than the size of the front aperture, so that beams emitted by the front aperture have a reduced field of view compared to a range of angles of incidence of electromagnetic radiation incident on the back aperture. Alternatively, the size of the back aperture may be larger than the size of the front aperture, so that beams emitted by the front aperture have an increased field of view compared to a range of angles of incidence of electromagnetic radiation incident on the back aperture.

In some embodiments of any of the aforementioned aspects, the propagation part may include one of a dielectric substrate, a gas-filled space, or a vacuum filled space, for enabling propagation of the electromagnetic radiation illuminating the back aperture of the discrete lens. Additionally or alternatively, the beamforming network may further include a feed array with a plurality of radiating elements for emitting electromagnetic waves illuminating the back aperture of the discrete lens.

In some embodiments of any of the aforementioned aspects, a beam may be generated, using the beamforming network, by adopting a single feed characterized by a fixed position in the focal surface, by adopting more than one feed characterized by a fixed position in the focal surface, possibly combined with a suitable network, by adopting a single feed moving in the focal surface in order to create a re-pointable or steerable beam in the field of view, or by adopting more than one feed moving in the focal surface in order to create one/more re-pointable or steerable beam(s) in the field of view.

In some embodiments of any of the aforementioned aspects, the connections (e.g., transmission lines) between the discrete elements of the front and back apertures may be constituted by coaxial cables, conventional waveguides, or types of radiating structures (e.g., ridged waveguides, dielectrically filled waveguides, below cut-off radiating elements, etc.). Different solutions can bring advantages in terms of frequency bandwidth, polarization properties, increased compactness for the lens beamforming network, etc.

In some embodiments of any of the aforementioned aspects, more than one frequency bandwidth may be adopted when generating a beam using the beamforming network, in order to mitigate the limitations in terms of accommodation. By adopting in the back of the discrete lens a frequency much larger as compared to the operational frequency (even optical frequencies can be considered) a reduction in size of the back aperture can be achieved. The reduction factor is proportional to the ration between the frequency used in the back of the lens as compared to final operational frequency. As an example, for an antenna operating at 10 GHz, adopting a frequency of 1 THz in the back of the discrete lens, a squeezing factor of about 100 can be obtained for the back of the discrete lens and associated optics. This architecture requires of course a frequency conversion with associated cost and limitations.

In some embodiments of any of the aforementioned aspects, the discrete lens may be complemented with an additional analog or digital beamforming network that acts on the focused beams to offer additional flexibility (e.g., beam shaping, nulling fine steering, etc.) at a lower complexity. The discrete lens may then act as a focusing means to make available the beam-space inputs and the complementing analogue or digital beamforming network may act in this transformed space. The analog or digital beamforming network can add the needed flexibility but due to the discrete lens focusing, could be implemented with a reduced number of weights per beam.

In some embodiments of any of the aforementioned aspects, the beamforming network may be optimized to work at the same time in transmission and in reception with advantages in terms of accommodations, especially when the frequency used in transmission is not too far from the frequency adopted in reception (e.g., in the Ku band or in the Q/V band).

A fifteenth aspect of the disclosure relates to a method of designing a three-dimensional discrete lens for a beamforming network. Therein, the discrete lens may have a front aperture and a back aperture, each comprising a plurality of discrete elements. Each discrete element of the back aperture may be homologous to a respective discrete element of the front aperture. The discrete lens may further include a plurality of transmission lines connecting respective pairs of homologous discrete elements of the front aperture and the back aperture. Then, the method may include parametrizing a shape of the front aperture, a shape of the back aperture, a relationship between homologous discrete elements on the front and back apertures, and respective lengths of the transmission lines between homologous discrete elements, in terms of two variables describing locations in a plane orthogonal to a center axis of the discrete lens, to thereby obtain a parameterization of the discrete lens. Obtaining the parameterization may involve parameterizing, in terms of two variables describing a first location in a plane orthogonal to a center axis of the discrete lens, an axial coordinate of a surface of either one of the front aperture and the back aperture, an axial coordinate of a surface of the other one of the front aperture and the back aperture, a second location in the plane orthogonal to the center axis of a surface element of the other one of the front aperture and the back aperture that is homologous to a surface element of the one of the front aperture and the back aperture at the first location, and a length of a transmission line connecting the surface element of the front aperture at the first location to the surface element of the back aperture at the second location. The method may further include solving a set of lens equations for the discrete lens, using the parameterization of the discrete lens, while enforcing at least one condition for the resulting discrete lens, to thereby determine the shape of the front aperture, the relationship between homologous discrete elements on the front and back apertures, and the respective lengths of the transmission lines between homologous discrete elements, as functions of the two variables describing locations in the plane orthogonal to the center axis, wherein the at least one condition relates to at least one of the shape of the front aperture, the shape of the back aperture, a number of focal points of the discrete lens, positions of the focal points, the relationship between homologous discrete elements of the front and back apertures, and the respective lengths of the transmission lines between homologous discrete elements. The method may further include, for each of first radial excursions of discrete elements of the front aperture, determining a corresponding second radial excursion, by performing an average, over azimuth angle, of radial excursions of discrete elements of the back aperture that are homologous to discrete elements of the front aperture at the first radial excursion, thereby obtaining a mapping of first radial excursions to second radial excursions. The method may further include, for each of first radial excursions of discrete elements of the front aperture, determining an averaged axial excursion of the back aperture for the first radial excursion, by performing an average, over azimuth angle, of the axial excursions of discrete elements of the back aperture that are homologous to discrete elements of the front aperture at the first radial excursion, thereby obtaining an averaged profile of the back aperture. The method may further include, for each of first radial excursions of discrete elements of the front aperture, determining an averaged length of transmission lines for the first radial excursion, by performing an average, over azimuth angle, of the lengths of transmission lines connecting the discrete elements of the front aperture at the first radial excursion and the discrete elements of the back aperture that are homologous to discrete elements of the front aperture at the first radial excursion, thereby obtaining an averaged length profile for the lengths of the transmission lines. The method may yet further include using the averaged profile of the back aperture as the shape of the back aperture, imposing a modified relationship between homologous discrete elements of the front and back apertures, according to which a discrete element of the front aperture at a given first radial excursion from the center axis is homologous to a discrete element of the back aperture at the corresponding second radial excursion from the center axis, at the same azimuth angle as the discrete element of the front aperture, with the length of the transmission line connecting these homologous discrete elements being determined in accordance with the averaged length profile. It is understood that the at least one first condition is chosen in accordance with a number of degrees of freedom. The corresponding second radial excursion for a given first radial excursion may be obtainable by the mapping.

A sixteenth aspect of the disclosure relates to another method of designing a three-dimensional discrete lens for a beamforming network. Therein, the discrete lens may have a front aperture and a back aperture, each comprising a plurality of discrete elements. Each discrete element of the back aperture may be homologous to a respective discrete element of the front aperture. The discrete lens may further include a plurality of transmission lines connecting respective pairs of homologous discrete elements of the front aperture and the back aperture. Then, the method may include parametrizing a shape of the front aperture, a shape of the back aperture, a relationship between homologous discrete elements on the front and back apertures, respective lengths of the transmission lines between homologous discrete elements, and an optical aberration for locations on a rim of the back aperture, when illuminated from a feeding point arranged at a predetermined maximum scanning angle, in terms of two variables describing locations in a plane orthogonal to a center axis of the discrete lens, to obtain a parameterization of the discrete lens. The method may further include solving a set of lens equations for the discrete lens, using the parameterization of the discrete lens, while enforcing a first condition that the discrete lens is axially rotationally symmetric, a second condition that the optical aberration at a location on the rim of the back aperture for a first azimuth angle given by the azimuth angle of the feeding point is substantially equal to the optical aberration at a location on the rim of the back aperture for a second azimuth angle given by the azimuth angle of the feeding point plus 180 degrees, and a third condition that the optical aberration at the location on the rim of the back aperture for the first azimuth angle is substantially equal in magnitude to the optical aberration at a location on the rim of the back aperture for a third azimuth angle given by the azimuth angle of the feeding point plus 90 degrees or plus an offset azimuth angle depending on a radius of the rim of the back aperture and a location of the feeding point, but opposite in sign, to thereby determine the shape of the back aperture, the relationship between homologous discrete elements on the front and back apertures, and the respective lengths of the transmission lines between homologous discrete elements, as functions of the two variables describing locations in the plane orthogonal to the center axis. The offset azimuth angle $\hat{\phi}$ may be given by $\cos(\hat{\phi})=\rho/(f\times\sin(\alpha))$, where $\rho$ is the radius of the rim of the back aperture and $f\times\sin(\alpha)$ is the radial excursion of the feeding point from the center axis.

In some embodiments, the method may further include, when solving the set of lens equations for the discrete lens, enforcing a fourth condition that the front aperture is shaped as a flat surface.

In some embodiments, the method may further include, when solving the set of lens equations for the discrete lens, enforcing a fifth condition. The fifth condition may be one of that the back aperture has a predefined shape, or the lengths of the transmission lines between homologous discrete elements have a predefined profile, or for each pair of homologous discrete elements, a ratio between the radial excursions of the respective homologous discrete elements of the back aperture and the front aperture in the pair is substantially equal to a predefined value. For instance, the fifth condition may require that the back aperture is shaped as a portion of a sphere or ellipsoid. Alternatively, the fifth condition may require that the lengths of the transmission lines between homologous discrete elements are substantially equal. Alternatively, the fifth condition may require that for each pair of homologous discrete elements, the ratio between the radial excursions of the respective homologous discrete elements of the back aperture and the front aperture in the pair may be substantially equal to a zooming factor as defined above with respect to embodiments of the beamforming network.

A seventeenth aspect of the disclosure relates to a method of determining a focal arc for a two-dimensional discrete lens. The focal arc may be an optimum focal arc, for example in that it minimizes optical aberration. The discrete lens may be a discrete lens for a beamforming network. The two-dimensional discrete lens may include a front aperture, a back aperture, and a plurality of transmission lines. Each of the front aperture and the back aperture may include a plurality of discrete elements. Each discrete element of the back aperture may be homologous to a respective discrete element of the front aperture. The transmission lines may connect respective pairs of homologous discrete elements of the front aperture and the back aperture. The method may include (A) selecting a configuration of the discrete lens. Therein, the configuration of the discrete lens may define a shape of the front aperture, a shape of the back aperture, a relationship between homologous discrete elements of the front and back apertures, and/or respective lengths of the transmission lines between homologous discrete elements, as functions of a variable relating to a transversal coordinate of the discrete lens. The method may further include (B) for a given feed angle relative to a center axis of the discrete lens, determining, for each point on the back aperture, a feed distance relative to a center of the back aperture that would minimize an optical aberration for said point on the back aperture when the back aperture were illuminated from a feed location given by the feed angle and the feed distance, thereby obtaining a set of feed distances for the given feed angle. The method may further include (C) for the given feed angle, determining, for every feed distance in the set of feed distances for the given feed angle, a maximum optical aberration among optical aberrations for any point on the back aperture, and selecting that feed distance for the given feed angle that results in the smallest maximum optical aberration. The method may further include (D) repeating (B) and (C) for all possible feed angles, thereby obtaining a feed distance map that maps any feed angle to its corresponding feed distance. The possible feed angles may be defined (e.g., bounded) by a maximum scanning angle. The method may yet further include (E) determining the focal arc based on the determined feed distance map. This allows to determine the optimal focal arc for a chosen discrete lens configuration.

An eighteenth aspect of the present disclosure relates to another method of determining a focal arc for a two-dimensional discrete lens. The focal arc may be an optimum focal arc, for example in that it minimizes optical aberration. The discrete lens may be a discrete lens for a beamforming network. The two-dimensional discrete lens may include a front aperture, a back aperture, and a plurality of transmission lines. Each of the front aperture and the back aperture may include a plurality of discrete elements. Each discrete element of the back aperture may be homologous to a respective discrete element of the front aperture. The transmission lines may connect respective pairs of homologous discrete elements of the front aperture and the back aperture. The method may include (A) selecting a configuration of the discrete lens. Therein, the configuration of the discrete lens may define a shape of the front aperture, a shape of the back aperture, a relationship between homologous discrete elements of the front and back apertures, and/or respective lengths of the transmission lines between homologous discrete elements, as functions of a variable relating to a transversal coordinate of the discrete lens, with at least one pair of symmetrical focal points off the center axis. The method may further include (B) for a given feed angle relative to a center axis of the discrete lens, determining a feed distance relative to a center of the back aperture such that optical aberrations for two extremal points on the back aperture would have equal modulus but opposite sign when the back aperture were illuminated from a feed location given by the feed angle and the feed distance, wherein the two extremal points are those points on the back aperture that have the smallest distance and largest distance, respectively, to the feed point. The method may further include (C) repeating (B) for all possible feed angles, thereby obtaining a feed distance map that maps any feed angle to its corresponding feed distance. The possible feed angles may be defined (e.g., bounded) by a maximum scanning angle. The method may yet further include (D) determining the focal arc based on the determined feed distance map.

In some embodiments, the configuration of the discrete lens may define a flat profile for the shape of the front aperture, a spherical profile for the shape of the back aperture, and/or equal lengths of the transmission lines, with a single focal point of the discrete lens on the center axis.

In some embodiments, the configuration of the discrete lens may define a flat profile for the shape of the front aperture, an elliptical profile for the shape of the back aperture, and/or equal lengths of the transmission lines, with a pair of symmetrical focal points off the center axis.

In some embodiments, the method may further include determining the configuration of the discrete lens by averaging between a first intermediate configuration of the discrete lens and a second intermediate configuration of the discrete lens. Therein, the first intermediate configuration of the discrete lens may define a flat profile for the shape of the front aperture, a spherical profile for the shape of the back aperture, and/or equal lengths of the transmission lines, with a single focal point of the discrete lens on the center axis. The second intermediate configuration of the discrete lens may define a flat profile for the shape of the front aperture, an elliptical profile for the shape of the back aperture, and/or equal lengths of the transmission lines, with a pair of symmetrical focal points off the center axis.

In some embodiments, the configuration of the discrete lens and the feed distance map may depend on at least one parameter indicative of a location of a focal point of the discrete lens. Then, the method may further include a step of adjusting the at least one parameter to optimize optical aberration of the discrete lens.

In some embodiments, the configuration of the discrete lens may define a flat profile for the shape of the front aperture, with a first focal point of the discrete lens on the center axis and a pair of symmetrical second focal points off the center axis. Therein, respective focal distances h and f of the first and second focal points, respectively, may satisfy the relation $$f = \frac{h}{\sin(\alpha)} \cdot \left(\alpha - \alpha^{3/6} - \alpha^{5/12}\right),$$

where α is the inclination angle of the second focal points relative to the center axis. Then, the method may further include, after determining the feed distance map, adjusting at least one of the focal distances h and f to minimize optical aberration. Here, adjusting may mean or involve optimizing the at least one of the focal distances, for example iteratively optimizing.

In some embodiments, adjusting the at least one of the focal distances h and f to minimize optical aberration may include, for at least one feed angle relative to the center axis, adjusting the at least one of the focal distances h and f such that a difference between optical aberrations for two extremal points on the back aperture would be smaller than a predefined threshold when the back aperture were illuminated from a feed location given by the at least one feed angle and a corresponding feed distance indicated by the feed distance map. Therein, the two extremal points are those points on the back aperture that have the smallest distance and largest distance, respectively, to the feed point.

In some embodiments, the configuration of the discrete lens may define a flat profile for the shape of the front aperture, with four focal points of the discrete lens, wherein the four focal points have identical focal distance.

In some embodiments, the configuration of the discrete lens may have four focal points off the center axis. Further, the optical aberration for the discrete lens, for the determined focal arc, may follow a Chebyshev-like equi-ripple shape with five quasi-focal points, one of them on the center axis.

In some embodiments, the configuration of the discrete lens may have four focal points arranged in first and second pairs of symmetric focal points. Further, angles $\alpha$ and $\delta$ of the focal points may satisfy the relation sin $$(\delta) \approx \frac{2\alpha}{\pi},$$

where $\alpha$ is the inclination angle of the first pair of focal points relative to the center axis, $\delta$ is the inclination angle of the second pair of focal points relative to the center axis, and $\delta$ is smaller than $\alpha$. Yet further, the optical aberration for the discrete lens, for the determined focal arc, may follow a Chebyshev-like equi-ripple shape with five quasi-focal points, one of them on the center axis.

In some embodiments, the configuration of the discrete lens may have three focal points, one of them on the center axis and the remaining two focal points forming a pair of symmetric focal points. Further, the optical aberration for the discrete lens, for the determined focal arc, may follow a Chebyshev-like equi-ripple shape with five quasi-focal points, one of them on the center axis.

In some embodiments, a ratio of a size of the back aperture and a size of the front aperture may define a zooming factor that determines a relationship between an angle of incidence of electromagnetic radiation incident on the back aperture and an angle of emergence of a beam of electromagnetic radiation emitted by the front aperture in reaction to the electromagnetic radiation incident on the back aperture. Further, the value of the zooming factor may be different from unity, so that angles of emergence of beams from the front aperture are either tilted towards a center axis of the discrete lens or tilted away from the center axis, compared to angles of incidence of corresponding beams on the back aperture.

In some embodiments, the size of the back aperture may be smaller than the size of the front aperture, so that beams emitted by the front aperture have a reduced field of view compared to a range of angles of incidence of electromagnetic radiation incident on the back aperture. Alternatively, the size of the back aperture may be larger than the size of the front aperture, so that beams emitted by the front aperture have an increased field of view compared to a range of angles of incidence of electromagnetic radiation incident on the back aperture.

A nineteenth aspect of the disclosure relates to an apparatus including a processor and a memory coupled to the processor. Therein, the processor may be adapted to perform the steps of any of the aforementioned methods.

A twentieth aspect of the disclosure relates to a computer program comprising instructions that when carried out by a computer cause the computer to perform the steps of any of the aforementioned methods.

A twenty-first aspect of the disclosure relates to a computer-readable recording medium having stored thereon the aforementioned computer program.

It will be appreciated that device features and method steps may be interchanged in many ways. In particular, the details of the disclosed device (e.g., beamforming network or discrete lens) can be realized by a corresponding method of designing the beamforming network or discrete lens, and vice versa, as the skilled person will appreciate. Moreover, any of the above statements made with respect to the devices are understood to likewise apply to the corresponding methods, and vice versa.

BRIEF DESCRIPTION OF THE SEVERAL VIEWS OF THE DRAWINGS

Example embodiments of the disclosure are explained below with reference to the accompanying drawings, wherein:

FIG. 6 is a flowchart schematically illustrating an example method of designing a three-dimensional discrete lens;

FIG. 12 is a flowchart schematically illustrating another example method of designing a three-dimensional discrete lens;

DETAILED DESCRIPTION

In the following, example embodiments of the disclosure will be described with reference to the appended figures. Identical elements in the figures may be indicated by identical reference numbers, and repeated description thereof may be omitted.

Three-Dimensional Discrete Lenses and Multifocal Architectures

First, embodiments and implementations of the present disclosure relating to three-dimensional discrete lenses will be discussed.

Broadly speaking, the present disclosure proposes several three-dimensional discrete lenses characterized by one, two, three, four, or five foci and defined explicitly via analytical equations. Moreover, a procedure to derive rotationally symmetric afocal lenses starting from rotationally asymmetric multifocal lenses is proposed. The proposed three-dimensional discrete lens antennas may be characterized by an extended field of view. Also, a method to identify a focal surface minimizing the optical aberrations is reported. The lenses are compared in terms of optical aberrations and accommodation constraints. The most suitable lens architecture depends mainly on the extension of the angular field of view and a magnification factor. The results, derived exploiting a Geometrical Optics (GO) formulation, provide useful indications for the preliminarily design of constrained lens antennas before adopting full wave rigorous techniques.

The present disclosure further proposes design procedures for rotationally symmetric discrete lenses that enforce minimized optical aberrations for the largest scanning directions. It is shown that for medium and large scanning angles the new configurations give significant improvements (15% to 20%) in terms of maximum aberrations and, at the same time, similar or slightly improved accommodation constraints.

Further, it will be shown that results can be further improved for lens antennas characterized by focal feeding arrays with a diameter exceeding the back lens diameter. When this condition applies, two significant improvements can be obtained: a reduction in the optical aberrations, and a reduction of the optimized focal distances with an improvement in terms of accommodation.

Overview and General Properties

Figure 1:
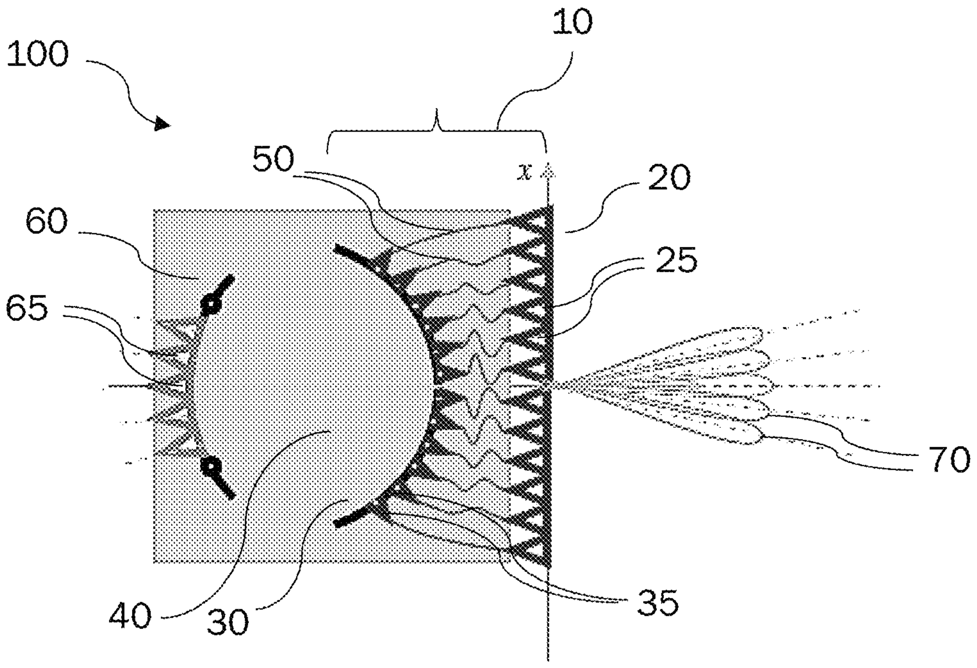
FIG. 1 schematically illustrates an example of a discrete lens architecture.

FIG. 1 schematically shows the architecture of a beamforming network (e.g., discrete lens beamforming network) 100 comprising a discrete lens 10. It generally comprises two parts, viz. a first part, where the fields are propagating in free-space (for two-dimensional configurations an oversized parallel plate waveguide may be adopted for this free propagation) and a second part, where two arrays 20, 30 of discrete elements 25, 35 are connected with transmission lines 50. In other words, the beamforming network 100 comprises a three-dimensional discrete lens 10 (corresponding to the second part) and a propagation part 40 (corresponding to the first part) in which electromagnetic radiation can propagate. The discrete lens 10 comprises a front aperture 20 and a back aperture 30. The discrete lens 10 and the propagation part 40 are arranged such that electromagnetic radiation that propagates through the propagation part 40 can illuminate the back aperture 30 of the discrete lens 10. For enabling propagation of the electromagnetic radiation illuminating the back aperture 30 of the discrete lens 10, the propagation part 40 can comprise one of a dielectric substrate, a gas-filled space, or a vacuum filled space.

The front aperture 20 may be adapted for emitting electromagnetic waves in a plurality of beams 70, via its discrete elements 25. The discrete elements 25, 35 of the front aperture 20 and/or the back aperture 30 may be radiating elements. The front and back apertures 20, 30 may correspond to respective arrays of discrete elements (e.g., two-dimensional arrays for three-dimensional discrete lenses). The front and back apertures 20, 30 may thus also be referred to as front and back arrays, respectively. In some example implementations detailed below, front aperture 20 may be flat. In other example implementations, the back aperture 30 may be concave.

Each of the front aperture 20 and the back aperture 30 comprises a plurality of discrete elements 25, 35. Each discrete element 35 of the back aperture 30 is homologous to a respective discrete element 25 of the front aperture 20 (and vice versa). That is, there is a one-to-one relationship between the discrete elements 25, 35 of the front and back apertures 20, 30.

The discrete lens 10 further comprises a plurality of transmission lines 50 connecting respective pairs of homologous discrete elements 25, 35 of the front aperture 20 and the back aperture 30. The transmission lines 50 may be constituted by or comprise any one of coaxial cables, conventional waveguides, and types of radiating structures (e.g., ridged waveguides, dielectrically filled waveguides, below cut-off radiating elements, etc.). It is understood that different implementations of the transmission lines 50 can bring advantages in terms of frequency bandwidth, polarization properties, increased compactness for the discrete lens beamforming network 100.

The beamforming network 100 may further comprise a feed array 60 with a plurality of radiating elements 65 for emitting electromagnetic waves that propagate through the propagation part 40 and illuminate the back aperture 30 of the discrete lens 10 (when the lens is working in transmission), and/or for receiving signals from the back aperture 30 (when the lens is working in reception). The feed array 60 may be spatially separated from the back array 30 through the propagation part 40. In general, the beamforming network 100 may be used for generating one or more beam(s) in a field of view of the beamforming network by any one of adopting a single feed characterized by a fixed position in a focal surface, adopting more than one feed characterized by respective fixed positions in the focal surface, possibly combined with a suitable network, adopting a single feed moving in the focal surface in order to create a re-pointable or steerable beam in the field of view, or adopting more than one feed moving in the focal surface in order to create one or more re-pointable or steerable beams in the field of view.

Figure 2:
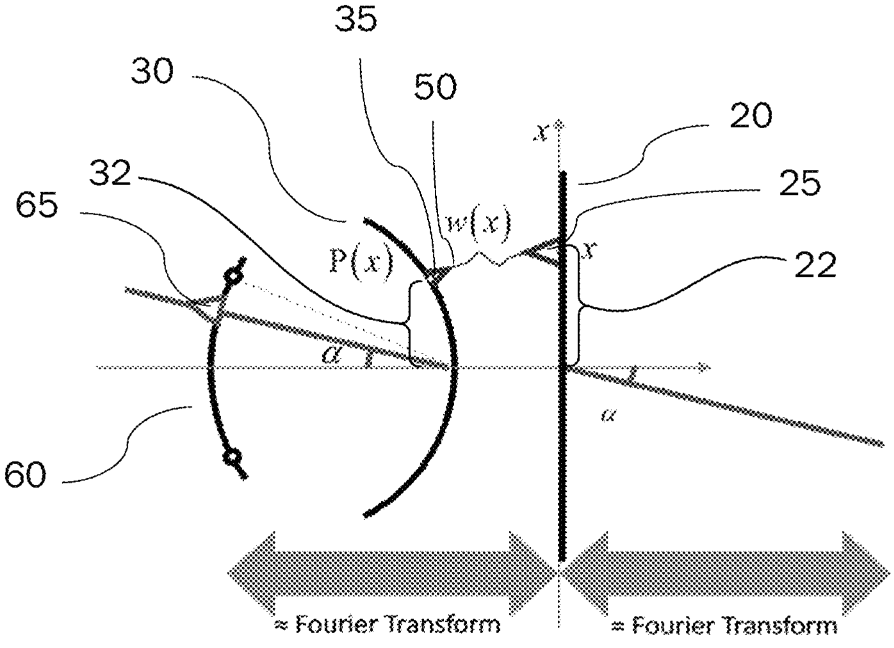
FIG. 2 schematically illustrates an example of a relation between excitations and far field radiation for a discrete lens.

The discrete lens (or discrete lens beamforming network) described can be adopted in multibeam antennas systems based on a Single Feed Per Beam (SFPB) concept. Therein, by exciting one feed in the focal array, one corresponding beam is generated in the far field. The relation between the excitations and the far field is approximately equal to a double Fourier transform, as is illustrated in FIG. 2.

Although the present disclosure may frequently refer to beamforming networks, discrete lens beamforming networks, discrete lens antennas, or the like, it is understood that the present disclosure likewise relates to discrete lenses as such (both two-dimensional and three-dimensional), and that any statements made with regard to beamforming networks or antennas likewise refer to discrete lenses (and vice versa).

Discrete lenses exhibit some remarkable and unique properties, including almost free-space beamforming, true-time delay behavior, which is particularly useful in the design of multibeam antennas characterized by large frequency bandwidth, excellent angular scanning capabilities and limited scan losses because of the onset architecture and multi-focal properties, compatibility with a high number of input and output ports, which makes discrete lenses particularly useful for multibeam antennas characterized by a high number of beams and high number of radiating elements (e.g., numbers of beams larger than 1000 can be realized by adopting discrete lenses), complexity slowly growing with the number of elements and number of beams, operability in dual polarization (typically valid for three-dimensional discrete lenses but not for two-dimensional discrete lenses), and the possibility (e.g., when augmented with active elements) to generate a continuous spot beam coverage adopting only one main aperture instead of the three or four usually adopted in passive Single Feed Per Beam (SFPB) antenna configurations based on conventional reflectors or passive lenses.

On the other hand, discrete lenses may also have a number of limitations, possibly including high volume and weight with associated difficulty in terms of accommodation, complexity in implementing a cooling system, and difficulty in feeding the active elements (in the case of active discrete lenses). Limitations associated to the volume and weight can be mitigated when increasing the operational frequency.

Some additional properties of discrete lenses are the following:

- Novel types of radiating elements, waveguides (e.g., ridged waveguides, dielectrically filled waveguides, below cut-off radiating elements) can be used in order to increase the bandwidth, obtaining equalized performance in two polarizations, increase the compactness of the solutions, etc.
- As special condition, the phase shifts applied by the transmission lines can be proportional to the distances between homologous points. This case is important because the lines connecting homologous points, when this condition is valid, can be straight lines.
- The resulting antenna architecture is capable of generating a large number of beams in fixed spatial directions. The beamforming/antenna architecture can be complemented with a switching network with a number of input ports lower than the overall number of possible beams and a number of output ports equal to the number of input ports of the lens (e.g., equal to the number of beams). The switching network can be used to instantaneously activate a reduced number of beams while maintaining the flexibility of a large number of addressable beams.
- Another feature concerns antennas generating a single beam re-pointable (steerable) in a large field of view. In this case the lens-based beamforming network is simpler as compared to conventional ones even if it might require a larger volume.
- Discrete lens beamforming networks and antennas are mainly considered for active antenna systems. However, they may find application also in passive antenna systems. In this case several advantages remain valid (e.g., large scanning domain, large number of beams, large frequency bandwidth, large number of radiating elements, etc.). When considered for passive antenna systems, a significant simplification can be obtained, since this type of antenna systems does not require the presence of a distributed amplification neither a cooling system. However, in case multi-spot beams coverage is required, the typical limitations of passive antenna systems based on the Single Feed Per Beam (SFPB) architecture (e.g., on the cross-over level and spillover losses) remain present. Considering the significant simplification in terms of cost and complexity, even passive antenna systems based on discrete lenses have reasonable applicability.
- More than one frequency bandwidth can be exploited in order to mitigate the limitations in terms of accommodation. By adopting a frequency in the back of the lens much larger than the operational frequency, a reduction in size of the back lens (back aperture) can be achieved. Even optical frequencies can be considered for this purpose. The reduction factor is proportional to the ratio between the frequency used in the back of the lens compared to the final operational frequency. As an example, for an antenna operating at 10 GHz, adopting in the back a frequency of 1 THz will allow to obtain a squeezing factor of about 100 for the back of the lens and associated optics. This architecture may require frequency conversion with associated cost and limitations.
- Discrete lenses can be complemented with an additional analog or digital beamforming network that acts on the focused beams to offer additional flexibility (e.g. beam shaping, nulling fine steering, etc.) at lower complexity. This concept is known as beam-space beamforming; the discrete lens acts as a focusing mean to make available the beam-space inputs and the complementing analog or digital beamforming network acts in this transformed space. The analog or digital beamforming network add the needed flexibility. Due to the discrete lens focusing, this configuration needs a reduced number of weights per beam.
- If the frequency used in transmission is not too far from the frequency adopted in reception (e.g., in the Ku band or in the Q/V band) discrete lens antenna systems can be optimized to work at the same time in transmission and in reception with advantages in terms of accommodation.

Degrees of Freedom, Number of Foci, Architecture Definition

Figure 3A:
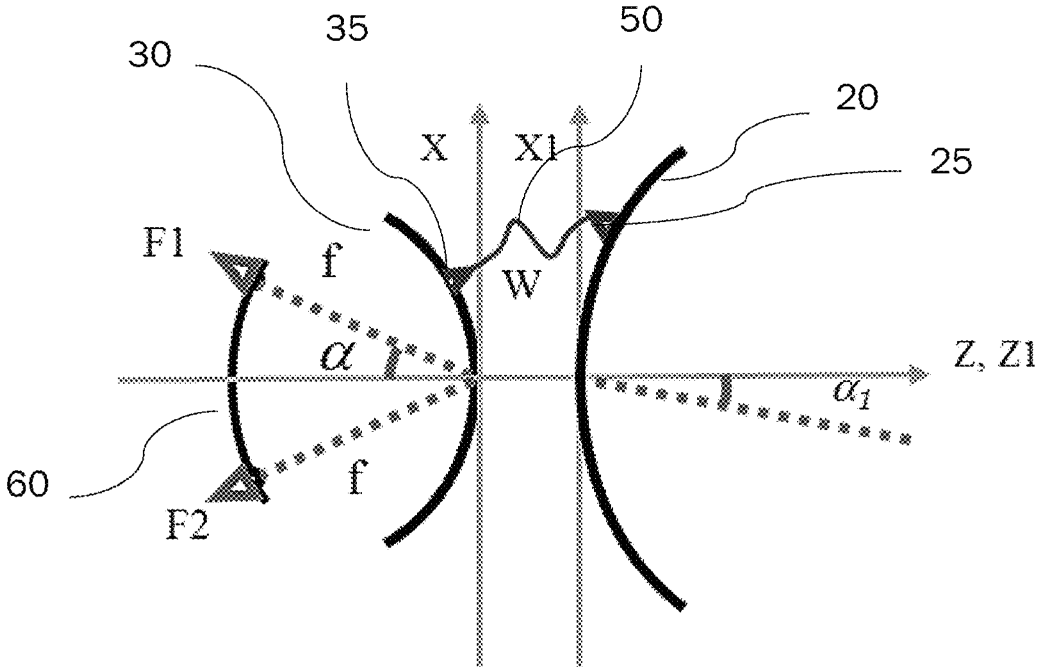
FIG. 3A and FIG. 3B schematically illustrate the variables used to define the three-dimensional discrete lens architecture.
Figure 3B:
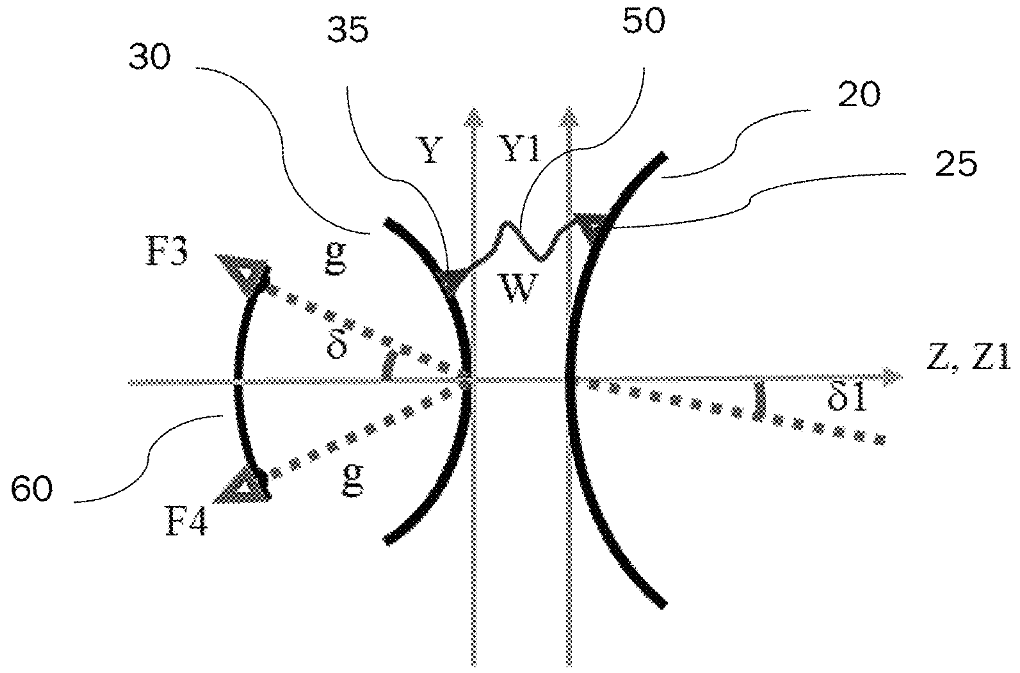

To define a three-dimensional discrete lens the following seven variables are needed, as illustrated in FIG. 3A (illustrating the XZ plane) and FIG. 3B (illustrating the YZ plane). Variables X, Y, Z are used to define the back aperture (back profile, back lens). Variable W defines the lengths of the transmission lines. Variables X1, Y1, Z1 define the front aperture (front profile, front lens). Choosing two variables as independent variables (usually X1 and Y1 are chosen), 7−2=5 degrees of freedom remain. In fact, three-dimensional discrete lenses may exhibit up to 5 foci. Adopting the same reasoning, a two-dimensional lens exhibits 5−1=4 degrees of freedom, so that a maximum number of foci is equal to 4 (although an exception exists: the R-2R two-dimensional lens exhibits an infinite number of foci).

As noted above, the back of the lens is defined using the Cartesian coordinates X, Y, Z, the front of the lens is defined using the Cartesian coordinated X1, Y1, Z1, and the transmission lines lengths ae defined using the variable W. For instance, the shape of the front aperture may be defined by Z1 as a function of X1 and Y1. The shape of the back aperture may be defined by Z as a function of X1 and Y1. Relationships between homologous discrete elements of the front and back apertures may be defined by a mapping (X1,Y1)→(X,Y), or alternatively mappings (X1,Y1)→X and (X1,Y1)→Y. The length of a transmission line connecting a discrete element of the front aperture at position (X1,Y1, Z1) to its homologous discrete element of the back aperture (at position (X(X1,Y1),Y(X1,Y1),Z(X1,Y1))) may be given by W(X1,Y1).

The foci focal points are denoted by letters F1, F2, etc. Their focal distance of foci in the XZ plane is denoted by f (or alternatively, F), and the focal distance of foci in the YZ plane is denoted with the letter g (or alternatively, G). The angles defining the positions of the foci in the XZ plane is denoted by α and the angles defining the positions of the foci in the YZ plane is denoted by δ. The homologous angles defining the pointing direction of the lens are identified by α1 (in the XZ plane) and by δ1 (in the YZ plane). When considering architectures characterized by 3 foci with an angular separation of 120°, the common focal length will be denoted by f and the common aperture angle by a.

Magnification or Zooming Capability

An additional degree of freedom is available for two-dimensional bootlace lenses by designing for an off-axis beam to emerge from the array at an angle greater than or less than the angle from the on-axis focus to the driven beam port. This parameter is named the expansion (or compression) factor and can be considered also as a zooming or magnification factor. The present disclosure introduces a zooming or magnification actor for three-dimensional discrete lenses.

Figure 4:
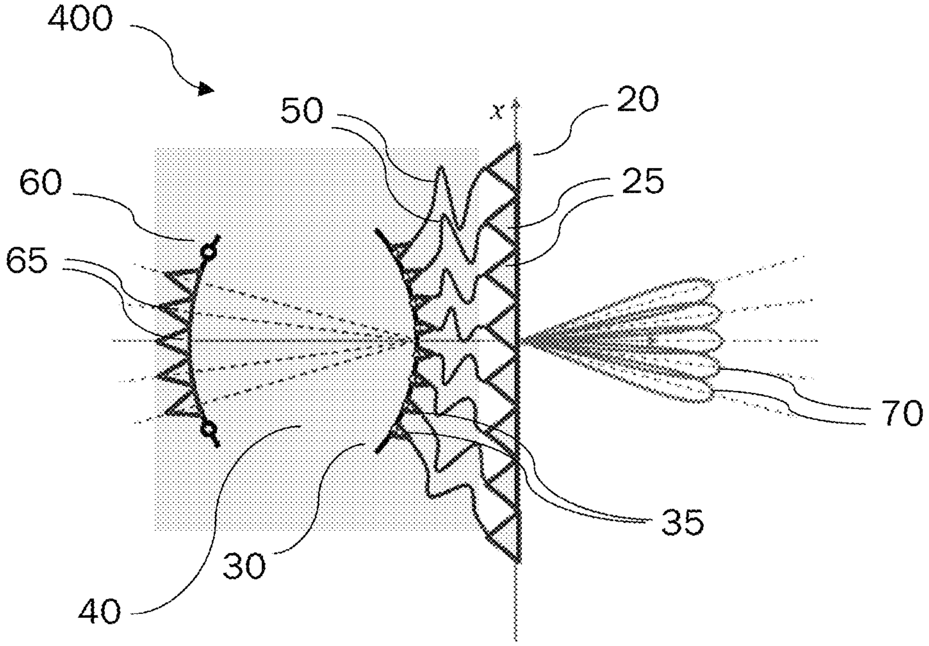
FIG. 4 schematically illustrates a discrete lens beamforming network with a zooming factor smaller than one.

The magnification or zooming capability is directly related to the possibility of dimensioning the back of the discrete lens independently from the front aperture, associated with a significant increase in flexibility for antenna design. A first possible architecture which may benefit from this controllable zooming may be an onboard multibeam satellite antenna based on discrete lenses designed with the back lens aperture smaller than the front lens in order to obtain a more compact solution with easier implementation. Denoting the zooming factor by M, this would yield a reduction of a factor M in linear dimensions and a reduction by a factor $M^3$ in terms of volume. An example of a discrete lens 400 (or discrete lens beamforming network) with a back array smaller than the front array is schematically illustrated in FIG. 4. It exhibits a significant saving in terms of volume and a reduced field of view as compared to the back lens.

Figure 5:
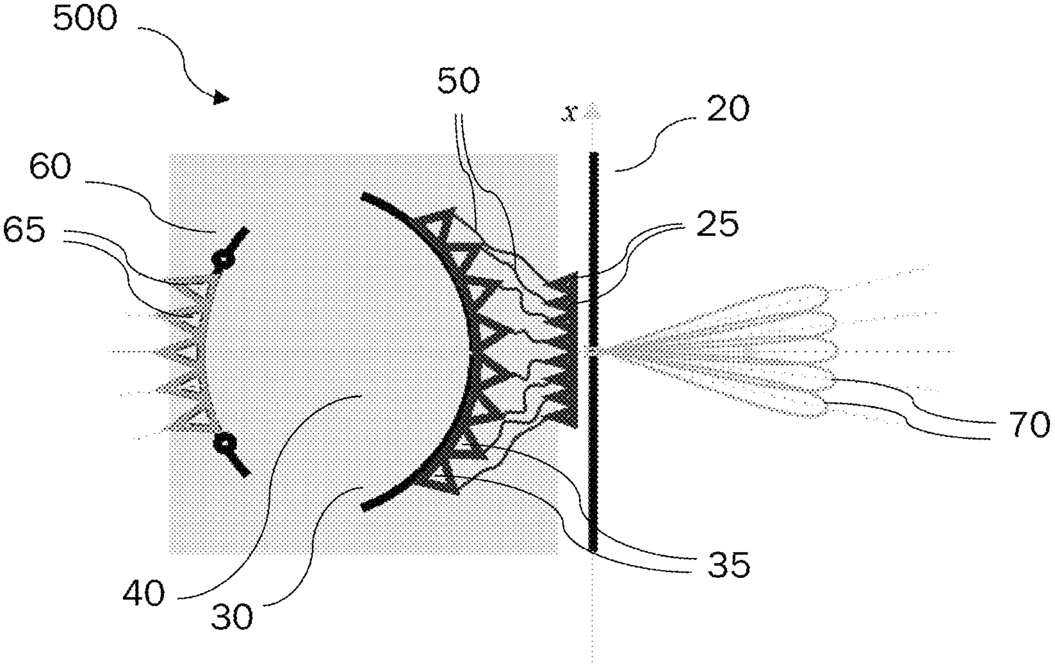
FIG. 5 schematically illustrates a discrete lens beamforming network with a zooming factor greater than one.

A second architecture exploiting the opposite type of zooming can be an antenna based on discrete lenses designed with the back array larger than the front array, in order to obtain an enlarged field of view with a reduced scanning on the back of the discrete lens. An example of such discrete lens 500 (or discrete lens beamforming network) is schematically illustrated in FIG. 5. It exhibits an increased field of view but a larger volume. The penalty associated with the larger dimensions of the back lens can be acceptable for a ground professional or gateway antenna, especially when considering the magnified field of view achievable by this solution. However, this second type of zooming can be useful also for beamforming networks and antennas to be installed onboard a satellite. As an example, on board satellites flying on MEO or LEO orbits, a single (or a limited number of) active antennas start to replace several passive antennas based on reflectors. As a consequence, the aperture available for installing the antenna can be significantly larger as compared to the minimum physical antenna aperture, thereby allowing the installation of a lens antenna with a back aperture larger than the radiating aperture.

Here and in the following, the magnification or zooming factor is indicated with letter M and can be defined as follows:

$$\sin(\alpha 1) = \sin(\alpha)M,\quad \cos(\alpha 1) = \left(1 - (\sin(\alpha)M)^2\right)^{\frac{1}{2}} \qquad \text{Eq. (1)}$$

$$\sin(\delta 1) = \sin(\delta)M,\quad \cos(\delta 1) = \left(1 - (\sin(\delta)M)^2\right)^{\frac{1}{2}} \qquad \text{Eq. (2)}$$

In addition, in order to simplify the analytical equations, the following abbreviations will be used throughout the present disclosure:

$$sa = \sin(\alpha),\quad ca = \cos(\alpha), \qquad \text{Eq. (3)}$$

$$sd = \sin(\delta),\quad cd = \cos(\delta), \qquad \text{Eq. (4)}$$

$$sa1 = \sin(\alpha 1),\quad ca1 = \cos(\alpha 1), \qquad \text{Eq. (5)}$$

$$sd1 = \sin(\delta 1),\quad cd1 = \cos(\delta 1). \qquad \text{Eq. (6)}$$

In accordance with the above, in three-dimensional discrete lenses (or three-dimensional discrete lens beamforming networks) according to embodiments of the disclosure (e.g., as defined above in conjunction with FIG. 1), a ratio of a size of the back aperture and a size of the front aperture may defines a zooming factor (M) that determines a relationship between an angle of incidence of electromagnetic radiation incident on the back aperture and an angle of emergence of a beam of electromagnetic radiation emitted by the front aperture in reaction to the electromagnetic radiation incident on the back aperture. In this configuration, the value of the zooming factor may be different from unity, so that angles of emergence of beams from the front aperture are either tilted towards a center axis of the discrete lens or tilted away from the center axis, compared to angles of incidence of corresponding beams on the back aperture. Such a discrete lens may be referred to as a zoomed discrete lens or discrete lens with zooming or magnification.

In such discrete lens, the sizes of the front and back apertures may differ from each other by more than 20% (e.g., in terms of (a linear extension of) the smaller one of the sizes). It is understood that the sizes of the front and back apertures are governed by the same size definition. For example, the size of the front aperture may be an extension (e.g., diameter) of a projection of the front aperture onto a plane orthogonal to the center axis (lens axis), and the size of the back aperture may be an extension (e.g., diameter) of a projection of the back aperture onto the plane orthogonal to the center axis. The extensions (e.g., diameters) of the (projections of the) apertures may mean the extension over which the discrete elements are spread. The angles of incidence and emergence may be defined with respect to the same plane, as shown in FIG. 3A and FIG. 3B. The relationship between the angle of incidence and the angle of emergence (pointing angle) may be a relationship between sines of these angles, as shown in Eq. (1) and Eq. (2). For example, the zooming factor may be substantially equal to a ratio of sines of the angle of emergence and the angle of incidence. In some implementations, a first zooming factor M1 may be defined for a first direction orthogonal to the center axis (e.g., in the X-Z plane) and a second zooming factor M2 may be defined for a second direction orthogonal to the center axis and different from the first direction (e.g., the Y-Z plane), with the first and second zooming factors M1, M2 being different from each other.

The zooming factor M can be either larger than one or smaller than one. In the former case, the size of the back aperture is larger than the size of the front aperture, so that beams emitted by the front aperture have an increased field of view (increased pointing angle) compared to a range of angles of incidence of electromagnetic radiation incident on the back aperture. In the latter case, the size of the back aperture is smaller than the size of the front aperture, so that beams emitted by the front aperture have a reduced field of view (reduced pointing angle) compared to a range of angles of incidence of electromagnetic radiation incident on the back aperture.

Rotationally Asymmetric Multifocal Lenses Vs Rotationally Symmetric Afocal Lenses The present disclosure considers three/dimensional discrete lenses characterized by a number of foci ranging from 1 to 5 together with the case of afocal lenses which do not exhibit any perfect focal point. As usual, a focal point is defined according to the Geometrical Optics (GO) law and satisfies the following equi-length path condition: when a spherical wave is located in one focal point and illuminates the back lens via the free-space (i.e., via the propagation part), all signals received by the back elements of the lens are properly delayed with the transmission lines and reach the homologous elements in the front lens. Adding to the corresponding phase paths the distances between the elements of the front lens to an assigned plane (perpendicular to the desired plane wave pointing direction) an equi-length path condition should be valid.

For every focal point an equi-length path equation is enforced. The system of equations to be solved (with a number of equations equal to the number of focal points) contains the unknowns in linear and quadratic forms. This system is ill-condition, so that small modifications in a single unknown or parameter can bring strong changes in all the other parameters. For this reason, numerical optimization procedures can be completely ineffective in the design of discrete lens antennas. In addition, partial or global convergence requires intensive calculations. For small angles, i.e., for a limited angular field of view, all solutions tend to be quite similar and accurate. So it is better to compare different solutions for large field of view (e.g., for scanning directions equal or larger than 45°). Under these conditions, different lens antennas may behave in a completely different way and some solutions are clearly better in terms of optical aberrations, in terms of compactness, or in terms of orientation of the back lens aperture versus the focal array curve. The last condition may be fundamental in order to guarantee a good power transfer inside the lens and to minimize the power reflected by the back part of the lens or not intercepted by the lens itself. As a general rule, by increasing the focal distance versus the lens apertures, the optical aberrations can be decreases. However, different solutions with comparable focal distance may behave quite differently. Accordingly, a natural design objective consists in minimizing the optical aberrations for an assigned maximum focal distance (corresponding to an assigned maximum volumetric envelope of the lens antenna).

Except for the constrained lens characterized by a single focus, most of the configurations presented in the following are not rotationally symmetric (i.e., are rotationally asymmetric). This means that for these lenses not all the variables (i.e., front profile, back profile, W, azimuthal angle defining the back elements vs azimuthal angle defining the front elements) may be rotationally symmetric, but some of them may be rotationally symmetric. Typically, multifocal bootlace lenses present an angular symmetry under rotations by 120° or 180°, depending on the disposition of the foci. When considering the optical aberrations, their maximum values are usually associated to the maximum scanning angles, to the points of the lens located on the external rim, and to azimuthal angles intermediate between the angles associated with perfect foci. If for instance three foci are located in the azimuthal planes (i.e., planes containing the center axis of the discrete lens) characterized by $\phi=0°$, $\phi=120°$ and $\phi=240°$, the maximum aberrations are present in the planes characterized by $\phi=60°$, $\phi=180°$ and $\phi=300°$. If instead four foci are located in the azimuthal planes characterized by $\phi=0°$, $\phi=90°$, $\phi=180°$ and $\phi=270°$, the maximum aberrations are present in the planes characterized by $\phi=45°$, $\phi=135°$, $\phi=225°$ and $\phi=315°$.

Starting from a not rotationally symmetric lens (rotationally asymmetric lens), obtaining a rotationally symmetric lens (homogenized symmetric lens) may offer important advantages. First of all, the lens manufacturing becomes much easier. This consideration applies not only for the profiles but also for the connections (e.g., coaxial cables or waveguides) between homologous discrete elements. A second good reason to obtain a rotationally symmetric lens is related to the optical aberrations. In fact, instead of having a minimum aberration value in three or four planes and a maximum optical aberration in the intermediate planes, it may be preferable to have a unique intermediate value for the aberrations in all the planes. Finally, also the optimized focal arc will be rotationally symmetric and the performance result will be similar for all azimuthal angles $\phi$. In general, homogenized symmetric lenses exhibit, instead of a discrete number of foci, a ring of pseudo-foci. If a focus on the center axis (axial focus or center focus) is present, homogenization tends to maintain this axial focus.

A procedure (homogenization procedure) for obtaining a symmetric discrete lens from an asymmetric discrete lens according to embodiments of the disclosure is described next. As a starting point, points on the front aperture whose transversal coordinates (X1 and Y1) are located in a circle are defined. These points are characterized by the same radial coordinate $\rho 1$. For every point, the profile of the front lens element Z1, the length of the respective transmission line W (i.e., phase shifter W), and the coordinates of the homologous discrete element in the back lens (X and Y) are derived analytically. The average values for Z, Z1, and W can be obtained simply by determining an average between a sufficient number of points. Evaluating this average analytically in a closed form may usually not be possible. Concerning the average value to be used for the transversal coordinates, two solutions are feasible. The first solution involves evaluating, for every ρ1 value associated with a generic point in the front lens, the ρ value associated with the homologous back element. Then, taking an average between several ρ values permits finding an average ρ. The second solution consists in analytically deriving the generic ρ value, considering the square of this quantity, and then evaluating the average ρ squared value. From this average value, considering the square root, an estimation of the average ρ value is derived. The second solution may be preferable since in some cases the average value ρ squared can be obtained analytically while usually the average ρ value cannot be obtained analytically. It has been verified that the differences between the two average ρ values are limited (usually 5-10% of difference).

Notably, when deriving a rotationally symmetric lens starting from a non-rotationally-symmetric lens, the maximum aberrations always improve and are rotationally symmetric as well. In practice, the curve representing the maximum aberrations versus the scanning angle (defined with respect to the lens axis) is always comprised between the best and the worst curve relevant to the non-rotationally-symmetric lens.

In line with the above, FIG. 6 illustrates a method 600 of designing a three-dimensional discrete lens for a beamforming network. As described in conjunction with FIG. 1 above, the discrete lens has a front aperture and a back aperture, each comprising a plurality of discrete elements. Each discrete element of the back aperture is homologous to a respective discrete element of the front aperture, and the discrete lens further comprises a plurality of transmission lines connecting respective pairs of homologous discrete elements of the front aperture and the back aperture. The method 600 comprises method steps S610 through S660.

At step S610, a shape of the front aperture, a shape of the back aperture, a relationship between homologous discrete elements on the front and back apertures, and respective lengths of the transmission lines between homologous discrete elements, are parameterized in terms of two variables describing locations in a plane orthogonal to a center axis of the discrete lens. This will yield a parameterization of the discrete lens. Obtaining the parameterization may involve parameterizing, in terms of two variables describing a first location in a plane orthogonal to a center axis of the discrete lens, an axial coordinate of a surface of either one of the front aperture and the back aperture, an axial coordinate of a surface of the other one of the front aperture and the back aperture, a second location in the plane orthogonal to the center axis of a surface element of the other one of the front aperture and the back aperture that is homologous to a surface element of the one of the front aperture and the back aperture at the first location, and a length of a transmission line connecting the surface element of the front aperture at the first location to the surface element of the back aperture at the second location.

At step S620, a set of lens equations is solved for the discrete lens, using the parameterization of the discrete lens, while enforcing at least one condition for the resulting discrete lens, to thereby determine the shape of the front aperture, the relationship between homologous discrete elements on the front and back apertures, and the respective lengths of the transmission lines between homologous discrete elements, as functions of the two variables describing locations in the plane orthogonal to the center axis. Therein, the at least one condition relates to at least one of the shape of the front aperture, the shape of the back aperture, a number of focal points of the discrete lens, positions of the focal points, the relationship between homologous discrete elements of the front and back apertures, and the respective lengths of the transmission lines between homologous discrete elements. It is understood that the at least one first condition is chosen in accordance with an (available) number of degrees of freedom.

Steps S630 through S650 are performed for each of first radial excursions 22 of discrete elements of the front aperture 20 (see FIG. 2).

At step S630, a corresponding second radial excursion 32 is determined, by performing an average, over azimuth angle, of radial excursions of discrete elements of the back aperture 30 that are homologous to discrete elements of the front aperture at the first radial excursion 22. Thereby, a mapping of first radial excursions to second radial excursions is obtained. This mapping allows to obtain the corresponding second radial excursion 32 for a given first radial excursion 22.

At step S640, an averaged (or homogenized) axial excursion of the back aperture for the first radial excursion is determined, by performing an average, over azimuth angle, of the axial excursions of discrete elements of the back aperture that are homologous to discrete elements of the front aperture at the first radial excursion. Thereby, an averaged (or homogenized) profile of the back aperture is obtained.

At step S650, an averaged (or homogenized) length of transmission lines for the first radial excursion is determined, by performing an average, over azimuth angle, of the lengths of transmission lines connecting the discrete elements of the front aperture at the first radial excursion and the discrete elements of the back aperture that are homologous to discrete elements of the front aperture at the first radial excursion. Thereby, an averaged (or homogenized) length profile for the lengths of the transmission lines is obtained.

At step S660, the averaged profile of the back aperture is used as the shape of the back aperture, imposing a modified relationship between homologous discrete elements of the front and back apertures. According to this modified relationship, a discrete element of the front aperture at a given first radial excursion from the center axis is homologous to a discrete element of the back aperture at the corresponding second radial excursion from the center axis, at the same azimuth angle as the discrete element of the front aperture, with the length of the transmission line connecting these homologous discrete elements being determined in accordance with the averaged length profile. Notably, the above homogenization procedure may be likewise applied to three-dimensional discrete lenses with and without zooming, i.e., discrete lenses for which the zooming factor M is different from unity, $M \neq 1$, and three-dimensional discrete lenses for which the zooming factor M equals unity, $M=1$, respectively.

In accordance with embodiments of the present disclosure, the result of the homogenization procedure would be a homogenized (or averaged) three-dimensional discrete lens for which shapes of the back aperture and the front aperture are each axially rotationally symmetric with respect to the center axis of the discrete lens. Further, a mapping between homologous discrete elements on the front and back apertures is axially rotationally symmetric. Each discrete element of the back aperture and its respective homologous discrete element of the front aperture have substantially identical azimuth angles, with the azimuth angles being defined in the usual sense, in a plane orthogonal to the center axis. Moreover, a length profile of the lengths of the transmission lines is axially rotationally symmetric with respect to the center axis. Finally, as intended, optical aberrations associated with respective locations on the back aperture are axially rotationally symmetric with respect to the center axis. In other words, the resulting discrete lens is fully axially rotationally symmetric. This means that all variables defining the discrete lens are axially rotationally symmetric, i.e., when considering an arbitrary discrete element of the front array characterized by a profile Z1, a radial dimension ρ1, and an azimuth angle ϕ1, the homologous discrete element of the back array is characterized by the same azimuthal angle ϕ1 and by a profile Z and a radial dimension ρ. The variables Z1, W (length of the transmission lines), Z, and ρ change only as a function of ρ1 but not as a function of ϕ1, i.e., they are rotationally symmetric. As such, the axially rotationally symmetric discrete lens may be obtained, for example, by (rotationally) averaging any of the rotationally asymmetric three-dimensional discrete lenses defined throughout the present disclosure.

Depending on the rotationally asymmetric three-dimensional discrete lens that is chosen as a starting point for the homogenization, the resulting homogenized discrete lens may or may not have a zooming factor equal to unity. Here, it is to be noted that the homogenization procedure would maintain the zooming factor if the initial discrete lens has a single zooming factor, or yield an averaged zooming factor if the initial discrete lens has two zooming factors along different axes.

Derivation and Definition of Multifocal Lenses

It is noted that all analytical solutions presented throughout the present disclosure are derivable using symbolic calculation software (such as MuPAD available in MATLABR, for example). All equations have been validated and the multifocal property has been verified. Unless indicated otherwise, the variables listed below assume only real and not complex values. Often multiple solutions are derivable (e.g., up to 16 different solutions in the case of some discrete lenses featuring four focal points) and the acceptable solutions have been selected. In the following, the most significant multifocal three-dimensional lens architectures according to embodiments of the present disclosure will described.

A. Spherical-Planar Discrete Lens with a Single Focal Point

A first example implementation of the present disclosure relates to a spherical-planar discrete lens with a single focal point. For this discrete lens, the front is flat, the back is spherical (with radius h), the unique perfect focal point is located in the center of the sphere, and the phase shifts (W) are identical. The perfect focalization is guaranteed only in the direction of the lens axis. The following relations hold for this lens:

$$Z = -H + \mathrm{sqrt}(H^2 - X^2 - Y^2) \quad \text{Eq. (7)}$$

$$Z1 = 0; \quad \text{Eq. (8)}$$

$$W = 0$$

The positions of the elements of the back lens as compared to the homologous elements in the front lens are undetermined. This means that any choice guarantees the perfect focalization of the signals along the center axis when the source is located in the focal point. However, the relation between back and front element positions has an impact on the scanning performance of the lens. It is usually selected to feature proportionality between the coordinates of homologous elements, $$X = X1\,M = \rho 1\,M\cos(\phi) \quad \text{Eq. (9)}$$

$$Y = Y1\,M = \rho 1\,M\sin(\phi) \quad \text{Eq. (10)}$$

Clearly, the spherical-planar lens does not represent the only single focus constrained lens. One could consider also lenses with a flat front profile, arbitrary back profile, and homologous elements radially aligned and with positions satisfying Eq. (9) and (10). The shape of the back profile can be selected so as to guarantee a good amplitude matching in the back lens and to modify the position of the focal arc. As a rule of thumb, as for two-dimensional discrete lenses, when the back profile is becoming flatter, the optimal focal arc is moving away from the back of the lens, so that the volume required for accommodating the discrete lens increases. The phase shifters W represent the only unknown in the design and can be derived enforcing a single axial focal point.

In line with the above, the present disclosure provides a discrete lens (or a beamforming network), for example as described in conjunction with FIG. 1, wherein the front aperture is shaped as a flat surface and the back aperture is shaped as a portion of a sphere. The lengths of the plurality of transmission lines are chosen to be substantially equal. The relationship between homologous discrete elements is chosen such that for each pair of homologous discrete elements, a ratio between the radial excursions of the respective homologous discrete elements of the back aperture and the front aperture in the pair is substantially equal to the zooming factor. This discrete lens has one focal point located in the propagation part on a center of the sphere.

Notably, this discrete lens is feasible with and without zooming (i.e., for arbitrary zooming factor M), as any of the discrete lenses described in this section.

Figure 7:
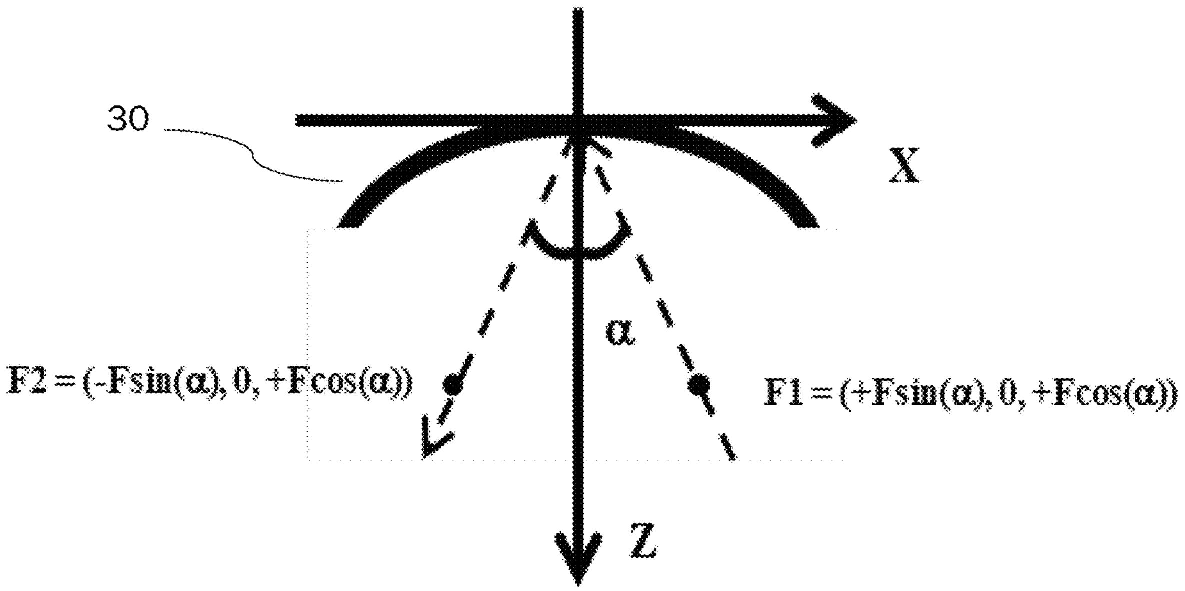
FIG. 7 schematically illustrates an example of a three-dimensional bifocal ellipsoidal reflectarray and transmitarray.

B. Ellipsoidal Discrete Lenses with Back Profile Coinciding with the Front Profile, Homologous Elements Superimposed, and 2 Foci Another example implementation of the present disclosure relates to an ellipsoidal discrete lens for which the back profile (back aperture) coincides with the front profile (front aperture), for which homologous discrete elements are superimposed, and which has two perfect focal points (foci). In other words, this example implementation relates to a bifocal ellipsoidal reflectarray and bifocal ellipsoidal transmitarray (which can be considered as a limit case of the bootlace lens). An example of such configuration is schematically illustrated in FIG. 7, together with a conventional Cartesian reference system (X,Y,Z). It is assumed that a first radiator is placed in the point F1 and a second radiator is placed in the point F2, wherein the two points are symmetrically located with respect to the Z axis and the coordinates of the two points are given by $$F1 = [+F\ sa, 0, +F\ ca], \quad \text{Eq. (11)}$$

$$F2 = [-F\ sa, 0, +F\ ca]. \quad \text{Eq. (12)}$$

Then, it can be enforced that the two spherical waves emerging from the two points F1 and F2 after the reflection off the unknown reflectarray surface will generate two plane waves in the specular directions. For the spherical wave coming from the point F1, the specular direction can be considered as a line starting from the origin and extending through the second focus F2, and vice versa for the spherical wave coming from the point F2. Then, the following two equations have to be solved:

$$W - F - Z\ ca + X\ sa + \left((Z - F\ ca)^2 + (F\ sa - X)^2 + Y^2\right)^{\frac{1}{2}} = 0, \quad \text{Eq. (13)}$$

$$W - F - Z\ ca - X\ sa + \left((Z - F\ ca)^2 + (F\ sa + X)^2 + Y^2\right)^{\frac{1}{2}} = 0. \quad \text{Eq. (14)}$$

In the above, X, Y, Z represent the coordinates of the unknown reflectarray surface, while W represents the unknown continuous phase variations characterizing the reflectarray. Solving Eq. (13) and Eq. (14) for Z and W will yield the following results:

$$Z = F\ ca - \left((F\ ca)^2 - (X\ ca)^2 - Y^2\right)^{\frac{1}{2}}, \quad \text{Eq. (15)}$$

$$W = Z\ ca \quad \text{Eq. (16)}$$

The above equations demonstrate that an ellipsoidal reflectarray with a phase proportional to the height Z itself (i.e., the shape of the reflectarray surface) can convert two spherical waves into two plane waves. This is an interesting result considering the fact that a conventional metallic ellipsoidal reflector converts two spherical waves into two different spherical waves. In practice, a conventional metallic ellipsoidal reflector can focalize the energy coming from the first focus exactly into the second focus and vice versa. By contrast, the proposed ellipsoidal reflectarray with ellipsoidal phase variations defined above can focalize the energy coming from the two foci into two plane waves, i.e., in the far field region instead of in the near field region. As such, the proposed antenna configuration represents an extension of the conventional metallic paraboloidal reflector guaranteeing (only) one focus.

With a small modification, a bifocal lens with co-located back and front elements can be derived. In fact, by imposing that the two spherical waves originating from the two foci are transmitted in the opposite half space with an angle α with respect to the vertical negative axis (−Z), the same expression for the profile can be derived, $$Z = F\ ca - \left((F\ ca)^2 - (X\ ca)^2 - Y^2\right)^{\frac{1}{2}}, \quad \text{Eq. (17)}$$

while only the sign of the phase changes, $$W = -Z\ ca, \quad \text{Eq. (18)}$$

i.e., the phase in the bifocal reflectarray and in the bifocal discrete lens are identical except for a sign variation corresponding to an inversion by 180°. This can be considered a limit case of a discrete lens: The front and back profiles are identical, homologous elements in the front and back lens are identical. Notably however, this is not the only feasible bifocal three-dimensional discrete lens. In principle, it is possible to define bifocal lenses with front and back lens not coinciding and with homologous element not coinciding.

In line with the above, the present disclosure provides a discrete lens (or a beamforming network), for example as described in conjunction with FIG. 1, wherein for each pair of homologous discrete elements, the respective homologous discrete elements of the back aperture and the front aperture are co-located. This discrete lens has a first focal point and a second focal point, both located in the propagation part on a common plane along the center axis. When using a Cartesian coordinate system with coordinates (X,Y, Z), where X=0, Y=0 defines the center axis and Y=0 defines the common plane, a location of the first focal point is given by X=F sin α, Y=0, Z=F cos α and a location of the second focal point is given by X=−F sin α, Y=0, Z=F cos α. Further, a shape of the back aperture is given by $Z = F\cos\alpha - \sqrt{(F\cos\alpha)^2 - (X\cos\alpha)^2 - Y^2}$. In this configuration, a length W of transmission lines between homologous discrete elements of the back and front apertures at a given value of the Z-coordinate is given by W=Z cos α or W=−Z cos α, with the + or − sign applying, respectively, to a configuration working as a reflectarray or transmitarray.

Notably, this discrete lens (or beamforming network) is feasible with and without zooming (i.e., for arbitrary zooming factor M), as any of the discrete lenses described in this section.

C. Discrete Lens with Flat Front and Back Profiles and 3 Foci

Another example implementation of the present disclosure relates to a three-dimensional discrete lens with flat front and back profiles (flat front and back apertures) and three perfect focal points. That is, both the front and back profiles are assumed to be flat (i.e., Z=Z1=0). The three residual degrees of freedom are used to enforce three focal points located in the same plane perpendicular to the lens axis and with equiangular distance (i.e., angular distance 120°). Two different solutions have been derived: one with the coordinates of the front lens as independent variables, one with the coordinates of the back lens as independent variables. Both solutions allow for an arbitrary zooming factor M. In the first solution, the transversal coordinates of the front lens (X1,Y1) are selected as independent variables, as is typically done. In the second solution, the transversal coordinates of the back lens (X,Y) are selected as independent variables.

Assuming that the three unknowns are the transversal coordinates of the back lens (X and Y) and the phase shift (W) the discrete lens is fully defined by the following equations:

$$X = \frac{FM\left(X1^2 Msa - Y1^2 Msa\right)}{4\left(X1^2 M^2 + Y1^2 M^2 - f^2\right)} - \quad \text{Eq. (19)}$$

$$\Big(M\Big(2X1\Big(-2.25X1^4 Y1^2 M^6 sa^2 + 2.25X1^4 F^2 M^4 sa^2 +$$

$$1.5X1^2 Y1^4 M^6 sa^2 + 4.5X1^2 Y1^2 F^2 M^4 sa^2 - 2X1^2 F^4 M^2 sa^2 -$$

$$4X1^2 F^4 M^2 - 0.25Y1^6 M^6 sa^2 + 2.25Y1^4 F^2 M^4 sa^2 -$$

-continued $$2Y1^2F^4M^2sa^2 - 4Y1^2F^4M^2 + 4F^6)^{\frac{1}{2}} - Y1^4M^3sa + 3X1^2Y1^2M^3sa\Big)\Big) \Big/ \big(4F\big(X1^2M^2 + Y1^2M^2 - F^2\big)\big),$$

$$Y = \big(0.75X1Y1M^2sa\big)/F - \Big(X1 \big(0.25Y1M\big(saY1^2M^3 + 2saF^2M\big) - 0.75Y1M^2sa\big(F^2 - Y1^2M^2\big)\big) + 0.5Y1M\big(-2.25X1^4Y1^2M^6sa^2 + 2.25X1^4F^2M^4sa^2 + 1.5X1^2Y1^4M^6sa^2 + 4.5X1^2Y1^2F^2M^4sa^2 - 2X1^2F^4M^2sa^2 - 4X1^2F^4M^2 - 0.25Y1^6M^6sa^2 + 2.25Y1^4F^2M^4sa^2 - 2Y1^2F^4M^2sa^2 - 4Y1^2F^4M^2 + 4F^6\big)^{\frac{1}{2}}\Big) \Big/ F\big(X1^2M^2 + Y1^2M^2F^2\big)\Big), \quad \text{Eq. (20)}$$

$$W = F + \Big(0.5 \big(-2.25X1^4Y1^2M^6sa^2 + 2.25X1^4F^2M^4sa^2 + 1.5X1^2Y1^4M^6sa^2 + 4.5X1^2Y1^2F^2M^4sa^2 - 2X1^2F^4M^2sa^2 - 4X1^2F^4M^2 - 0.25Y1^6M^6sa^2 + 2.25Y1^4F^2M^4sa^2 - 2Y1^2F^4M^2sa^2 - 4Y1^2F^4M^2 + 4F^6\big)^{\frac{1}{2}} - \big(X1^3M^3sa\big)/4 + 0.75X1Y1^2M^3sa\Big) \Big/ \big(X1^2M^2 + Y1^2M^2 - F^2\big). \quad \text{Eq. (21)}$$

Assuming on the other hand that the three unknowns are the transversal coordinates of the front lens (X1 and Y1) and the phase shift (W) the discrete lens is fully defined by the following equations:

$$X1 = \Big(1/3\big(X^2 + saXF + Y^2 - \sqrt{3}\,saYF + F^2\big)^{\frac{1}{2}} - 2/3\big(X^2 - 2saXF + Y^2 + F^2\big)^{\frac{1}{2}} + 1/3\big(X^2 + saXF + Y^2 + \sqrt{3}\,saYF + F^2\big)^{\frac{1}{2}}\Big) \Big/ (Msa) \quad \text{Eq. (22)}$$

$$Y1 = \Big(\sqrt{3/3}\,\big(X^2 + saXF + Y^2 + \sqrt{3}\,saYF + F^2\big)^{\frac{1}{2}}\Big) \Big/ (Msa) - \Big(\sqrt{3/3}\,\big(X^2 + saXF + Y^2 - \sqrt{3}\,saYF + F^2\big)^{\frac{1}{2}}\Big) \Big/ (Msa) \quad \text{Eq. (23)}$$

$$W = F - 1/3\big(X^2 - 2saXF + Y^2 + F^2\big)^{\frac{1}{2}} - 1/3\big(X^2 + saXf + Y^2 - \sqrt{3}\,saYf + f^2\big)^{\frac{1}{2}} - 1/3\big(X^2 + saXf + Y^2 + \sqrt{3}\,saYf + f^2\big)^{\frac{1}{2}}. \quad \text{Eq. (24)}$$

Typically, lens equations for discrete lens beamforming networks are solved assuming the transversal coordinated of the front lens as independent variables (i.e., X1 and Y1). For this specific lens, the three equations associated with the three focal points may be solved also as a function of the back transversal coordinates (i.e., X and Y). Assuming Z=Z1=0, the back lens results to be larger than the front lens. It appears impossible to analytically derive the average squared radius for the back lens, $$\rho_{squared} = \frac{\int_0^{2\pi} (X^2 + Y^2)\,d\phi}{2\pi}. \quad \text{Eq. (25)}$$

However, the numerical average of the previous quantities can be easily evaluated.

In line with the above, the present disclosure provides a discrete lens (or a beamforming network), for example as described in conjunction with FIG. 1, wherein the front aperture and the back aperture are shaped as flat surfaces. This discrete lens has three focal points located in the propagation part off the center axis, in a common plane perpendicular to the center axis, with equal angular distances between their respective azimuth angles, the azimuth angles being defined in the common plane.

Notably, this discrete lens is feasible with and without zooming (i.e., for arbitrary zooming factor M), as any of the discrete lenses described in this section.

D. Discrete Lens with Flat Front and Back Profiles and Two Coinciding Foci (McGrath)

An example relates to a discrete lens with flat front and back profiles and two coinciding perfect focal points. Keeping Z=Z1=0, i.e., maintaining the front and back profiles flat, a third degree of freedom can be used to enforce that homologous elements are located in the same radial direction (i.e., they are characterized by the same azimuthal angle). This will yield the discrete lens described in D. T. McGrath, "Planar Three-Dimensional constrained lenses," IEEE Transactions on Antennas and Propagation, Vol. 34, No. 1 Jan. 1986, pp. 46-50. The residual two degrees of freedom correspond to two focal points that for this discrete lens are collocated in a point on the lens longitudinal axis (center axis). For this discrete lens, the phase shifters (e.g., lengths of the transmission lines, apart from an optional common offset) are given by $$W = F - \big(X^2 + Y^2 + F^2\big)^{\frac{1}{2}}, \quad \text{Eq. (26)}$$

where F is the axial focal distance defining the positions of the two collocated foci on the axis. The radial coordinate of the back elements versus the radial coordinate of the homologous elements in the front lens is not determined. To derive the radial coordinates of the back lens, the considerations made for the discrete lens of configuration/described below can be used.

E. Discrete Lens with 4 Foci (Sole and Smith)

Another example implementation of the present disclosure relates to a three-dimensional discrete lens with four perfect focal points. Three foci exhibit an equiangular distance (i.e., angular distance of 120°), and one focus is placed at the center (e.g., on the center axis). The front lens is forced to be flat (i.e., Z1-0). This configuration has been proposed by G. C. Sole, M. S. Smith "Multiple beam forming for planar antenna arrays using a three-dimensional Rotman lens," IEEE Proceedings, Vol. 134, Pt. H, No. 4, August 1987. The solutions in explicit analytical form are presented for the first time by the present disclosure. The back lens profile is not rotationally symmetric but has the shape of a saddle.

$$X = X1M - \left(0.5X1^3M^3\cos(0.5\alpha)^2\right)/F^2 - \left(0.25X1^2M^2sa\right)/F + \left(0.25Y1^2M^2sa\right)/F - \left(0.5X1Y1^2M^3\cos(0.5\alpha)^2\right)/F^2 \quad \text{Eq. (27)}$$

$$Y = Y1M - \left(0.5Y1^3M^3)\cos(0.5\alpha)^2\right)/F^2 + \left(0.5X1Y1M^2sa\right)/F - \left(0.5X1^2Y1M^3\cos(0.5\alpha)^2\right)/F^2 \quad \text{Eq. (28)}$$

$$W = \left(X1^2(saM)^2 + Y1^2(saM)^2\right)/(4F - 4Fca) \quad \text{Eq. (29)}$$

$$\begin{aligned} Z = {} & -\left(F^3ca^2 - F^3ca\right)/\left(F^2(ca-1)\right) - \left(-0.25X1^6M^6sa^6 - X1^5FM^5\sin(0.5\alpha)^2sa^5 - 0.75X1^4Y1^2M^6sa^6 + \right. \\ & 3X1^4F^2M^4\sin(0.5\alpha)^2sa^4 + 0.5X1^4F^2M^4sa^6 + 2X1^3Y1^2FM^5\sin(0.5\alpha)^2sa^5 + 8X1^3F^3M^3\sin(0.5\alpha)^2sa^3 - \\ & 2X1^3F^3M^3sa^5 - 0.75X1^2Y1^4M^6sa^6 + 6X1^2Y1^2F^2M^4\sin(0.5\alpha)^2sa^4 + X1^2Y1^2F^2M^4sa^6 + \\ & 4X1^2F^4M^2\sin(0.5\alpha)^2sa^4 - 16X1^2F^4M^2\sin(0.5\alpha)^2sa^2 - 2X1^2F^4M^2sa^6 + 4X1^2F^4M^2sa^4 + \\ & 3X1Y1^4FM^5\sin(0.5\alpha)^2sa^5 - 24X1Y1^2F^3M^3\sin(0.5\alpha)^2sa^3 + 6X1Y1^2F^3M^3sa^5 - \\ & 0.25Y1^6M^6sa^6 + 3Y1^4F^2M^4\sin(0.5\alpha)^2sa^4 + 0.5Y1^4F^2M^4sa^6 + 4Y1^2F^4M^2\sin(0.5\alpha)^2sa^4 - \\ & 16Y1^2F^4M^2\sin(0.5\alpha)^2sa^2 - 2Y1^2F^4M^2sa^6 + 4Y1^2F^4M^2sa^4 - 16F^6\sin(0.5\alpha)^2sa^4 + \\ & \left. 16F^6\sin(0.5\alpha)^2sa^2 + 4F^6sa^6 - 4F^6sa^4\right)^{\frac{1}{2}} / \left(2F^2sa(ca-1)\right) \end{aligned} \quad \text{Eq. (30)}$$

It may be of interest to build a rotationally symmetric discrete lens from the discrete lens described above. For this reason, one may enforce:

$$X1 = \rho 1 \cos(\phi), \quad Y1 = \rho 1 \sin(\phi), \quad \text{Eq. (31)}$$

$$X = \rho \cos(\phi), \quad Y = \rho \sin(\phi). \quad \text{Eq. (32)}$$

X1 and Y1 are considered known, so ρ1 is known as well. X and Y are known as well from the last equations derived. It is possible to analytically derive the average value of the squared radius for the back lens and the phase shifters W:

$$\rho_{squared} = \frac{\int_0^{2\pi}\left(X^2 + Y^2\right)d\phi}{2\pi} = \rho 1^2M^2 - \left(0.0625\rho 1^4M^4\left(ca^2 + 8ca + 7\right)\right)/F^2 + \left(0.0625\,\rho 1^6M^6(ca+1)^2\right)/F^4 \quad \text{Eq. (33)}$$

$$W_{average} = \frac{\int_0^{2\pi}(W)d\phi}{2\pi} = \rho 1^2M^2(ca+1)/(4F) \quad \text{Eq. (34)}$$

From the squared average radius, the average X and Y can be derived. The average Z may be evaluated numerically, in accordance with, for example, N. Fonseca, E. Cala', G. Toso, "On the reduction of phase-aberrations in three-dimensional Rotman lens design," 15th International Symposium of Antenna Technology and Applied Electromagnetics, ANTEM 2012, 25-28 Jun. 2012-Toulouse.

F. Discrete Lens with 4 Foci, with Front and Back Profiles Rotationally Symmetric Another example implementation of the present disclosure relates to a three-dimensional discrete lens with rotationally symmetric front and back profiles (apertures) and four perfect focal points. Three foci exhibit an equiangular separation of 120°, and a fourth focus is placed at the center (e.g., on the center axis). The back profile is shaped as a portion of a sphere, and the front profile is shaped as a portion of a rotationally ellipsoid. The transmission line lengths W coincide with the longitudinal dimension of the front profile (i.e., Z1). This discrete lens exhibits completely rotationally symmetric back and front profiles. It appears to be the first time that a perfectly rotationally symmetric discrete lens with more than one focus is found (except for the limiting case of a discrete lens with both front and back profiles flat). Due to the rotationally symmetric profiles, the shapes of the profiles, and the high number of foci, this lens guarantees good scanning properties and amplitude matching. The analytical equations are found to be particularly simple for this configuration. It is important to note that while the two profiles are perfectly rotationally symmetric, homologous elements are not aligned radially, but their layout presents a symmetry of 120° in line with the positions of the perfect foci.

In the derivation of the lens parameters, only the following condition is enforced upfront:

$$Z = -Fca + sqrt\left((Fca)^2 - X^2 - Y^2\right), \quad \text{Eq. (35)}$$

which ensures a good power transfer in the back lens. The remaining lens parameters are derived by solving the four lens equations associated with the four focal points:

$$X = \left(0.25\left(-3saX1^2M^2 + 2\sqrt{3}\,saX1YM^2 + saY1^2M^2\right)\right)/F + \left(X1M\left(\sqrt{2}/2\left(-X1^2M^2sa^2 - Y1^2M^2sa^2 + 2F^2\right)^{\frac{1}{2}} + 0.5X1Msa - \sqrt{3}/2Y1Msa\right)\right)/F \quad \text{Eq. (36)}$$

$$Y = \left(0.5\left(2Y1M\left(\sqrt{2}/2\left(-X1^2M^2sa^2 - Y1^2M^2sa^2 + 2F^2\right)\wedge(1/2) + 0.5X1Msa - \sqrt{3}/2Y1Msa\right) + \sqrt{3}\,Y1^2M^2sa\right)\right)/F \quad \text{Eq. (37)}$$

$$W = \left(\sqrt{2}/2\left(-X1^2M^2sa^2 - Y1^2M^2sa^2 + 2F^2\right)^{\frac{1}{2}} + 0.5X1Msa - \sqrt{3}/2Y1Msa\right)/\left(\left(1 - M^2sa^2\right)^{\frac{1}{2}} - 1\right) - \left(0.5\left(2F + X1Msa - \sqrt{3}\,Y1Msa\right)\right)/\left(\left(1 - M^2sa^2\right)^{\frac{1}{2}} - 1\right) \quad \text{Eq. (38)}$$

$$Z1 = W. \quad \text{Eq. (39)}$$

It may be of interest to build a completely rotationally symmetric discrete lens for this discrete lens. For this reason, one may enforce $$X1 = \rho 1 \cos(\phi), \quad \text{Eq. (40)}$$

$$Y1 = \rho 1 \sin(\phi),$$

-continued $$X = \rho\ \cos(\phi), \quad Y = \rho\ \sin(\phi), \tag{Eq. (41)}$$

X1 and Y1 are considered known, so ρ1 is known as well. It is possible to analytically derive the average value of the squared radius for the back lens $$\rho_{squared\_average} = \frac{\int_0^{2\pi}(X^2+Y^2)d\phi}{2\pi} \tag{Eq. (42)}$$

and by extracting the square root, $$\rho_{average} = \rho 1 M\ sqrt\left(1 - \left(1.374446786\rho 1^2 M^2 sa^2\right)/\left(\pi F^2\right)\right) \tag{Eq. (43)}$$

From the above equation, the X and Y average quantities can be easily derived. The Z, Z1 and W quantities are already rotationally symmetric.

The configuration described above exhibits several properties: simple equations, rotationally symmetric back lens profile, rotationally symmetric front lens profile, the front lens exhibits a curvature depending on α1 (i.e., evolving depending on the scanning characteristics), W=Z1 holds (here, an additional common length (offset length) may be required considering the opposite concavities of the two profiles), and good amplitude matching due to the spherical back profile. It has been verified that, as expected, the maximum optical aberrations arise in the azimuthal planes intermediate between the planes containing the focal points (i.e., if the three foci are located in the azimuthal planes characterized by ϕ=0°, ϕ=120°, and ϕ=240°, the maximum aberrations are present in the planes characterized by ϕ=60°, ϕ=180°, and ϕ=300°). When deriving a completely rotationally symmetric lens, adopting the procedure just described, the aberrations become rotationally symmetric and their maximum value is reduced. Because the starting profiles and the phase shifts W are already rotationally symmetric, the profiles do not change when applying the averaging for the transversal coordinates, while only the reciprocal positions of homologous elements change.

In line with the above, the present disclosure provides a discrete lens (or a beamforming network), for example as described in conjunction with FIG. 1, wherein shapes of the back aperture and the front aperture are each axially rotationally symmetric with respect to the center axis of the discrete lens. Specifically, the back aperture is shaped as a portion of a sphere, and the front aperture is shaped as a portion of an ellipsoid (spheroid). The lengths of the plurality of transmission lines are chosen such that, apart from an optional common length offset, a length of a given transmission line is substantially equal to a distance, along the center axis, between the respective discrete element of the front aperture that the given transmission line connects to, and a discrete element of the front aperture on the center axis. The discrete element of the front aperture on the center axis may be referred to as a central discrete element or center discrete element. Moreover, the discrete lens has four focal points located in the propagation part, one of them located on the center axis and the remaining three located off the center axis, in a common plane perpendicular to the center axis, with equal angular distances between their respective azimuth angles, the azimuth angles being defined in the common plane.

Notably, this discrete lens is feasible with and without zooming (i.e., for arbitrary zooming factor M), as any of the discrete lenses described in this section.

G. Discrete Lens with 4 Foci, Back Profile Rotationally Symmetric, and Front Profile with a Saddle Profile Another example implementation of the present disclosure relates to a discrete lens with rotationally symmetric back profile (back aperture), with a front profile (front aperture) having the shape of a saddle profile, and four perfect focal points. Two foci are located in the XZ plane, and two foci are located in the perpendicular YZ plane. The back profile is shaped as a portion of a sphere centered in the lens axis, and the front profile has a saddle profile. Since this discrete lens exhibits a completely rotationally symmetric back profile, it guarantees good amplitude matching. Moreover, a large scanning is obtained in the two principal planes even if there may be a degradation of performance in the boresight, because there is not any focus on the lens axis. Considering the fact that the boresight direction in terms of scan losses is favored as compared to any other direction, this lens may be used to favor the large scanning directions. The condition Fca=Gcd=H represents the best choice. Notably, the opening angles of the foci in the two planes, α and δ, should be (sufficiently) different from each other. If δ tends to α, then W and Z1 are diverging.

By enforcing $$Z = -H + sqrt\left(H^2 - X^2 - Y^2\right), \quad Fca = Gcd, \quad \delta \neq \alpha, \tag{Eq. (44)}$$

the following equations for X, Y, and W can be derived:

$$X = \left(X1^2 ca\ sa1^2 + X1 sa1\left(\left(-X1^2 ca^2 sa1^2 + H^2\right)^{\frac{1}{2}} - X1 ca\ sa1\right)\right)/(H\ sa) \tag{Eq. (45)}$$

$$Y = \left(Y1^2 cd\ sd1^2 + X1 sd1\left(\left(-Y1^2 cd^2 sd1^2 + H^2\right)^{\frac{1}{2}} - Y1 cd\ sd1\right)\right)/(H\ sd) \tag{Eq. (46)}$$

$$W = -\left(ca\ ca1\left(\left(-Y1^2 cd^2 sd1^2 + h^2\right)^{\frac{1}{2}} - Y1 cd\ sd1\right) - h\ ca\ ca1 + h\ cd\ cd1 - cd\ cd1\left(\left(-X1^2 ca^2 sa1^2 + h^2\right)^{\frac{1}{2}} - X1 ca\ sa1\right) - X1 ca\ cd\ cd1\ sa1 + Y1 ca\ ca1\ cd\ sd1\right)/(ca\ ca1\ cd - ca\ cd\ cd1) \tag{Eq. (47)}$$

$$Z1 = \left(cd\left(\left(-X1^2 ca^2 sa1^2 + H^2\right)^{\frac{1}{2}} - X1 ca\ sa1\right) - ca\left(\left(-Y1^2 cd^2 sd1^2 + H^2\right)^{\frac{1}{2}} - Y1 cd\ sd1\right) + Hca - Hcd + X1 ca\ cd\ sa1 - Y1 ca\ cd\ sd1\right)/(ca\ ca1\ cd - ca\ cd\ cd1) \tag{Eq. (48)}$$

In line with the above, the present disclosure provides a discrete lens (or a beamforming network), for example as described in conjunction with FIG. 1, wherein a shape of the back aperture is axially rotationally symmetric with respect to the center axis of the discrete lens. Specifically, the back aperture is shaped as a portion of a sphere. The front aperture is shaped as a portion of a saddle surface with a single saddle point located on the center axis, and is symmetric with respect to a first plane along the center axis and a second plane along the center axis, the first and second planes being orthogonal to each other. This discrete lens has four focal points located in the propagation part, with a first pair of focal points located in the first plane and a second pair of focal points located in the second plane. The first pair of focal points may be symmetric with respect to the center axis. Likewise, the second pair of focal points may be symmetric with respect to the center axis. Therein, a plane along the center axis is understood to be a plane including the center axis.

Moreover, as noted above, the relationship $f\cdot\cos(\alpha)=g\cdot\cos(\delta)$ holds between focal lengths and inclination angles relative to the center axis for the focal points of the first and second pairs of focal points, where f (corresponding to F defined above) is the focal length of the first pair of focal points, $\alpha$ is the inclination angle of the first pair of focal points, g (corresponding to G defined above) is the focal length of the second pair of focal points, and $\delta$ is the inclination angle of the second pair of focal points. Here and in the remainder of this disclosure, focal lengths and inclination angles may be defined with respect to a location at which (a surface of) the back aperture intersects the center axis. The focal length and inclination angles may be common to respective pairs of focal points. That is, the focal distance f may be a common focal distance of the first pair of focal points. The focal distance g may be a common focal distance of the second pair of focal points and the inclination angle $\alpha$ may be a common inclination angle of the first pair of focal points and the inclination angle $\delta$ may be a common inclination angle of the second pair of focal points. In particular, the focal points within a given pair may be symmetric with respect to the center axis, as noted above.

Notably, this discrete lens is feasible with and without zooming (i.e., for arbitrary zooming factor M), as any of the discrete lenses described in this section.

H. Discrete Lens with 4 Foci, Back Profile Saddle-Shaped, Flat Front Profile, and Radially Aligned Elements Another example implementation of the present disclosure relates to a three-dimensional discrete lens with a saddle-shaped back profile (back aperture), a flat front profile (front aperture), radially aligned discrete elements on the front and back profiles, and four perfect focal points. Two foci are located in the XZ plane and 2 foci are located in the YZ plane. The two focal distances F and G (where F is the focal distance for the two symmetric foci in the XZ plane and G is the focal distance for the two symmetric foci in the YZ plane) are identical. The corresponding angles $\alpha$ and $\delta$ have to be different in order to derive acceptable solutions. In the particular cases of a) no zooming (M=1) and b) identical zooming in the two orthogonal planes,

- i) Z1 is found to be null (i.e., front lens is flat; importantly, Z1=0 is not enforced but is a consequence of the assumptions made);
- ii) the back lens profile is a saddle function of X1 and Y1 with the curvatures of the two parabolic profiles of the saddle decreasing (i.e., back profile flatter and flatter) when increasing the separation between the angles $\alpha$ and $\delta$, quasi-flat back profiles can be obtained when there is a factor of around 2 between the two angles;
- iii) homologous elements in the front and back lens are perfectly aligned radially.

By spending one degree of freedom for enforcing homologous discrete elements to be radially aligned, the following conditions are obtained: a flat front lens and a back lens with a saddle shape (i.e., two parabolic profiles with opposite convexity in the two principal planes) defined with a simple equation. This lens can be solved also assuming X and Y as independent variables. However, in this case, the unknowns are the solutions of a 3rd degree equation and the real and acceptable solution(s) depend on the values of the variable considered. Due to the perfect radial alignment of homologous elements and the flat front profile, this lens is particularly simple in terms of manufacturing.

By enforcing $$Y = XY1/X1 \qquad \text{Eq. (49)}$$

which condition guarantees the radial alignment of back and front elements, one can derive:

$$Z1 = 0 \qquad \text{Eq. (50)}$$

Eq. (51)

$$\begin{aligned} X = {} & X1M + \Big(X1M\Big(-\Big(X1^4M^4sa^4 - 2X1^2Y1^2M^4sa^2sd^2 + 16X1^2F^2 \\ & M^2\sin\left(\frac{\alpha}{2}\right)^2\sin\left(\frac{\delta}{2}\right)^2 sa^2 - 8X1^2F^2M^2\sin\left(\frac{\alpha}{2}\right)^2 sa^2 - \\ & 16X1^2F^2M^2\sin\left(\frac{\delta}{2}\right)^4 sa^2 + 8X1^2F^2M^2\sin\left(\frac{\delta}{2}\right)^2 sa^2 \\ & + Y1^4M^4sd^4 - 16Y1^2F^2M^2\sin\left(\frac{\alpha}{2}\right)^4 sd^2 + 16Y1^2F^2M^2\sin\left(\frac{\alpha}{2}\right)^2 \\ & \sin\left(\frac{\delta}{2}\right)^2 sd^2 + 8Y1^2F^2M^2\sin\left(\frac{\alpha}{2}\right)^2 sd^2 - 8Y1^2F^2M^2\sin\left(\frac{\delta}{2}\right)^2 sd^2 + \\ & 16F^4\sin\left(\frac{\alpha}{2}\right)^4 - 32F^4\sin\left(\frac{\alpha}{2}\right)^2\sin\left(\frac{\delta}{2}\right)^2 + 16f^4\sin\left(\frac{\delta}{2}\right)^4\Big) \\ & /\left(4\left(X1^2M^2 + Y1^2M^2 - F^2\right)\right)\Big)\hat{}\,(1/2) - \\ & 2F\sin\left(\frac{\alpha}{2}\right)^2 + 2F\sin\left(\frac{\delta}{2}\right)^2\Big)\Big)/\Big(2F\Big(\sin\left(\frac{\alpha}{2}\right)^2 - \sin\left(\frac{\delta}{2}\right)^2\Big)\Big) \end{aligned}$$

Eq. (52)

$$\begin{aligned} W = {} & -\Big(\Big(\Big(-\Big(X1^4M^4sa^4 - 2X1^2Y1^2M^4sa^2sd^2 + 16X1^2F^2M^2\sin\left(\frac{\alpha}{2}\right)^2 \\ & \sin\left(\frac{\delta}{2}\right)^2 sa^2 - 8X1^2F^2M^2\sin\left(\frac{\alpha}{2}\right)^2 sa^2 - \\ & 16X1^2F^2M^2\sin\left(\frac{\delta}{2}\right)^4 sa^2 + 8X1^2F^2M^2\sin\left(\frac{\delta}{2}\right)^2 s \\ & a^2 + Y1^4M^4sd^4 - 16Y1^2F^2M^2\sin\left(\frac{\alpha}{2}\right)^4 sd^2 + 16Y1^2F^2M^2\sin\left(\frac{\alpha}{2}\right)^2 \\ & \sin\left(\frac{\delta}{2}\right)^2 sd^2 + 8Y1^2F^2M^2\sin\left(\frac{\alpha}{2}\right)^2 sd^2 - 8Y1^2F^2M^2\sin\left(\frac{\delta}{2}\right)^2 sd^2 + \\ & 16F^4\sin\left(\frac{\alpha}{2}\right)^4 - 32F^4\sin\left(\frac{\alpha}{2}\right)^2\sin\left(\frac{\delta}{2}\right)^2 + 16F^4\sin\left(\frac{\delta}{2}\right)^4\Big) \\ & /\left(4\left(X1^2M^2 + Y1^2M^2 - F^2\right)\right)\Big)\hat{}\,(1/2) - \\ & 2F\sin\left(\frac{\alpha}{2}\right)^2 + 2F\sin\left(\frac{\delta}{2}\right)^2\Big)/\Big(2\Big(\sin\left(\frac{\alpha}{2}\right)^2 - \sin\left(\frac{\delta}{2}\right)^2\Big)\Big) \end{aligned}$$

$$Z = -\left(X1^2M^2sa^2 - Y1^2M^2sd^2\right)/\Big(4\Big(F\sin\left(\frac{\alpha}{2}\right)^2 - F\sin\left(\frac{\delta}{2}\right)^2\Big)\Big) \qquad \text{Eq. (53)}$$

It may again be of interest to build a rotationally symmetric discrete lens from this discrete lens. For this reason, one may enforce $$X1=\rho 1\ \cos(\phi),\quad Y1=\rho 1\ \sin(\phi),\quad X=\rho\ \cos(\phi),\quad Y=\rho\ \sin(\phi), \tag{Eq. (54)}$$

X1 and Y1 are considered known, so ρ1 is known as well. It is possible to analytically derive the average value of the squared radius for the back lens and the average value of the Z quantity, $$\text{Z\_average}=-(\rho 1^2M^2(ca+cd))/(4F) \tag{Eq. (55)}$$

$$\rho\text{\_average}=sqrt((\rho 1^2M^2(-32F^4ca^2+64F^4ca\ cd-32F^4cd^2+16F^2\rho 1^2M^2ca^3cd-32F^2\rho 1^2M^2ca^2cd^2+16F^2\rho 1^2M^2ca^2+16F^2\rho 1^2M^2ca\ cd^3-32F^2\rho 1^2M^2ca\ cd+16f^2\rho 1^2M^2cd^2-3\rho 1^4M^4ca^4+2\rho 1^4M^4ca^2cd^2+4\rho 1^4M^4ca^2-3\rho 1^4M^4cd^4+4\rho 1^4M^4cd^2-4\rho 1^4M^4))/(32F^2(ca-cd)^2(\rho 1^2M^2-F^2))) \tag{Eq. (56)}$$

W contains a constant term (an easy simplification shows that this term may be equal to F) and a radicand. The part inside the radicand, containing all the ϕ-dependent terms, can be integrated and divided by 2π. This way an approximation of the average W can be derived as $$\text{W\_average\_approximated}=F-(-(16F^4\sin(\tfrac{\alpha}{2})^4+16F^4\sin(\tfrac{\delta}{2})^4+(\rho 1^2M^2(-64F^2\sin(\tfrac{\alpha}{2})^4sd^2+64F^2\sin(\tfrac{\alpha}{2})^2\sin(\tfrac{\delta}{2})^2sa^2+64F^2\sin(\tfrac{\alpha}{2})^2\sin(\tfrac{\delta}{2})^2sd^2-32F^2\sin(\tfrac{\alpha}{2})^2sa^2+32F^2\sin(\tfrac{\alpha}{2})^2sd^2-64F^2\sin(\tfrac{\delta}{2})^4sa^2+32F^2\sin(\tfrac{\delta}{2})^2sa^2-32F^2\sin(\tfrac{\delta}{2})^2sd^2+3\rho 1^2M^2sa^4-2\rho 1^2M^2sa^2sd^2+3\rho 1^2M^2sd^4))/8-32F^4\sin(\tfrac{\alpha}{2})^2\sin(\tfrac{\delta}{2})^2)/(4\rho 1^2M^2-4F^2))\wedge(1/2)/2\sin(\tfrac{\alpha}{2})^2-2\sin(\tfrac{\delta}{2})^2) \tag{Eq. (57)}$$

A more accurate average value for W can be derived numerically. It has been noticed, by comparison, that variations lower than 5% on the maximum aberration values are obtained by adopting the numerical or the approximated analytical value for W.

In line with the above, the present disclosure provides a discrete lens (or a beamforming network), for example as described in conjunction with FIG. 1, wherein, for each pair of homologous discrete elements, the respective homologous discrete elements of the front aperture and the back aperture in the pair have identical azimuth angles (with the azimuth angles being defined in a plane orthogonal to the center axis of the discrete lens). The front aperture is shaped as a flat surface and the back aperture is shaped as a portion of a saddle surface with a single saddle point located on the center axis. Further, the back aperture is symmetric with respect to a first plane along the center axis and a second plane along the center axis, with the first and second planes being orthogonal to each other. This discrete lens has four focal points located in the propagation part, with a first pair of focal points located in the first plane and a second pair of focal points located in the second plane.

Further, a first focal distance of the first pair of focal points (common focal distance of the first pair of focal points) and a second focal distance of the second pair of focal points (common focal distance of the second pair of focal points) are substantially identical, while the inclination angles are different from each other. In other words, a first inclination angle relative to the center axis of the first pair of focal points (common inclination angle of the first pair of focal points) is different from a second inclination angle relative to the center axis of the second pair of focal points (common inclination angle of the second pair of focal points).

Notably, this discrete lens is feasible with and without zooming (i.e., for arbitrary zooming factor M), as any of the discrete lenses described in this section.

I. Discrete Lens with 4 Foci, Radially Aligned Elements, Back and Front Profile not Rotationally Symmetric Another example implementation of the present disclosure relates to a three-dimensional discrete lens with rotationally asymmetric front and back profiles (apertures), radially aligned discrete elements of the front and back apertures, and four perfect focal points. Two foci are located in the XZ plane and two foci are located in the YZ plane. F (or f) again is the focal distance for the two symmetric foci in the XZ plane and G (or g) is the focal distance for the two symmetric foci in the YZ plane. The relationships Fca=Gcd=Gsa=H (i.e., a and δ complementary and all foci coplanar) are enforced and homologous discrete elements are assumed to be radially aligned (i.e., homologous discrete elements have identical azimuthal angle ϕ). Z, Z1 and W are assumed to not be rotationally symmetric. Using these assumptions, solving the lens equations will yield $$X=(X1M(((X1^2M^2ca^2sa^4-Y1^2M^2ca^4sa^2+H^2ca^4-H^2sa^4)/((ca-sa)(ca+sa)))\wedge(1/2)-Y1Mca\ sa))/H+X1Y1M^2ca\ sa)/H \tag{Eq. (58)}$$

$$Y=XY1/X1 \tag{Eq. (59)}$$

$$Z=-(H^2-((X1^4M^4ca^2sa^4+X1^2Y1^2M^4ca^4sa^2-X1^2Y1^2M^4ca^2sa^4-X1^2H^2M^2ca^4+X1^2H^2M^2ca^2sa^2+X1^2H^2M^2sa^4+Y1^4M^4ca^4sa^2-Y1^2H^2M^2ca^4-Y1^2H^2M^2ca^2sa^2+Y1^2H^2M^2sa^4+H^4ca^2-H^4sa^2)/((ca-sa)(ca+sa)))\wedge(1/2))/H \tag{Eq. (60)}$$

$$Z1=-(((Hca-Hsa-ca((\frac{X1^2M^2ca^2sa^4-Y1^2M^2ca^4sa^2+H^2ca^4-H^2sa^4}{(ca-sa)(ca+sa)})^{\frac{1}{2}}-Y1Mca\ sa)+ \tag{Eq. (61)}$$

-continued $$sa\Bigg(\bigg(\frac{X1^2M^2ca^2sa^4 - Y1^2M^2ca^4sa^2 + H^2ca^4 - H^2sa^4}{(ca-sa)(ca+sa)}\bigg)^{\frac{1}{2}} -$$

$$Y1Mca\ sa\Bigg) + Y1Mca\ sa^2 - Y1Mca^2sa\Bigg)\Bigg)\Big/$$

$$\Big(ca\ sa(1-M^2ca^2)^{\frac{1}{2}} - ca\ sa(1-M^2sa^2)^{\frac{1}{2}}\Big)$$

$$W = -\Bigg(\Bigg(Hca(1-M^2sa^2)^{\frac{1}{2}} - Hca(1-M^2ca^2)^{\frac{1}{2}} - ca(1-M^2sa^2)^{\frac{1}{2}} \qquad \text{Eq. (62)}$$

$$\Bigg(\bigg(\frac{X1^2M^2ca^2sa^4 - Y1^2M^2ca^4sa^2 + H^2ca^4 - H^2sa^4}{(ca-sa)(ca+sa)}\bigg)^{\frac{1}{2}} -$$

$$Y1Mca\ sa\Bigg) + sa(1-M^2ca^2)^{\frac{1}{2}}$$

$$\Bigg(\bigg(\frac{X1^2M^2ca^2sa^4 - Y1^2M^2ca^4sa^2 + H^2ca^4 - H^2sa^4}{(ca-sa)(ca+sa)}\bigg)^{\frac{1}{2}} -$$

$$Y1Mca\ sa\Bigg) + Y1Mca\ sa^2(1-M^2ca^2)^{\frac{1}{2}} -$$

$$Y1Mca^2sa(1-M^2sa^2)^{\frac{1}{2}}\Bigg)\Bigg)\Big/$$

$$\Big(ca\ sa(1-M^2ca^2)^{\frac{1}{2}} - ca\ sa(1-M^2sa^2)^{\frac{1}{2}}\Big)$$

In line with the above, the present disclosure provides a discrete lens (or a beamforming network), for example as described in conjunction with FIG. 1, wherein, for each pair of homologous discrete elements, the respective homologous discrete elements of the front aperture and the back aperture in the pair have identical azimuth angles (with the azimuth angles being defined, as usual, in a plane orthogonal to the center axis of the discrete lens). This discrete lens has four focal points located in the propagation part, with a first pair of focal points located in a first plane along the center axis, and a second pair of focal points located in a second plane along the center axis, the first and second planes being orthogonal to each other. Moreover, the relationship f·cos (α)=g·cos(δ)=g·sin(α) holds between focal lengths and inclination angles relative to the center axis for the focal points of the first and second pairs of focal points, where f is the focal length of the first pair of focal points, α is the inclination angle of the first pair of focal points, g is the focal length of the second pair of focal points, and δ is the inclination angle of the second pair of focal points.

Notably, this discrete lens is feasible with and without zooming (i.e., for arbitrary zooming factor M), as any of the discrete lenses described in this section.

J. Discrete Lens with 4 Foci, Phase Shifters Equal to the Distance Between Homologous Elements Another example implementation of the present disclosure relates to a three-dimensional discrete lens with four perfect focal points, for which the phase shifts (given by W) are equal to the (physical) distance between homologous discrete elements (up to an optional common length offset of the transmission lines). Three foci exhibit an equiangular distance (i.e., angular distance 120°) and one is placed at the center (e.g., on the center axis). The lateral focal length F is equal to the axial focal length H. Then, the phase shift W (corresponding to the length of the transmission lines) is given by $$W = sqrt\big((X1-X)^2 + (Y1-Y)^2 + (Z1-Z)^2\big) \qquad \text{Eq. (63)}$$

The unknowns X, Y, Z1, W can be evaluated as a function of the solution of a $4^{th}$ degree equation or numerically (e.g., by numerically fixing F=H, α, α1, X1 and Y1). This configuration is interesting in that it allows to employ straight transmission lines with minimized length.

In line with the above, the present disclosure provides a discrete lens (or a beamforming network), for example as described in conjunction with FIG. 1, wherein, for each pair of homologous discrete elements, the length of the respective transmission line is given by the three-dimensional distance between the pair of homologous discrete elements, plus an optional common length offset. This discrete lens has four focal points located in the propagation part, one of them located on the center axis of the discrete lens, and the remaining three located off the center axis, in a common plane perpendicular to the center axis, with equal angular distances between their respective azimuth angles (with the azimuth angles being defined, as usual, in the common plane).

Notably, this discrete lens is feasible with and without zooming (i.e., for arbitrary zooming factor M), as any of the discrete lenses described in this section.

K. Discrete Lens with 4 Foci, Phase Shifters Identical

Another example implementation of the present disclosure relates to a three-dimensional discrete lens with identical phase shifts (identical transmission line lengths) W and four perfect focal points. Two foci are located in the XZ plane and two foci are located in the YZ plane. The transmission lines lengths W are identical. This configuration is of interest in case a minimization and equalization of the losses in the transmission lines is desired. Solutions with zooming can be derived but the resulting equations are not presented here for reasons of conciseness. In the case without zooming (i.e., for M=1), two solutions are available, one with both Z and Z1 positive, and one with both Z and Z1 negative. They solutions are available analytically in closed form, but not presented here for reasons of conciseness. The angles defining the focal points in the two principal planes can be identical but the corresponding focal lengths, F and G (or f and g), have to be different (e.g., different by 10 to 15%).

In line with the above, the present disclosure provides a discrete lens (or a beamforming network), for example as described in conjunction with FIG. 1, wherein lengths of the plurality of transmission lines are substantially identical. This discrete lens has four focal points located in the propagation part, with a first pair of focal points located in a first plane along the center axis of the discrete lens, and a second pair of focal points located in a second plane along the center axis, the first and second planes being orthogonal to each other.

Notably, this discrete lens is feasible with and without zooming (i.e., for arbitrary zooming factor M), as any of the discrete lenses described in this section.

L. Discrete Lens with 4 Foci, Homologous Elements Characterized by the Same Radius but Different Angles Further example implementations of the present disclosure relate to three-dimensional discrete lenses with four perfect focal points, for which homologous discrete elements are located at the same radius, but have different azimuthal angles. Two possible architectures have been identified.

A first three-dimensional discrete lens has four coplanar perfect foci, with three foci at equiangular spacing (i.e., angular distance of 120°) and one central focus (e.g., on the center axis). The distance of homologous discrete elements of the front and back apertures from the center (center axis) is identical while, their azimuthal angles are not identical. The solutions are available analytically in a closed form, but are not presented here for reasons of conciseness.

A second three-dimensional discrete lens has four coplanar perfect foci (two in the XZ plane, two in the YZ plane). The distance of homologous discrete elements of the front and back apertures from the center again is identical, while their azimuthal angles are not identical. The solutions are available analytically in a closed form but not presented here for reasons of conciseness (noting that one out of eight solutions is optimal). Angles $\alpha$ and $\delta$ have to be (sufficiently) different from each other, since if $\delta$ tends to $\alpha$, the results diverge. The first of the two architecture seems preferable over the second one.

In line with the above, the present disclosure provides a discrete lens (or a beamforming network), for example as described in conjunction with FIG. 1, wherein, for each pair of homologous discrete elements, the respective homologous discrete elements of the front aperture and the back aperture in the pair have substantial identical radial excursions from the center axis of the discrete lens. This discrete lens has four focal points located in the propagation part, one of them located on the center axis, and the remaining three located off the center axis, in a common plane perpendicular to the center axis, with equal angular distances between their respective azimuth angles (the azimuth angles being defined in the common plane, as usual).

Further line with the above, the present disclosure provides a discrete lens (or a beamforming network), for example as described in conjunction with FIG. 1, wherein, for each pair of homologous discrete elements, the respective homologous discrete elements of the front aperture and the back aperture in the pair have substantial identical radial excursions from the center axis of the discrete lens. This discrete lens has four focal points located in the propagation part, with a first pair of focal points located in a first plane along the center axis, and a second pair of focal points located in a second plane along the center axis, the first and second planes being orthogonal to each other.

Notably, these discrete lenses are feasible with and without zooming (i.e., for arbitrary zooming factor M), as any of the discrete lenses described in this section.

M. Discrete Lenses with 5 Focal Points

Another example implementation of the present disclosure relates to discrete lenses with five perfect focal points.

This three-dimensional discrete lens exhibits 5 foci. Preliminary work on bootlace lenses with five foci is reported in C. M. Rappaport; J. Mason, "A five focal point three-dimensional bootlace lens with scanning in two planes," IEEE Antennas and Propagation Society International Symposium 1992, Page 1340-1343 vol. 3. The present disclosure, for the first time, derives analytical equations.

The configuration found most promising in this context is a configuration with Fca=H=Gcd. It has five coplanar foci located in a plane orthogonal to the lens axis and is thereby able to provide scanning capability in the entire three-dimensional space. The angles $\alpha$ and $\delta$ characterizing the position of the foci in the two principal planes (i.e., XZ and YZ) shall not be identical. Actually, the performance improves when increasing the separation angle between these two angles. Good values have been verified for an example configuration with $\alpha=30°$ and $\delta=60°$.

The unknowns are derived, after manipulating the equations and finally solving a third degree equation. The three solutions of these equations can be real and/or complex. Of course, only real solutions are of interest for the intended purpose. As a particular case, by enforcing a and $\delta$ complementary (i.e., $\delta=90°-\alpha$) and $\alpha1=\delta1=45°$ (i.e., $\alpha1=\delta1$ pointing in the intermediate direction between a and 8), the solutions will become mathematically simpler and the simplified analytical solutions presented below can be derived.

Some comments may be in order:

1) Since the five foci are well distributed in two orthogonal planes, good three-dimensional scanning capabilities are expected;
2) The resulting equations are simple and the foci are coplanar;
3) A trade-off is required for the selections of $\alpha$ and $\delta$. If $\alpha$ and $\delta$ are complementary (i.e., $\alpha+\delta=90°$ and quite different from each other (for instance $\alpha=30°$ and $\delta=60°$), and both $\alpha1$ and $\delta1$ are equal to 45°, the variable X results to be larger than X1. In the perpendicular plane, the variable Y results to be smaller than Y1. Thus, one has to accept that the back aperture will be enlarged in one plane and reduced in dimension in the perpendicular plane as compared to the front lens aperture, so that different geometrical distortions will appear in the two orthogonal principal planes. These opposite distortions in the two principal planes are natural, considering that the impinging angle of the spherical wave in one plane is lower than 45° while it is larger than 45° in the other plane, and in both planes the angle of the emerging plane waves is exactly 45°. In other words, in one plane there is a zooming factor larger than 1 and in the other plane there is a zooming factor smaller than 1.
4) If it is desired to maintain the back aperture quite similar to the front aperture, $\alpha$ and $\delta$ should be selected closer in size (for instance 40° and 50°), still maintaining them complementary. However, in this case, the profiles will become less flat, so that the overall lens thickness will increase. If $\alpha1=\delta1=45°$ is not enforced, the five foci lens can be derived by solving an equation of 3rd degree.

Assume X1 and Y1 as independent variables, the most convenient assumptions for enforcing five perfect foci are the following:

$$H = Fca = Gcd, \quad \delta = 90° - \alpha, \quad \alpha 1 = \delta 1 = 45° \qquad \text{Eq. (64)}$$

The five unknowns completely characterizing the lens can be derived analytically and are given by:

$$X = \left(\sqrt{2}\,X1\left(saX1^2ca^2 - saY1^2ca^2 + 4H^2ca - 4saH^2\right)\right)/\left(8Hsa(Hca - Hsa)\right) \qquad \text{Eq. (65)}$$

-continued $$Y=\left(\sqrt{2}\,Y1\left(caX1^2sa^2-caY1^2sa^2-4h^2sa+4cah^2\right)\right)/(8Hca(Hca-Hsa)) \qquad \text{Eq. (66)}$$

$$\begin{aligned}W=&\\ &\Big(\sqrt{2}\Big(6\Big(\Big(\Big(2\sqrt{2}-3\Big)\Big(X1^4ca^2sa^2-2X1^2Y1^2ca^2sa^2+8X1^2H^2ca^2-\\ &8X1^2H^2ca\,sa+Y1^4ca^2sa^2-8Y1^2H^2ca\,sa+8Y1^2H^2sa^2+\\ &16H^4ca^2-32H^4ca\,sa+16H^4sa^2\Big)\Big)/\Big(2\Big(12\sqrt{2}-17\Big)\Big)\Big)\hat{}\Big(1/2\Big)-\\ &8H^2ca-4\sqrt{2}\Big(\Big(\Big(2\sqrt{2}-3\Big)\Big(X1^4ca^2sa^2-2X1^2Y1^2ca^2sa^2+\\ &8X1^2H^2ca^2-8X1^2H^2ca\,sa+Y1^4*ca^2sa^2-8Y1^2H^2ca\,sa+\\ &8Y1^2H^2sa^2+16H^4ca^2-32H^4ca\,sa+16H^4sa^2\Big)\Big)/\Big(2\Big(12\sqrt{2}-\\ &17\Big)\Big)\Big)\hat{}\Big(1/2\Big)+8H^2sa+4\sqrt{2}\,H^2ca-4\sqrt{2}\,H^2sa-2X1^2ca\,sa+\\ &2Y1^2ca\,sa+\sqrt{2}\,X1^2ca\,sa-\sqrt{2}\,Y1^2ca\,sa\Big)\Big)/\Big(8\Big(3Hca-\\ &3Hsa-2\sqrt{2}\,Hca+2\sqrt{2}\,Hsa\Big)\Big)-\Big(X1^2ca\,sa-\\ &Y1^2ca\,sa\Big)/(4Hca-Hsa)\Big)\end{aligned} \qquad \text{Eq. (67)}$$

$$\begin{aligned}Z1=&\Big(6\Big(\Big(\Big(2\sqrt{2}-3\Big)\Big(X1^4ca^2sa^2-2X1^2Y1^2ca^2sa^2+8X1^2H^2ca^2-\\ &8X1^2H^2ca\,sa+Y1^4ca^2sa^2-8Y1^2H^2ca\,sa+8Y1^2H^2sa^2+\\ &16H^4ca^2-32H^4ca\,sa+16H^4sa^2\Big)\Big)/\Big(2\Big(12\sqrt{2}-17\Big)\Big)\Big)\hat{}(1/2)-\\ &8H^2ca-4\sqrt{2}\Big(\Big(\Big(2\sqrt{2}-3\Big)\Big(X1^4ca^2sa^2-2X1^2Y1^2ca^2sa^2+\\ &8X1^2H^2ca^2-8X1^2H^2ca\,sa+Y1^4ca^2sa^2-8Y1^2H^2ca\,sa+\\ &8Y1^2H^2sa^2+16H^4ca^2-32H^4ca\,sa+16H^4sa^2\Big)\Big)/\Big(2\Big(12\sqrt{2}-\\ &17\Big)\Big)\Big)\hat{}\Big(1/2\Big)+8H^2sa+4\sqrt{2}\,H^2ca-4\sqrt{2}\,H^2sa-2X1^2ca\,sa+\\ &2Y1^2ca\,sa+\sqrt{2}\,X1^2ca\,sa-\sqrt{2}\,Y1^2ca\,sa\Big)/\Big(4\Big(3Hca-\\ &3Hsa-2\sqrt{2}\,Hca+2\sqrt{2}\,Hsa\Big)\Big)\end{aligned} \qquad \text{Eq. (68)}$$

$$\begin{aligned}Z=-\Bigg(\Bigg(\Big(&-\frac{X1^6ca^6sa^2}{8}+\frac{X1^4Y1^2ca^6sa^2}{4}-\frac{X1^4Y1^2ca^2sa^6}{8}-\\ &X1^4H^2ca^5sa+\frac{X1^4H^2ca^4sa^4}{4}+X1^4H^2ca^4sa^2-\\ &\frac{X1^2Y1^4ca^6*sa^2}{8}+\frac{X1^2Y1^4ca^2sa^6}{4}+X1^2*Y1^2H^2ca^5sa-\\ &\frac{X1^2Y1^2H^2ca^4sa^4}{2}-X1^2Y1^2H^2ca^4sa^2-X1^2Y1^2H^2ca^2sa^4+\\ &X1^2Y1^2H^2casa^5+2X1^2H^4ca^4sa^2-2X1^2H^4ca^4-\\ &2X1^2H^4ca^3sa^3+4X1^2H^4ca^3sa-2X1^2H^4ca^2sa^2-\frac{Y1^6ca^2sa^6}{8}+\\ &\frac{Y1^4H^2ca^4sa^4}{4}+Y1^4H^2ca^2sa^4-Y1^4H^2ca\,sa^5-2Y1^2H^4ca^3sa^3+\\ &2Y1^2H^4ca^2sa^4-2Y1^2H^4ca^2sa^2+4Y1^2H^4casa^3-\\ &2Y1^2H^4sa^4+4H^6ca^4sa^2-8H^6ca^3sa^3+4H^6ca^2sa^4\Bigg)^{\frac{1}{2}}+\\ &2H^3ca\,sa^2-2H^3ca^2sa\Bigg)/\Big(2\Big(H^2ca\,sa^2-H^2ca^2sa\Big)\Big)\end{aligned} \qquad \text{Eq. (69)}$$

In line with the above, the present disclosure provides a discrete lens (or a beamforming network), for example as described in conjunction with FIG. 1, wherein the discrete lens has five focal points located in the propagation part in a common plane orthogonal to the center axis of the discrete lens. One of the focal points is located on the center axis, a first pair of focal points is located off the center axis, in a first plane along the center axis, and a second pair of focal points is located off the center axis, in a second plane along the center axis. Here, the first and second planes are understood to be orthogonal to each other. For these focal points, the relationship f·cos(α)=g·cos(δ) holds between focal lengths and inclination angles relative to the center axis for the focal points of the first and second pairs of focal points, where f is the focal length of the first pair of focal points (common focal distance of the first pair of focal points), α is the inclination angle of the first pair of focal points (common inclination angle of the first pair of focal points), g is the focal length of the second pair of focal points (common focal distance of the second pair of focal points), and δ is the inclination angle of the second pair of focal points (common inclination angle of the second pair of focal points).

Preferably, a sum of the inclination angle α of the first pair of focal points and the inclination angle δ of the second pair of focal points substantially equals 90 degrees, i.e., α+δ=90°. Further preferably, angles α and δ are (sufficiently) different from each other, such as α=30° and δ=60° (or vice versa), for example. Additionally or alternatively, a pointing angle $\alpha_1$ corresponding to the first pair of focal points and a pointing angle $\delta_1$ corresponding to the second pair of focal points are each substantially equal to 45 degrees, i.e., α1≈45°≈δ1.

Notably, this discrete lens is feasible with and without zooming (i.e., for arbitrary zooming factor M), as any of the discrete lenses described in this section.

N. Discrete Lenses with a Single Focal Point and Radially Aligned Elements

Another example implementation of the present disclosure relates to a discrete lens with a single focal point and radially aligned discrete elements of the front and back apertures. This means that for a pair of homologous discrete elements, azimuthal angles ϕ1 and ϕ of the discrete elements of the front aperture and the back aperture, respectively, are equal to each other, ϕ1=ϕ. The front aperture is flat, Z1=0. Further, a ratio of radii (radial extensions) ρ1 and ρ of homologous discrete elements of the front and back apertures, respectively, is given by an inverse of the zooming factor M, ρ=ρ1. M. The back profile Z can be selected arbitrarily, based on amplitude matching and a desired flatness of the back profile. Notably, the flatter the back profile, the greater the distance between the optimum focal arc and the discrete lens. With these assumptions, the phase shifts W can be derived such that a single perfect focal point is obtained.

In line with the above, the present disclosure provides a discrete lens (or a beamforming network), for example as described in conjunction with FIG. 1, wherein the front aperture is shaped as a flat surface. For each pair of homologous discrete elements, the respective homologous discrete elements of the back aperture and the front aperture in the pair have substantial identical azimuthal angle. Further, for each pair of homologous discrete elements, a ratio between the radial excursions of the respective homologous discrete elements of the back aperture and the front aperture in the pair is substantially equal to the zooming factor. This discrete lens has one focal point located in the propagation part on the center axis.

Notably, this discrete lens is feasible with and without zooming (i.e., for arbitrary zooming factor M), as any of the discrete lenses described in this section.

It is noted that for any of the above lens configurations according to the present disclosure that do not feature radially aligned homologous elements (e.g., lens configurations C, E, F, G, J, K, L, and M described above), the density of discrete elements of the back aperture is distorted to be higher for azimuthal angles corresponding to the focal points and lower for azimuthal angles between the azimuthal angles corresponding to the focal points. Nonetheless, the distributions of discrete elements of the back and front apertures and their relationship (as implemented by the transmission lines connecting pairs of homologous discrete elements) features the same axial rotational symmetry as the focal points themselves (e.g., symmetry under rotation by 120° for three equi-angularly distributed off-axis focal points).

In other words, for a given first density of discrete elements of the front aperture, respective homologous discrete elements of the back aperture have a higher density compared to the first density in the vicinity of azimuthal angles of the focal points, and have a lower density compared to the first density for azimuthal angles substantially deviating from the azimuthal angles of the focal points. Accordingly, for each of the, for example, three or four focal points located off the center axis, for a given first density of discrete elements of the front aperture at an azimuth angle of the respective focal point, a second density of discrete elements of the back aperture at the azimuth angle of the respective focal point is higher than the first density. This means, for instance, that for at least discrete elements of the front aperture that have azimuth angles within a margin around the azimuth angles of a respective focal point, corresponding homologous discrete elements of the back aperture have smaller angular distances from the azimuth angle of the respective focal point than the respective homologous discrete elements of the front aperture. On the other hand, for a given third density of discrete elements of the front aperture at an azimuth angle far from the values associated with the focal points, a fourth density of discrete elements of the back aperture at the azimuth angle far the values associated to the focal points is lower than the third density.

Derivation of the Optimum Focal Surface

Only limited attention has been spent in the literature in the identification of the optimum focal surface that guarantees minimum optical aberrations. This investigation however is crucial in order to optimize a constrained lens. As noted above, it is difficult to identify and assess an optimum lens configuration. A properly defined objective consists in optimizing the optical aberrations while keeping the overall volume (including the front lens, the back lens and the focal surface) within an assigned envelope.

A simple method to find the optimum focal surface is based on a brute force enumerative approach. This method is not recommended because, especially for lenses characterized by a high number of foci, the lens behavior changes rapidly for small variations in the feed positions. A brute force approach may be feasible only for the refinement of a preliminary, acceptable, solution.

In the literature, in most contributions, linear, circular, elliptical or parabolic focal arcs have been considered. These profiles on average offer good performance in the entire field of view and are convenient for focal arc manufacturing. However, they do not represent the best choice to locally minimize the optical aberrations.

A proposed method for more accurately deriving the shape of the focal arc is described below. First of all, it is focused on a single point of the focal arc. The angle defining the position of this local feed as compared to the longitudinal lens axis is assigned, while the distance between this feed (represented by a spherical source in terms of Geometrical Optics (GO)) and the central point of the back lens is the unknown to derive. It can be verified that for an assigned arbitrary point of the lens, this unknown distance that guarantees zero aberrations in this arbitrary point may be derived analytically. This focal distance can be expressed by:

$$\text{f\_local} = -\Big(X^2 - W^2 + Y^2 + Z^2 - Z1^2 - X1^2M^2\sin(\alpha_{local})^2 + Z1^2M^2\sin(\alpha_{local})^2 + 2WZ1\big(1 - M^2\sin(\alpha_{local})^2\big)^{\frac{1}{2}} - 2WX1M\sin(\alpha_{local}) + 2X1Z1M\sin(\alpha_{local})\big(1 - M^2 * \sin(\alpha_{local})^2\big)^{\frac{1}{2}}\Big)\Big/\Big(2\Big(W + Z\cos(\alpha_{local}) - X\sin(\alpha_{local}) - Z1\big(1 - M^2\sin(\alpha_{local})^2\big)^{\frac{1}{2}} + X1M\sin(\alpha_{local})\Big)\Big) \quad \text{Eq. (70)}$$

It is important to note that this local focal distance guarantees zero aberrations in terms of geometrical optics only for an assigned angle of incidence and only in a single point of the lens, which is characterized by the variables X, Y, Z, W, X1, Z1. The above expression is valid for a rotationally symmetric lens assuming that the plane of incidence of the source (coinciding with the plane where the emerging plane wave is located) is the XZ plane. Of course, since the lens is rotationally symmetric, also the focal arc is rotationally symmetric and it is sufficient to optimize its shape in a single azimuthal plane. Eq. (70) can be simplified in case the lens has a flat front profile (i.e., Z1=0):

$$\text{f\_local} = -\big(X^2 - W^2 + Y^2 + Z^2 - X1^2M^2\sin(\alpha_{local})^2 - 2WX1M\sin(\alpha_{local})\big)/(2(W + Z\cos(\alpha_{local}) - X\sin(\alpha_{local}) + X1M\sin(\alpha_{local}))) \quad \text{Eq. (71)}$$

It is important to note that any focal distance, by definition, guarantees zero aberrations only in the central point of the lens. The method identified to derive the unknown local (i.e., valid for an assigned angle of incidence) focal distance, involves first deriving the focal distances which guarantee zero aberrations in a sufficiently high number of points of the lens. Then, for every of these focal distances, the maximum aberration on the entire lens is evaluated. The focal distance providing a minimum value for the maximum aberrations is selected. It should also be noted that to have an accurate value for this local focal distance, a sufficiently high number of points should be considered in the lens. The result found can then be used for a lens characterized by an arbitrary number of points and arbitrary dimensions for its elements. Finally it is interesting to note that the optimized local focal distance tends to guarantee zero aberration in up to five points of the lens: one in the center of the lens, two in the right as compared to the incidence azimuthal plane, and two symmetric in the left.

Finally, it is important to note that a priori selecting a focal surface with an assigned shape (e.g., spherical, planar, or ellipsoidal, etc.) that is not optimized point by point could result in errors significantly higher as compared to the ones obtained adopting the described procedure.

Numerical Results

A number of three-dimensional bootlace lens architectures have been proposed above. These three-dimensional discrete lens architectures are completely new and/or have not been explicitly formulated analytically before. This section is devoted to comparisons between the proposed discrete lenses. It is important to note that an optimum lens configuration cannot be easily derivable. A fair comparison implies a trade-off between scanning aberrations and the volume required to accommodate the lens and the optimum focal arc. In addition, having a free-space cavity, delimited by the back lens and the focal arc, that is as similar to a sphere as possible permits to maximize the amplitude matching between the feeds and the radiating elements in the back lens. In order to minimize the optical aberrations, one may enlarge the distance between the focal arc and the back lens. However, this implies more difficult accommodation in terms of volume. On the other hand, when trying to obtain a more compact lens architecture, with an optimum focal arc close to the back lens, limited performance in terms of optical aberrations has to be expected. In addition, similarly to the case of two-dimensional discrete lenses, when making the back lens flatter, the corresponding optimized focal arc becomes more curved and vice versa.

A first useful observation is that a curved front profile (i.e., $Z1 \neq 0$) does not add any significant improvement in terms of lens performance. This has been verified by comparing discrete lenses with flat and curved front profiles. For this reason, the corresponding numerical results are not shown. Five discrete lenses that seem particularly representative of the performance of all the 3D discrete lenses have been identified:

- a spherical-planar lens with a single axial focus (see discrete lens A described above).
- a McGrath-type lens with flat front and back profile with two superimposed foci in the lens axis (see discrete lens D described above);
- a Sole & Smith-type lens with 4 foci and flat front profile (see discrete lens E described above);
- the proposed lens with flat front and back profiles characterized by three foci off the central axis (see discrete lens (' described above); and
- the proposed lens with four foci, flat front profile, saddle-shaped back profile, radially aligned elements, F=G, and $\alpha \neq \delta$ (see discrete lens H described above).

The numerical results for these lenses are shown in FIG. 8, FIG. 9, and FIG. 10. Therein, the results relevant to the spherical-planar lens are represented by dashed lines, the results for the McGrath-type lens are represented by square points, the results for the Sole & Smith-type lens are represented by dotted lines, the results for the three-foci lens are represented by continuous lines, and the results for the four-foci lens are represented by dotted-dashed lines. Out of these five architectures, only the first one, the spherical-planar lens, is rotationally symmetric. The other lenses have been homogenized (by transforming them into rotationally symmetric lenses) in order to improve their performance and to improve their manufacturability. In FIG. 8 the case of a lens with front diameter equal to 302 is considered with magnification M=1. FIG. 9 shows results for M=0.5 and FIG. 10 for M=2.

Figure 8A:
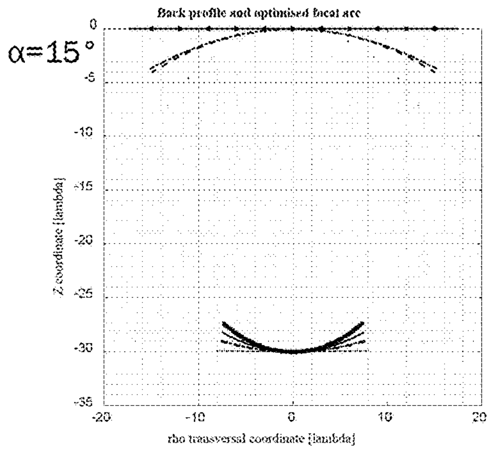
FIGS. 8A to 8F, FIGS. 9A to 9F, and FIG. 10A to 10F are diagrams showing examples of numerical results for a group of discrete lenses according to the present disclosure for different zooming factors and different maximum scanning angles.
Figure 8B:
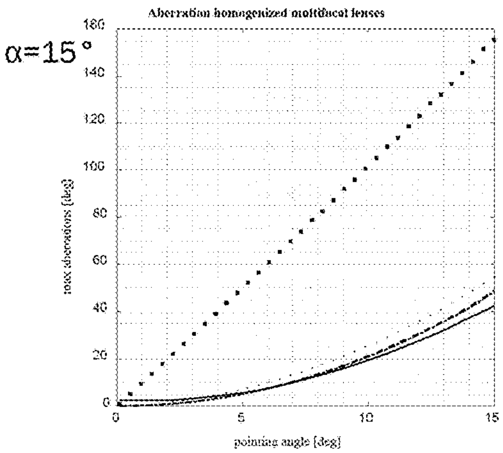
Figure 8C:
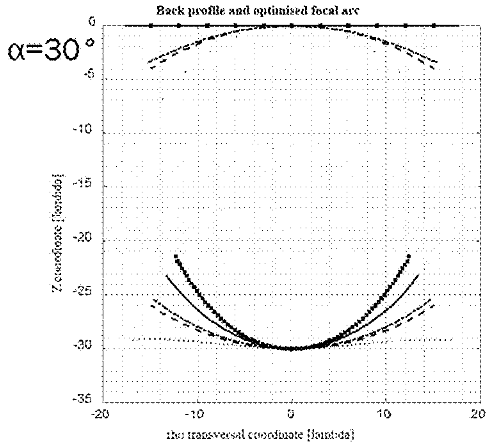
Figure 8D:
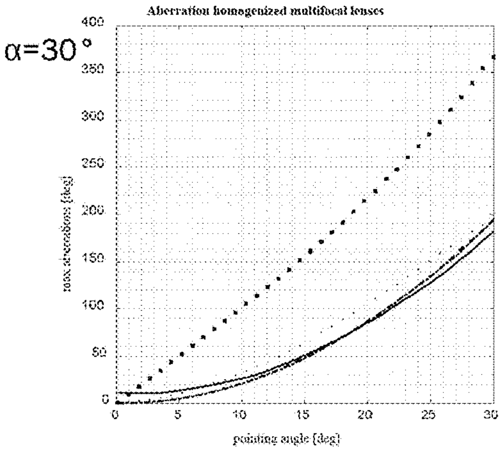
Figure 8E:
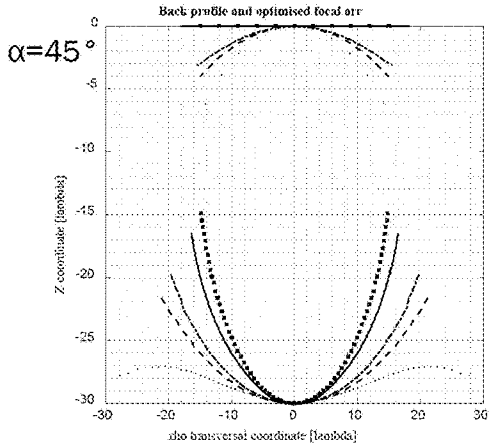
Figure 8F:
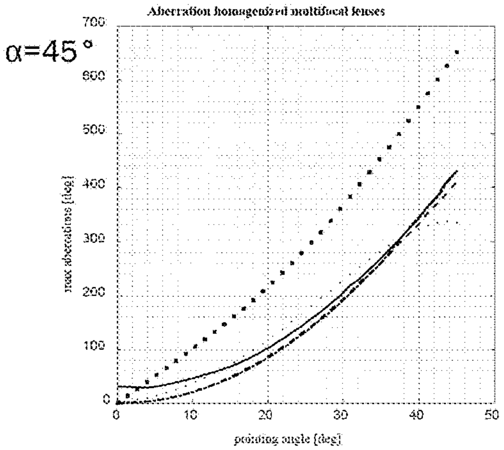
Figure 9A:
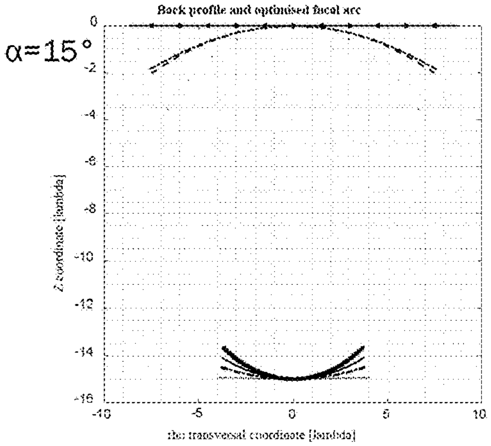
Figure 9B:
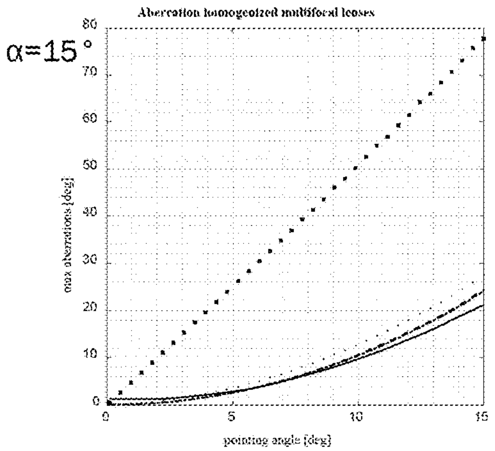
Figure 9C:
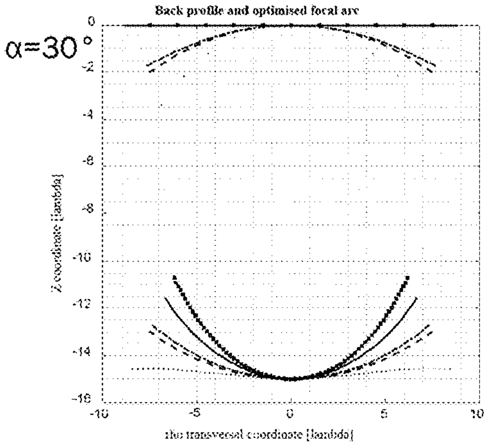
Figure 9D:
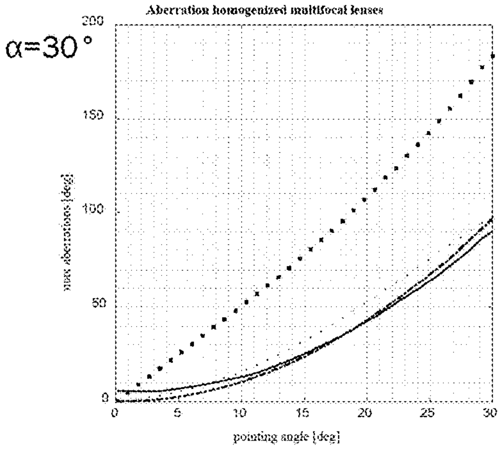
Figure 9E:
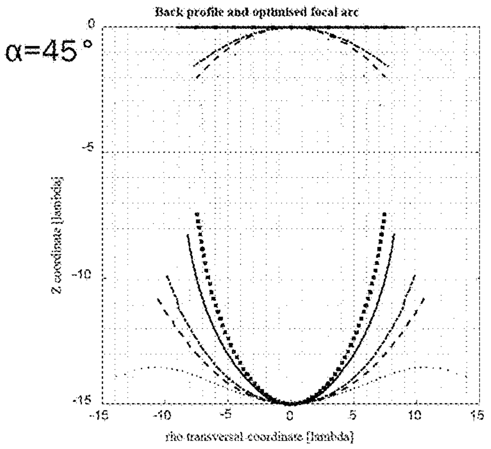
Figure 9F:
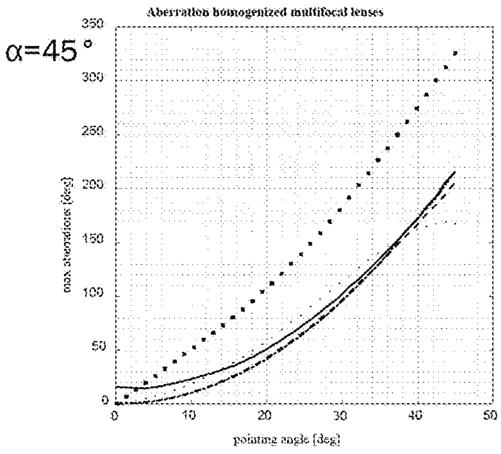
Figure 10A:
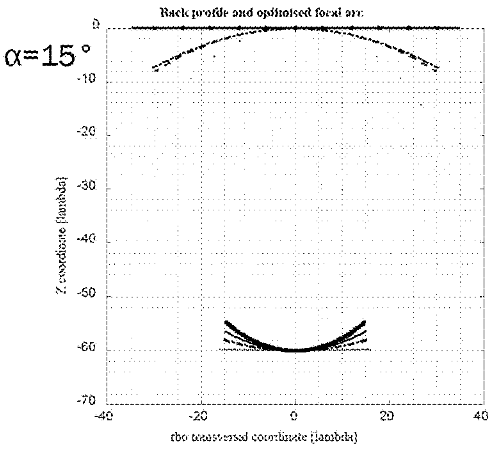
Figure 10B:
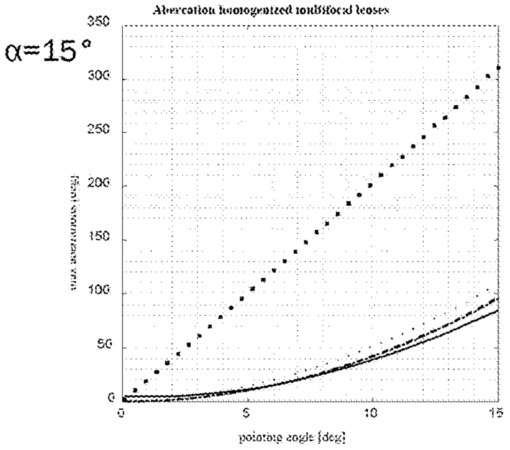
Figure 10C:
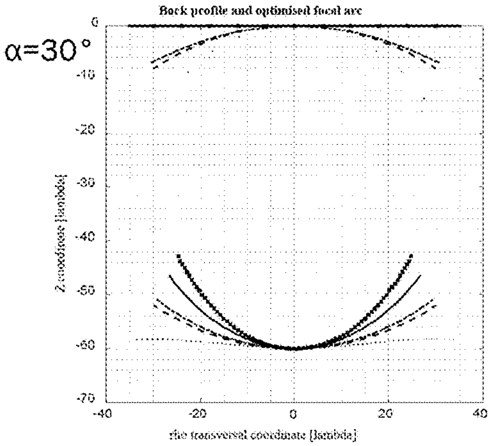
Figure 10D:
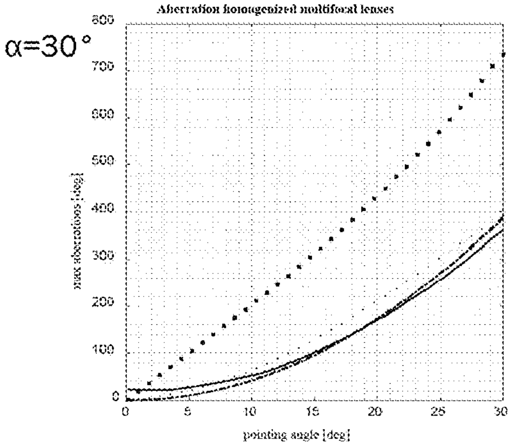
Figure 10E:
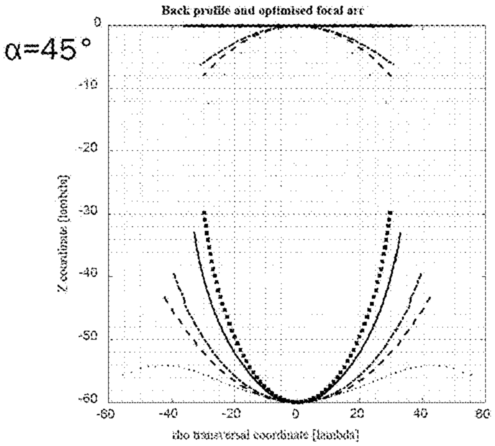
Figure 10F:
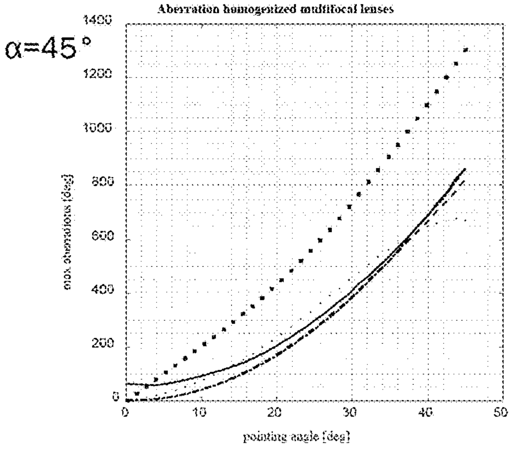

Three opening angles are considered: $\alpha$=15°, 30°, 45°. Specifically, FIGS. 8A, 9A, 10A show the shapes of the back profile and of the optimized focal arc for $\alpha$=15° (horizontal axis: $\rho$ transversal coordinate in units of $\lambda$; vertical axis: Z coordinate in units of $\lambda$). FIGS. 8B, 9B, 10B show the corresponding optical aberrations (horizontal axis: pointing angle in degrees; vertical axis: max aberrations in degrees). Further, FIGS. 8C, 9C, 10C show the shapes of the back profile and of the optimized focal arc for $\alpha$=30° and FIGS. 8D, 9D, 10D show the corresponding optical aberrations. Finally, FIGS. 8E, 9E, 10E show the shapes of the back profile and of the optimized focal arc for $\alpha$=45° and FIGS. 8F, 9F, 10F show the corresponding optical aberrations.

In order to have a fair comparison, the configurations are compared by enforcing that their optimized focal length along the axis are equal or very similar. This condition is important to arrive at architectures with similar accommodation constraints. For FIG. 8, the axial focal distance has a value close to the diameter of the front lens, i.e., $30\lambda$.

The two lenses with both back and front profiles flat, i.e., the McGrath-type lens and the proposed lens with three foci off the central axis, offer some simplifications in terms of manufacturing, partially balanced by the fact that the positions of homologous elements follow a quite non-linear relationship. Out of these two lenses, the proposed lens with three foci, after enforcing rotational symmetry by homogenization, provides significantly better aberrations as compared to the optimized McGrath-type lens. It may exhibit some residual aberrations on the lens axis, but having the three foci off the center axis permits much better control of the aberrations when the scanning angle increases.

The Sole & Smith-type lens, after enforcing rotational symmetry by homogenization, exhibits the best aberrations for large scanning angles. However, the corresponding optimized focal arc, as becomes evident when looking at the results for $\alpha$=45° (FIGS. 8E, 8F, FIGS. 9E, 9F, FIGS. 10E, 10F), tend to assume a shape less convenient for guaranteeing a good illumination of the lens from the focal arc.

Overall, the lens architectures which at the same time offer good aberrations vs scanning as well as a free-space cavity (delimited by the back lens and the focal arc) as similar to a sphere as possible are the spherical-planar lens with a single axial focus and the proposed four-foci lens with flat front profile, saddle-shaped back profile, aligned radially elements, F=G, and $\alpha \neq \delta$.

Another important result which can be derived from the results in FIG. 9 and FIG. 10 relates to the evolutions of the aberrations and focal arcs when changing the zooming factor M. As becomes apparent from comparing the results in FIGS. 8, 9, and 10, for a fixed dimension of the front lens and a fixed maximum scanning of the feeding array illuminating the back lens, aberrations are directly proportional to the zooming factor M.

The above considerations are valid for lenses for which the distance between the last feed (the one scanning the maximum angle from the lens axis) as compared to the lens axis is smaller than the lens radius. Lenses with larger field of view, for which the distance between the last feed as compared to the lens axis is larger than the lens radius, are presented below.

Afocal Architectures with Extended Field of View

Next, embodiments and implementations of the present disclosure relating to three-dimensional afocal discrete lenses will be discussed.

The general architecture of discrete lens beamforming networks and antennas has been discussed in detail above. The present section of this disclosure proposes a new type of afocal lenses optimized for large scanning angles. Under these conditions, the most severe optical aberrations are experienced. It will be shown that the results previously presented on three-dimensional discrete lens antennas can be further improved for lens antennas characterized by focal feeding arrays with a diameter exceeding the back lens diameter. When this condition applies, two significant improvements can be obtained: a reduction in the optical aberrations, and a reduction of the optimized focal distances with an improvement in terms of accommodation.

Enforcing a Chebyshev-Like Condition for the Maximum Aberrations on the Rim of the Lens The proposed lens formulation has been derived starting from the following consideration: the maximum aberrations for an arbitrary pointing angle are typically associated with the most peripheral points of the lens. This observation is generally valid for rotationally symmetric 3D lenses and allows to focus attention on the evolutions of maximum aberrations along the external rim of a the three-dimensional lens. Assuming that the lens is rotationally symmetric, the external rim can be considered to be circular.

Figure 11:
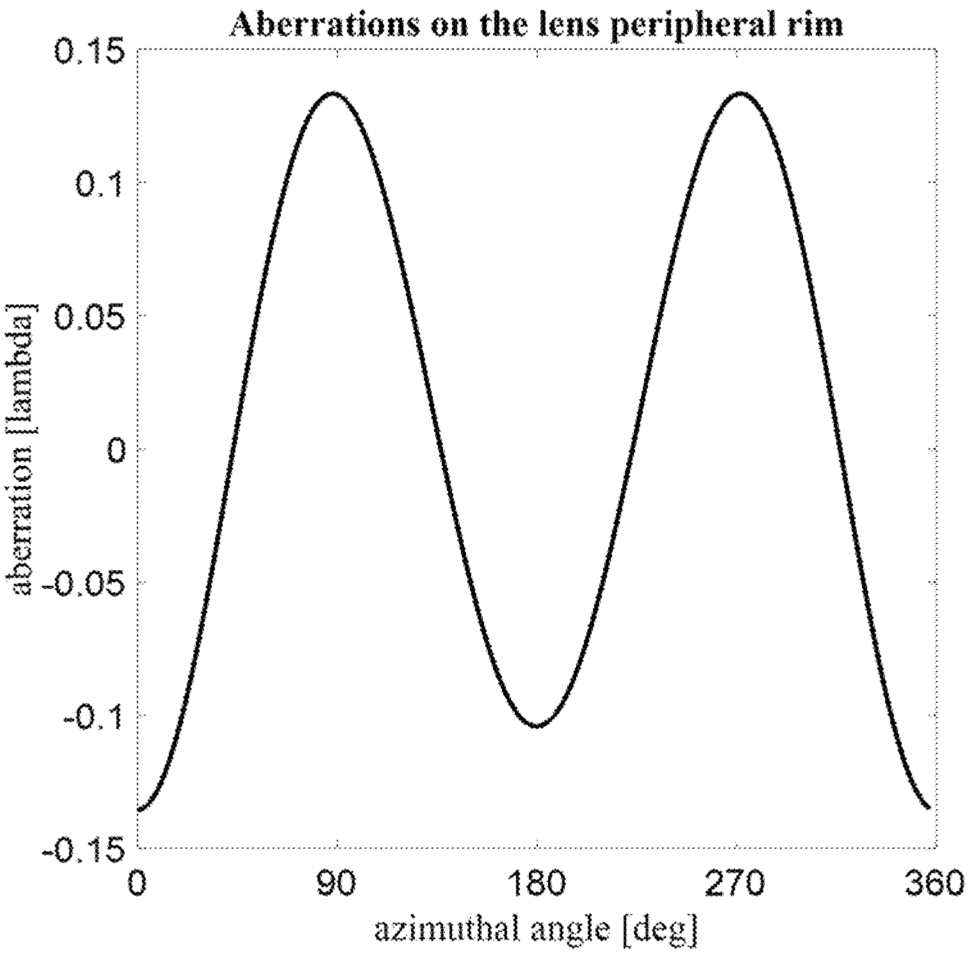
FIG. 11 is a diagram showing an example of the optical aberrations for a discrete lens when the peripheral rim of the back aperture of the discrete lens is illuminated.

As an illustrative example, a discrete lens with unitary zooming factor (i.e., M=1), maximum scanning angle 60°, and a diameter of the front lens equal to 30 wavelengths is taken. When considering large scanning angles, such as 60°, the differences in performance between various lenses tend to be large. Accordingly, it is useful to focus one's attention on this type of large scanning, trying to possibly improve the performance achievable with multifocal bootlace lenses. For the example, it is assumed that the feeding point is located in a point characterized by the following coordinates expressed in wavelengths: (30 sin(60°),0,−30 cos(60°)). FIG. 11 shows the optical aberrations (expressed in degrees) for the present example, for the specific case of the three-focal constrained lens with flat back and front profile presented above (discrete lens A), when illuminating only the peripheral rim of the back aperture, as a function of the azimuthal angle. In the abscise axis the azimuthal angle ranging from 0° to 360° is shown. It is understood that similar results would be obtained for the other configurations described above.

In FIG. 11, real instead of absolute values are plotted in order to better visualize the evolutions of the aberrations. The resulting curve exhibits a sort of sinusoidal behavior. However, the maximum and the minimum values are not opposite values. This is not a surprise: the source illuminating the lens is not located on the central axis (i.e., a skew incidence condition is considered) so there is no reason expecting to obtain aberrations along the rim exhibiting identical maximum and minimum values. Still, the values obtained when the azimuth ranges from 0° to 180° coincide with the values obtained when the azimuth ranges from 180° to 360°.

Starting from the previous considerations, the present disclosure proposes a new strategy for defining or designing 3D discrete lenses.

The position of the feed can be defined in terms of cartesian coordinates as $$Fx = F\sin(\alpha),\ Fy = 0,\ Fz = -F\cos(\alpha) \quad \text{Eq. (72)}$$

Where, as above, sa=sin α, ca=cos(α), and a is the maximum scanning angle of the lens.

Indicating with R the maximum radius of the back lens and with R1 the maximum radius of the front lens, and assuming the lens rotationally symmetric, the following relations are valid $$X = R\cos(\phi),\ Y = R\sin(\phi),\ X1 = R1\cos(\phi),\ Y1 = R1\sin(\phi) \quad \text{Eq. (73)}$$

The feeding point is considered fixed, like the maximum scanning angle α and the maximum radius of the front lens R1. The four unknowns of the lens then are R, Z, W and Z1. The aberrations in an arbitrary point of the external rim of the lens can be written as $$\text{aberrations} = sqrt\left((Fx - X)^2 + Y^2 + (Fz - Z)^2\right) + W + X1\, sa\, M - Z1\, sqrt\left(1 - (sa\, M)^2\right) - F \quad \text{Eq. (74)}$$

and the optical aberrations at selected values of the azimuthal angle ϕ can be defined as $$\text{aberrations}_0 = \text{aberrations(evaluted for } \phi = 0°) \quad \text{Eq. (75)}$$

$$\text{aberrations}_{05} = \text{aberrations(evaluated for } \phi = 90°) \quad \text{Eq. (76)}$$

$$\text{aberrations}_1 = \text{aberrations(evaluated for } \phi = 180°) \quad \text{Eq. (77)}$$

According to the present disclosure, the aberrations in ϕ=0° are forced to be identical in absolute value, but with opposite sign, as compared to the aberrations in ϕ=90°. As a second equation, the aberrations in ϕ=90° are forced to be identical in absolute value, but with opposite sign, as compared to the aberrations for ϕ=180°. These two equations permit forcing the aberrations on the lens rim to have identical positive and negative maximum excursions. This represents a locally optimum condition. In fact, when deviating from this condition, either the positive aberrations either the negative become dominant with an overall increase of the absolute value of the maximum aberrations.

The 3D lens has, in general, five degrees of freedom. These are reduced to four when enforcing rotational symmetry. One additional degree of freedom can be spent in enforcing the front profile of the lens to be flat (i.e., Z1=0). At this point, three quantities remain unknown: Z, W, R, i.e., the rotationally symmetric profile of the back lens, the phase shifts W (e.g., implemented by the lengths of the transmission lines), and the relation between the radial coordinate R1 in the front lens (assumed to be known) and the corresponding radial coordinate R in the back lens aperture. By solving the two equations corresponding to the two properties described above, $$\text{aberrations}_0 = -\text{aberrations}_{05} \quad \text{Eq. (78)}$$

$$\text{aberrations}_{05} = -\text{aberrations}_1 \quad \text{Eq. (79)}$$

two of the three unknowns can be derived.

In line with the above, FIG. 12 illustrates a method 1200 of designing a three-dimensional discrete lens for a beamforming network. As described in conjunction with FIG. 1 above, the discrete lens has a front aperture and a back aperture, each comprising a plurality of discrete elements. Each discrete element of the back aperture is homologous to a respective discrete element of the front aperture, and the discrete lens further comprises a plurality of transmission lines connecting respective pairs of homologous discrete elements of the front aperture and the back aperture. The method 1200 comprises method steps S1210 through S1220.

At step S1210, a shape of the front aperture, a shape of the back aperture, a relationship between homologous discrete elements on the front and back apertures, respective lengths of the transmission lines between homologous discrete elements, and an optical aberration for locations on a rim of the back aperture, when illuminated from a feeding point arranged at a predetermined maximum scanning angle, are parameterized in terms of two variables describing locations in a plane orthogonal to a center axis of the discrete lens. This will yield a parameterization of the discrete lens.

At step S1220, a set of lens equations for the discrete lens is solved, using the parameterization of the discrete lens, while enforcing first to third conditions. This will yield the shape of the back aperture, the relationship between homologous discrete elements on the front and back apertures, and the respective lengths of the transmission lines between homologous discrete elements, as functions of the two variables describing locations in the plane orthogonal to the center axis. The first condition is that the discrete lens is axially rotationally symmetric. The second condition is that the optical aberration at a location on the rim of the back aperture for a first azimuth angle given by the azimuth angle of the feeding point is substantially equal to the optical aberration at a location on the rim of the back aperture for a second azimuth angle given by the azimuth angle of the feeding point plus 180 degrees. The third condition is that the optical aberration at the location on the rim of the back aperture for the first azimuth angle is substantially equal in magnitude to the optical aberration at a location on the rim of the back aperture for a third azimuth angle given by the azimuth angle of the feeding point plus 90 degrees or plus an offset azimuth angle depending on a radius of the rim of the back aperture and a location of the feeding point, but opposite in sign. Here, the offset azimuth angle $\phi$ may be given by $\cos\phi=\rho/(f\sin\alpha)$, where $\rho$ is the radius of the rim of the back aperture and $f\sin\alpha$ is the radial excursion of the feeding point from the center axis.

Further, as noted above, step S1220 may further include enforcing a fourth condition that the front aperture is shaped as a flat surface (i.e., Z1=0).

Steps S1210 and 1220 described above allow to determine two of the three remaining unknowns. The third unknown can be fixed a priori. At least three choices are available for doing so.

- Z can be fixed in advance. For instance a spherical or ellipsoidal back profile can be selected
- W can be fixed in advance. For instance, the choice W=0 can be made in order to guarantee that all the transmission lines have equal length
- R can be fixed. For instance R=R1·M can be chosen in order to guarantee a regular distribution and density of the discrete elements. Another possibility is to enforce that the elements in the front and back lens are (in the case of unitary zooming, i.e., M=1) aligned along straight lines originated not at an infinite distance but in a point at a finite distance along the lens axis (as done, e.g., for the R-2R bidimensional lens described below).

In other words, additional conditions can be enforced in step S1220 to determine/fix the third unknown. Accordingly, method 1200 may further comprise enforcing a fifth condition when solving the set of lens equations (e.g., at step S1220). The fifth condition may be one of that the back aperture has a predefined shape (e.g., the shape of a sphere or ellipsoid), or that the lengths of the transmission lines between homologous discrete elements have a predefined profile (e.g., that the lengths of the transmission lines between homologous discrete elements are substantially equal), or that for each pair of homologous discrete elements, a ratio between the radial excursions of the respective homologous discrete elements of the back aperture and the front aperture in the pair is substantially equal to a predefined value (e.g., that for each pair of homologous discrete elements, the ratio between the radial excursions of the respective homologous discrete elements of the back aperture and the front aperture in the pair may be substantially equal to the zooming factor M).

The fundamental result is the following: by enforcing the conditions of Eq. (78) and Eq. (79), the results presented above with reference to FIGS. 8 to 10 comparing different types of lenses can be further improved when considering focal surfaces with a diameter exceeding the diameter of the back lens. This condition is typically achieved for lenses characterized by a large field of view (e.g., larger than 40°). It will be shown that is possible to further reduce the optical aberrations and, at the same time, reduce the length of the focal distances. It is important to note that enforcing Eq. (78) and Eq. (79) does not imply or require enforcing any perfect focal point. These two conditions are only enforced in the circular peripheral rim of the lens, which represents the most critical part of the lens in terms of optical aberrations. On the other hand, the two newly introduced conditions guarantee the presence of four points in the rim of the lens where the aberrations assume a zero value. These four points are located close to (but not exactly at) the angles $\phi$=45°, 135°, 225°, 315°.

The analytical results are presented next.

By solving the equations of Eq. (78) and Eq. (79) using R and W as unknowns, four solutions are found. The acceptable solutions can be given as $$R = R1M\left(-\frac{Z^2 + 2ZFca + F^2 + R1^2M^2ca^2 - R1^2M^2}{R1^2M^2 - F^2}\right)^{\frac{1}{2}} \quad \text{Eq. (80)}$$

$$W = F + Z1\left(M^2ca^2 - M^2 + 1\right)^{\frac{1}{2}} - \left(-\frac{Z^2F^2 + 2ZF^3ca + F^4 + R1^4M^4ca^2 - R1^4M^4}{R1^2M^2 - F^2}\right)^{\frac{1}{2}}/2 - \left(F\left(-\frac{Z^2 + 2ZFca + F^2 + R1^2M^2ca^2 - R1^2M^2}{R1^2M^2 - F^2}\right)^{\frac{1}{2}}\right)/2 \quad \text{Eq. (81)}$$

$$X = R\cos(\phi),\ Y = R\sin(\phi) \quad \text{Eq. (82)}$$

Forcing both Z1 and Z to be null as a limit case yields $$R = R1M\left(-\frac{F^2 - R1^2M^2sa^2}{R1^2M^2 - F^2}\right)^{\frac{1}{2}} \quad \text{Eq. (83)}$$

$$W = -F\left(\left(\frac{R1^2M^2sa^2}{R1^2M^2 - F^2} - \frac{F^2}{R1^2M^2 - F^2}\right)^{\frac{1}{2}}/2 - 1\right) - ((2F^2R1^2M^2)/(R1^2M^2 - F^2) - (R1^4M^4sa^2)/(R1^2M^2 - F^2) - F^4/(R1^2M^2 - F^2))\hat{}(1/2)/2 - (R1^2M^2((R1^2M^2sa^2)/(R1^2M^2 - F^2) - F^2/(R1^2M^2 - F^2))\hat{}(1/2))/(2F) \quad \text{Eq. (84)}$$

By solving the equations of Eq. (78) and Eq. (79) using R and Z as unknowns, after enforcing Z1=0 and W=0 (i.e., equi-length transmission lines), four solutions are found. The acceptable solutions can be given as $$Z = \left(\left(-\left((F+R1M)(F-R1M)\left(4F^2sa-4F^2+R1^2M^2sa^2\right)\left(4F^2sa+4F^2-R1^2M^2sa^2\right)\right)/4\right)\wedge(1/2)-2F^3ca\right)/\left(2F^2\right) \quad \text{Eq. (85)}$$

$$R = \left(R1M\left(4F^2-R1^2M^2sa^2\right)\right)/\left(4F^2\right) \quad \text{Eq. (86)}$$

$$X = R\cos(\phi) \quad \text{Eq. (87)}$$

$$Y = R\sin(\phi) \quad \text{Eq. (88)}$$

Finally, by solving the equations of Eq. (78) and Eq. (79) using W and Z as unknowns, after enforcing Z1=0 and fixing R (e.g., R=R1·M) four solutions are found. The acceptable solutions can be given as $$Z = (-(F+R1M)(F-R1M)(sa-1)(sa+1))^{\frac{1}{2}} - Fca \quad \text{Eq. (89)}$$

$$W = F/2 - \left(F^2+R1^2M^2sa^2\right)^{\frac{1}{2}}/2 \quad \text{Eq. (90)}$$

$$X = R\cos(\phi),\ Y = R\sin(\phi) \quad \text{Eq. (91)}$$

Improved Formulation

Figure 13A:
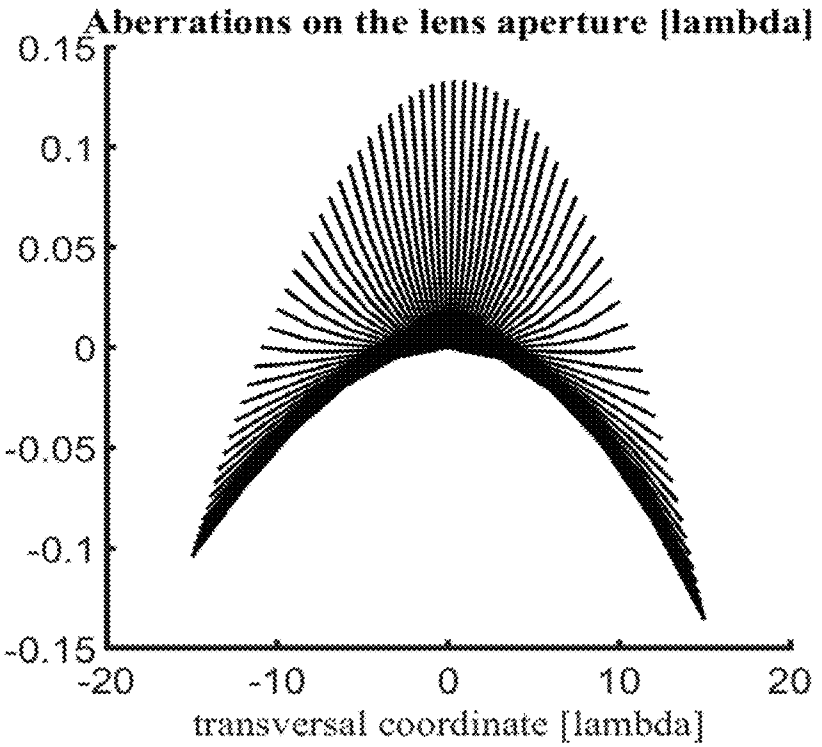
FIG. 13A and FIG. 13B are diagrams showing examples of typical evolutions of optical aberrations on the lens aperture when illuminated with the maximum scanning angle, as a functions of the transversal coordinate.
Figure 13B:
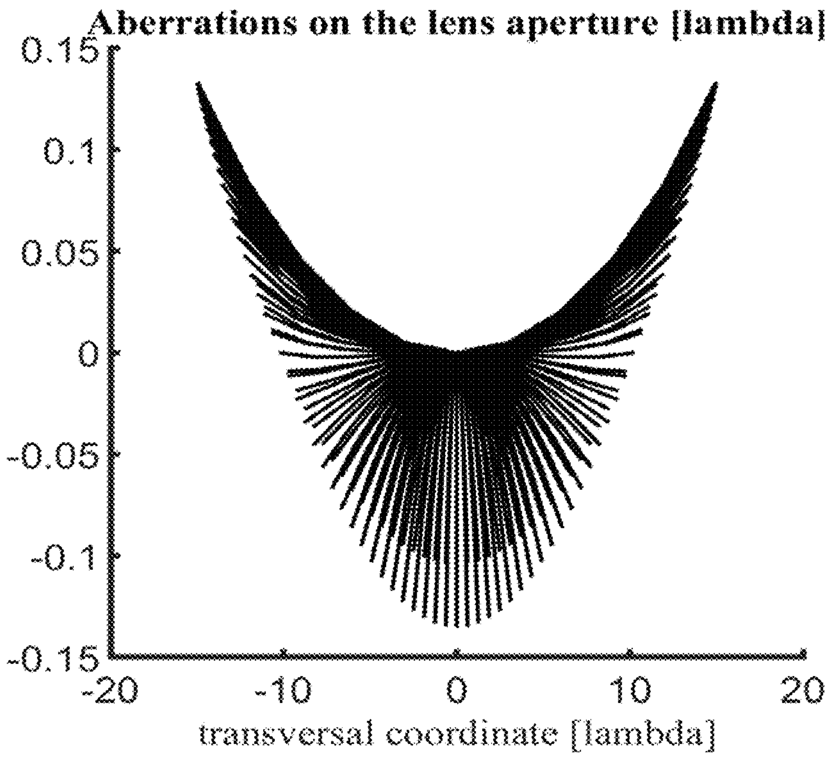

A further improvement will be proposed next. The typical behavior of the aberrations on the entire surface of the lens, still maintaining the source fixed in the same position corresponding to the maximum scanning angle, are presented in FIG. 13A and FIG. 13B (horizontal axis: transversal coordinate in units of λ; vertical axis: aberrations on the lens aperture in units of λ). Therein, FIG. 13A shows the aberrations in the X-Z plane, i.e., on the plane of incidence, and FIG. 13B shows the aberrations on the X-Y plane, i.e., on the plane perpendicular to the plane of incidence. As can be seen, the aberrations exhibit a saddle shape, with two quadratic curves with opposite curvatures appearing in the two principal perpendicular planes. In particular, the saddle is slightly tilted towards the direction of the source (see FIG. 13B). Because of this small tilt, the aberrations with maximum value and positive sign are obtained on the rim not exactly in correspondence to the angle ϕ=90° but for a slightly smaller angle.

This point on the rim can be derived as follows. The feed is again, without intended limitation, assumed to be fixed in the plane ϕ=0° so that the transversal coordinates can be expressed as $$X = R\cos(\psi),\ Y = R\sin(\psi) = R1\cos(\psi) = R1\sin(\psi) \quad \text{Eq. (92)}$$

The Cartesian coordinates of the feeding point are then given by $$Fx = Fsa,\ Fy = 0,\ Fz = -Fca \quad \text{Eq. (93)}$$

It has been verified that the point on the rim where the aberrations assume a maximum positive value can be derived enforcing that the radial vector with components X and Y in this point is perpendicular to the incident field. The scalar product between these two vectors is given by $$\text{scalar product} = R^2 - \cos(\psi)FRsa \quad \text{Eq. (94)}$$

By enforcing a null scalar product the following condition is derived, $$\cos(\psi) = R/(Fsa) \quad \text{Eq. (95)}$$

The other two points where the aberrations assume the minimum real values do not change as compared to the previous derivation. They are located in the principal plane containing the source and they are characterized by ϕ=0° and ϕ=180°.

By enforcing now, as above, the two conditions $$\text{aberrations}_0 = -\text{aberrations}_\psi \quad \text{Eq. (96)}$$

$$\text{aberrations}_\psi = -\text{aberrations}_1 \quad \text{Eq. (97)}$$

and using the value for ψ just derived, four solutions can be obtained. Specifically, solving the equations of Eq. (96) and Eq. (97) will yield the following acceptable solution:

$$W = -\left(F^2p - 2F^3 + R1^2pM^2 - 2F^2q\left(1-M^2sa^2\right)^{\frac{1}{2}} + R1^3M^3sa + F^2R1Msa\right)/\left(2F^2\right) - \left(2F^2R1^2M^2sa^2 + 2F^2R1pMsa + F^2p^2 - 2R1^4M^4sa^2 - 4R1^3pM^3sa - 2R1^2p^2M^2\right)^\wedge(1/2)/(2F) \quad \text{Eq. (98)}$$

$$R = \left(saR1^2M^2 + pR1M\right)/F \quad \text{Eq. (99)}$$

$$Z = \left(((F+R1M)(F-R1M)(p+Fsa+R1Msa)(p-Fsa+R1Msa))^{\frac{1}{2}} - F^2ca\right)/F \quad \text{Eq. (100)}$$

$$Z1 = q \quad \text{Eq. (101)}$$

Because two conditions have been enforced and there are four unknowns, the solutions remain expressed as a functions of two parameters p and q. In particular the expression Z1=q indicates that Z1, i.e., the shape of the front profile, is undetermined. A common choice is to fix it to be null, i.e., to enforce a flat front aperture. As has been noted above, the aberrations are mainly determined by the back profile Z and having a Z1 different from zero implies larger volume and manufacturing issues. Therefore, choosing q=0, implying Z1=0, corresponds to an efficient choice. The p value can be easily derived enforcing another condition, as described below.

By solving for W and R (i.e., assuming Z1 and Z assigned), four solutions can be derived. The acceptable solution is given by $$W = Z1\left(-M^2sa^2+1\right)^{\frac{1}{2}} - F\left(\left(-\frac{Z^2+2ZFca+F^2+R1^2M^2ca^2-R1^2M^2}{R1^2M^2-F^2}\right)^{\frac{1}{2}}/2-1\right) - \left(-\frac{\begin{array}{c}Z^2F^2-2Z^2R1^2M^2+2ZF^3ca-4ZFR1^2M^2ca+\\F^4-2F^2R1^2M^2-R1^4M^4ca^2+R1^4M^4\end{array}}{R1^2M^2-F^2}\right)^{\frac{1}{2}}/2 - \tag{102}$$

-continued $$(R1^2M^2\left(-\frac{Z^2+2ZFca+F^2+R1^2M^2ca^2-R1^2M^2}{R1^2M^2-F^2}\right)^{\frac{1}{2}})/(2F)$$

$$R = R1M\left(\frac{Z^2+2caZF+F^2-R1^2M^2sa^2}{(F+R1M)(F-R1M)}\right)^{\frac{1}{2}} \tag{103}$$

Possible choices for the profile Z may include spherical, paraboloidal, or ellipsoidal shape, etc. Fixing Z1=0 and selecting a priori different types of back profiles Z results in significant flexibility. Several investigations have been done using convex, concave, or even more complex profiles. In the end, also in view of optimizing the coupling between the feeds and the back lens, a rotationally symmetric concave back profile with the concavity in the direction of the focal arc seems to represents a good choice.

By solving for Z and R (i.e., assuming Z1 and W assigned), again four solutions can be derived. In the general case of Z1 and W different from zero, the resulting analytical expressions are particularly long. The most convenient configurations are characterized by a flat front profile, so that assuming Z1=0 does not represent a limitation. By assuming Z1=0 and W=0 (i.e., equi-length transmission lines), the analytical expressions significantly simplify to $$Z = \Big(\Big(R1^{10}M^{10}+8F^{10} - 4F^7\left(4F^6-8F^4R1^2M^2-4F^2R1^4M^4ca^2+4F^2R1^4M^4-R1^6M^6ca^2+R1^6M^6\right)^{\frac{1}{2}} - R1^{10}M^{10}ca^2-8F^8R1^2M^2-8F^6R1^4M^4+F^4R1^6M^6+6F^2R1^8M^8+4F^3R1^4M^4\left(4F^6-8F^4R1^2M^2-4F^2R1^4M^4ca^2+4F^2R1^4M^4-R1^6M^6ca^2+R1^6M^6\right)^{\frac{1}{2}} + 12F^6R1^4M^4ca^2-5F^4R1^6M^6ca^2-6F^2R1^8M^8ca^2\Big)/\left(16F^4R1^2M^2+8F^2R1^4M^4+R1^6M^6\right)\Big)\wedge(1/2)/(R1M)-Fca \tag{104}$$

$$R = \left(2F^4 - F\left(4F^6-8F^4R1^2M^2+4F^2R1^4M^4sa^2+R1^6M^6sa^2\right)^{\frac{1}{2}}+2F^2R1^2M^2\right)/\left(4F^2R1M+R1^3M^3\right) \tag{105}$$

By solving for Z and W (i.e., assuming Z1 and R assigned), four solutions can be derived. The acceptable solution is given by $$Z = (((F + R1M)(F - R1M)(R + R1Msa)(R - R1Msa))^{\frac{1}{2}} - FR1Mca)/(R1M) \quad \text{Eq. (106)}$$

$$W = -\left(F^2R^2 - 2R^2R1^2M^2 + R1^4M^4sa^2\right)^{\frac{1}{2}}/(2R1M) - (F^2R - 2F^2R1M + RR1^2M^2 - 2Z1FR1M\left(1 - M^2sa^2\right)^{\frac{1}{2}})/(2FR1M) \quad \text{Eq. (107)}$$

Finally, another interesting case has been identified by enforcing $$W = sqrt\left((X - X1)^2 + (Y - Y1)^2 + (Z - Z1)^2\right)n \quad \text{Eq. (108)}$$

with n real. This condition implies that the phase path is proportional to the physical distance between homologous discrete elements (homologous points). The proportionality factor n is used in analogy with the case of dielectric lenses where n represents the refractive index of the dielectric material (e.g., n for dielectric lenses given by $n=\sqrt{\varepsilon}$, with δ representing the dielectric constant). This case is important because the lines connecting homologous points can be straight lines and the type of connecting lines (i.e., coaxial cables, fiber optics, waveguides, etc. . . . ) characterizes the proportionality factor n. Four distinct possibilities have been identified, with the corresponding solutions given in Table 1 appended to this disclosure. Two possibilities have been obtained by enforcing the conditions of Eq. (95), Eq. (96), and Eq. (97), the other two possibilities simply enforcing the presence of a single focal point in the lens axis located in the point (–H,0,0).

It is important to note that the procedure presented above only permit to analytically derive the lens parameters on the edge of the lens where the aberrations assume the most critical values.

Numerical Results

As can be seen from the above, the profile of the back lens plays a fundamental role in defining the shape of the optimized focal arc and the behavior of the maximum aberrations. In this section the performance of the spherical-planar bootlace lens (see discrete lens A defined above), which is characterized by a single axial focus located in the point (0,0,–R0) are compared to the performance of three constrained lenses with Z and Z1 assigned (with Z1=0) and W and R obtained when solving Eqs. (95)-(97), as defined in Eqs. (102)-(103). The three profiles for the back lens are paraboloidal profiles defined by $$Z = AR1^2 \quad \text{Eq. (109)}$$

$$\text{with } A = -\frac{M}{D}, \frac{M}{1.2D}, -\frac{M}{1.4D} \text{ for } \alpha = 30° \quad \text{Eq. (110)}$$

$$A = -\frac{M}{1.4D}, -\frac{M}{1.8D}, -\frac{M}{2.2D} \text{ for } \alpha = 45° \quad \text{Eq. (111)}$$

$$A = -\frac{M}{2D}, -\frac{M}{2.4D}, -\frac{M}{2.8D} \text{ for } \alpha = 60 \quad \text{Eq. (112)}$$

where D represents the diameter of the front lens and M is the magnification factor (zooming factor). Further, the parameter F for the three paraboloidal lenses is related to the radius R0 of the spherical-planar lens by the following heuristic expressions:

$$F = 0.905R0 \text{ for } \alpha = 30°; F = 0.818R0 \text{ for } \alpha = 45°; F = 0.7435R0 \text{ for } \alpha = 60° \quad \text{Eq. (113)}$$

The aforementioned three discrete lenses are understood to be nonlimiting examples that have been specifically derived for numerical comparisons to the spherical planar lens. That is, the heuristic values in Eqs. (110)-(113) have been derived in order to have the three paraboloidal lenses with axial focal distances comparable with the one of the spherical-planar one. The results of this comparison are presented in FIG. 14, FIG. 15, and FIG. 16. Therein, the curves relevant to the three paraboloidal lenses are represented with diamond, circle, and star points, respectively. In FIG. 14 the lenses are compared for magnification M=1. FIG. 15 shows results for M=0.5 and FIG. 16 for M=2.

Figure 14A:
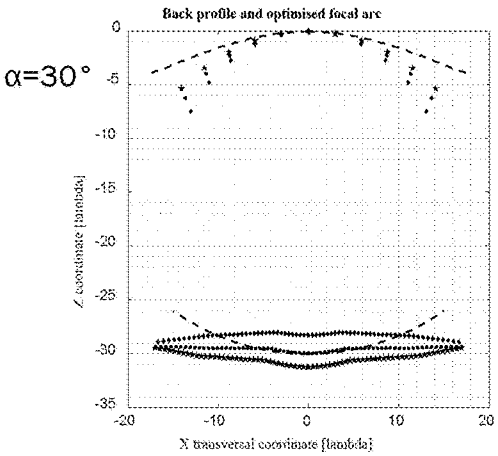
FIG. 14A to FIG. 14F, FIG. 15A to FIG. 15F, and FIG. 16A to FIG. 16F are diagrams showing examples of numerical results for a group of three-dimensional discrete lenses according to the present disclosure for different zooming factors and different maximum scanning angles.
Figure 14B:
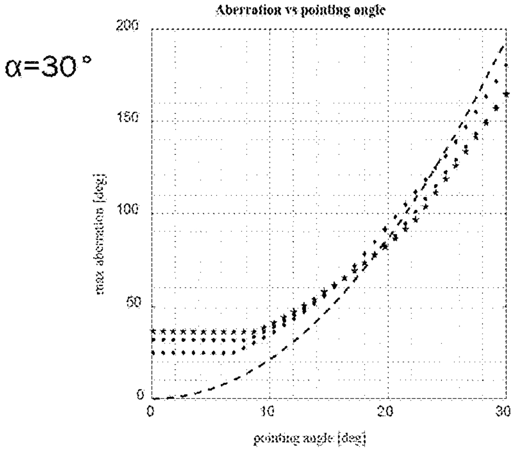
Figure 14C:
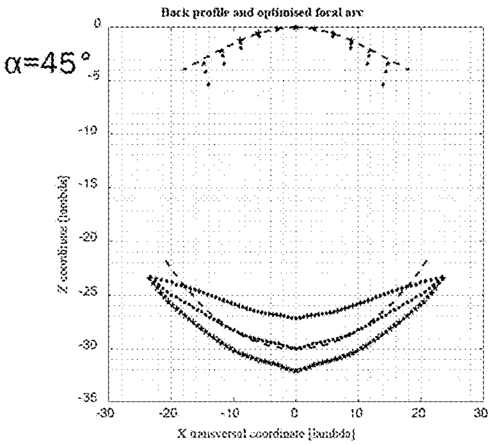
Figure 14D:
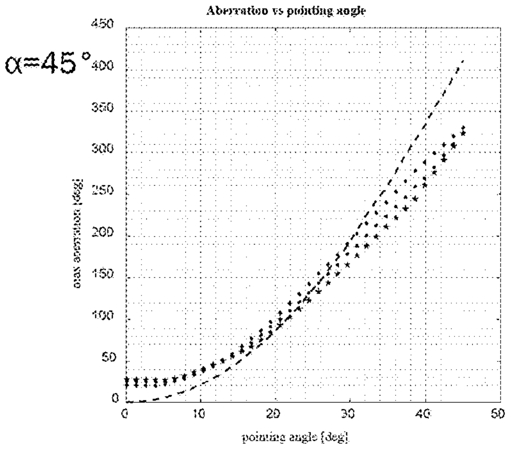
Figure 14E:
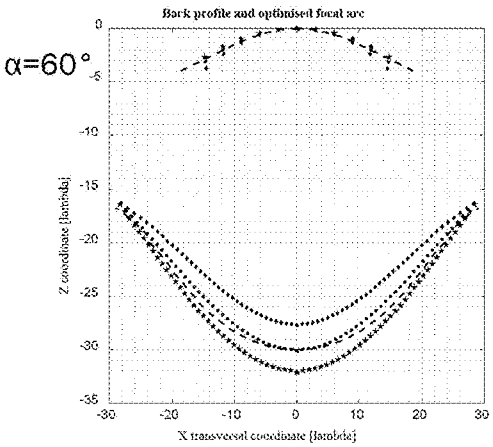
Figure 14F:
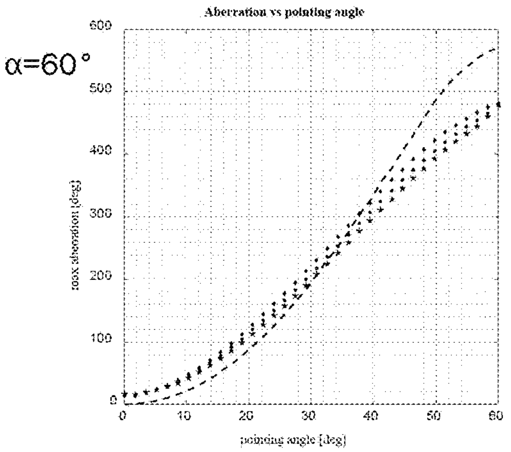
Figure 15A:
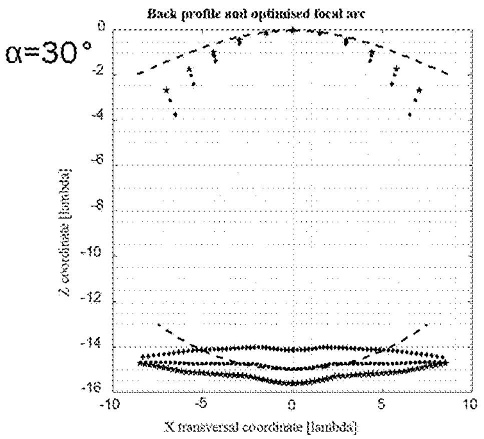
Figure 15B:
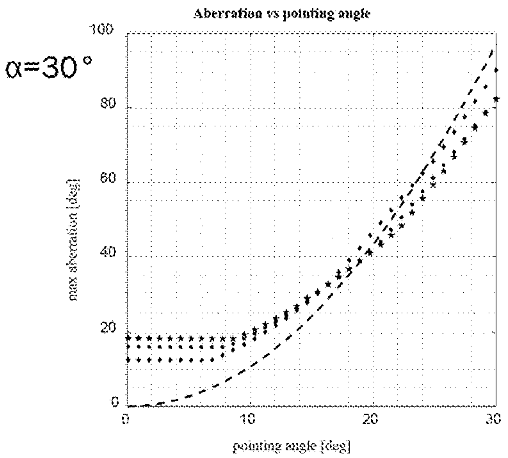
Figure 15C:
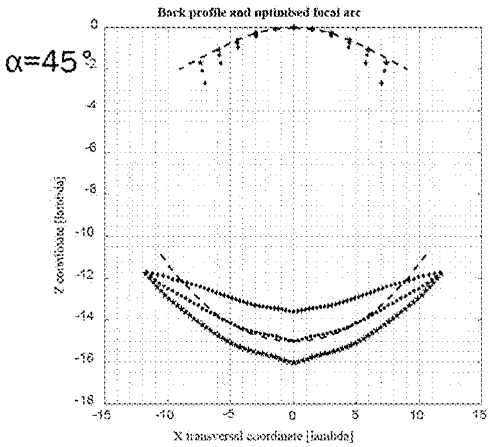
Figure 15D:
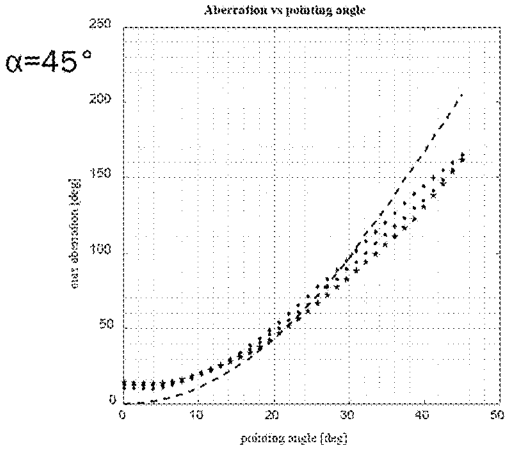
Figure 15E:
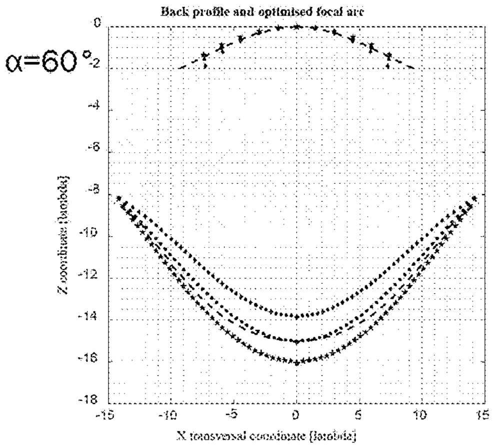
Figure 15F:
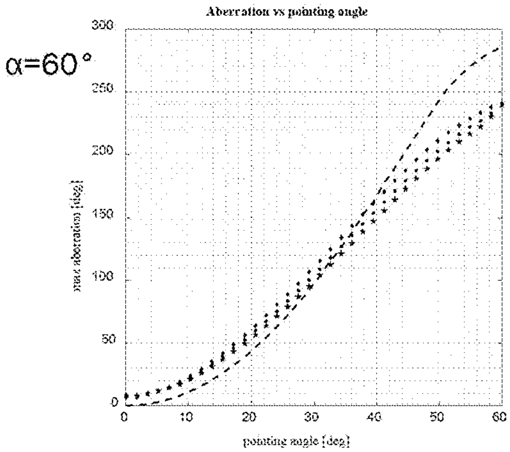
Figure 16A:
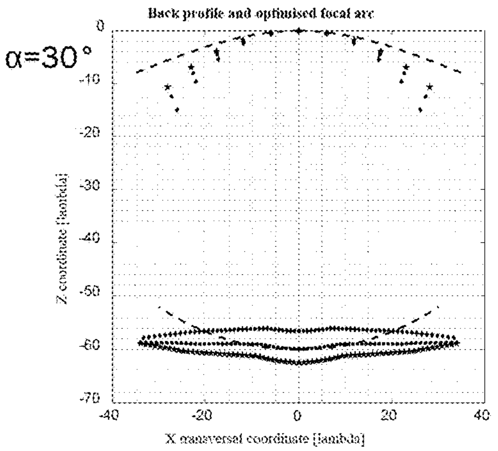
Figure 16B:
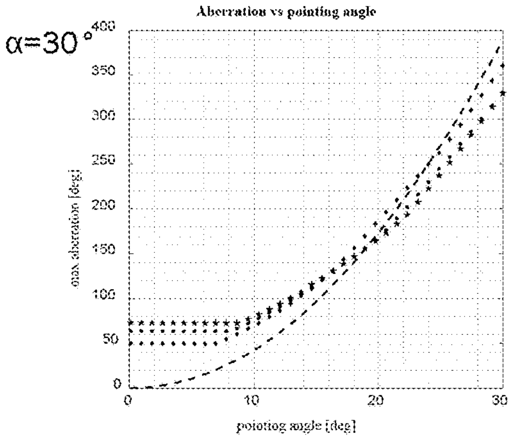
Figure 16C:
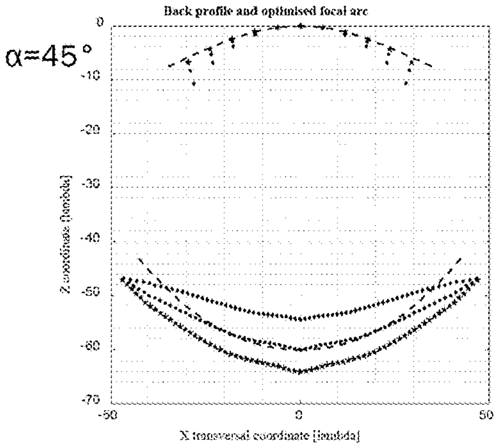
Figure 16D:
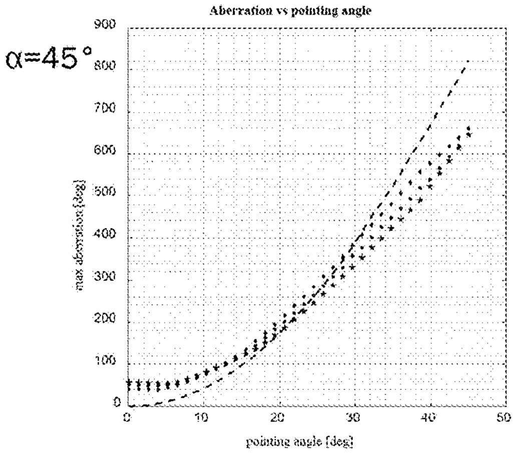
Figure 16E:
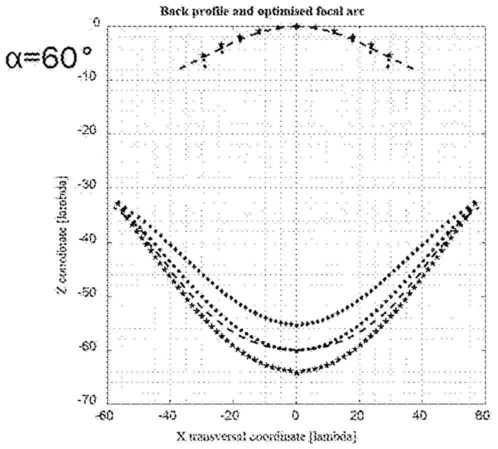
Figure 16F:
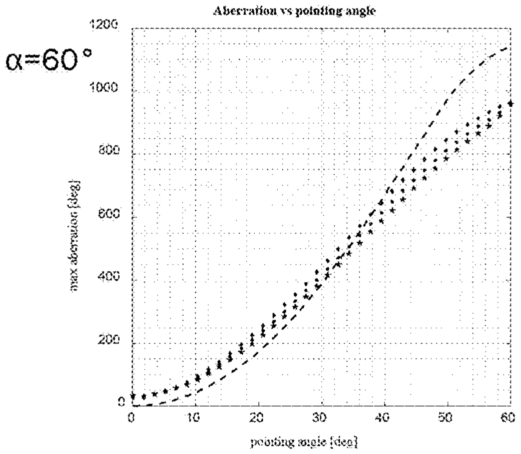

Three opening angles are considered: α=15°, 30°, 45°. Specifically, FIGS. 14A, 15A, 16A show the shapes of the back profile and of the optimized focal arc for α=15° (horizontal axis: X transversal coordinate in units of λ; vertical axis: Z transversal coordinate in units of λ). FIGS. 14B, 15B, 16B show the corresponding optical aberrations (horizontal axis: pointing angle in degrees; vertical axis: max aberration in degrees). Further, FIGS. 14C, 15C, 16C show the shapes of the back profile and of the optimized focal arc for α=30° and FIGS. 14D, 15D, 16D show the corresponding optical aberrations. Finally, FIGS. 14E, 15E, 16E show the shapes of the back profile and of the optimized focal arc for α=45° and FIGS. 14F, 15F, 16F show the corresponding optical aberrations.

For α=30° the three new lenses exhibit moderate improvements in the maximum aberrations for angles close to the maximum scanning angle. Close to the center axis, these three lenses are not able to minimize the aberrations, but these values are much less critical. The results of the three lenses in terms of aberrations when approaching the lens axis are not surprising because their performance have been optimized only for the maximum scanning angle where the most critical values are obtained. For α=45° and 60° the three new lenses exhibit significant improvements in terms of aberrations (in the order of 20%) as compared to the spherical-planar lens.

CONCLUSION

A design procedure to derive rotationally symmetric three-dimensional lenses with large field of view and minimized optical aberrations has been proposed. A reduction in the order of 20% in the maximum aberrations are found as compared to the case of properly symmetrized multifocal three-dimensional discrete lenses. The new architectures offer improved performance also in terms of accommodation because they allow reducing the focal length distances. The improvements are valid for lens antennas characterized by focal feeding arrays with a diameter exceeding the back lens diameter. It is interesting to note that when this condition applies, the aberrations remain lower than those of comparable multifocal lenses for scanning angles higher than about half the maximum scanning angle, while their values are higher in the first half of the scanning region starting from the lens axis. The proposed design procedure may be useful for defining bootlace lens antennas operating in several emerging applications (e.g., Space, 5G, MIMO, etc.).

Two-Dimensional Discrete Lenses and Multifocal Architectures

Next, embodiments and implementations of the present disclosure relating to two-dimensional discrete lenses will be discussed.

Specifically, a general procedure for the design of two-dimensional bootlace lenses or bootlace lens antennas with a flat front profile is proposed. The constitutive parameters that guarantee a minimization of the optical aberrations are defined with analytical heuristic expressions. The relation between the optical aberrations and the antenna optics, including the effect of magnification (zooming) are presented. In the case of the three-foci lens, the best performance is achievable when the three focal distances and the entire focal arc are optimized to guarantee, in addition to the three nominal foci, the presence of two additional symmetric quasi-foci. For the four-foci lens the best performance is obtained when, in addition to the four nominal foci, the presence of one additional quasi-focus located on the lens axis is guaranteed. Both the three-foci and the four-foci lenses, when optimized, converge to the same configuration which exhibits aberrations following a Chebyshev-like behavior and exhibits five foci (including nominal foci and quasi-foci). The optimized lens architecture is such that, for every scanning angle, the aberrations in the two extreme points are the most significant and exhibit opposite values. Any deviation from this optimal condition implies increased aberrations. Thereby, although a five-foci bootlace lens with flat front profile cannot be derived in terms of geometrical optics, one quasi-five-foci lens is derived asymptotically starting from two completely different lens architectures. A maximization of the number of foci combined with a rigorous derivation of the focal curve turned to be the key driver to identify an optimal two-dimensional bootlace lens.

Overview and General Properties

Two-dimensional (parallel plate configuration) bootlace lenses have been extensively investigated in the past. The success of two-dimensional lenses is justified by their design simplicity, their modularity and scalability, and several other properties they share with three-dimensional discrete lenses. Two-dimensional constrained lenses can be designed to have more than one focal point. Wide angle scanning capabilities of these lenses in two dimensions is well established and improves with growing number of focal points. In particular, the lens proposed in W. Rotman, R. F. Turner, "Wide-angle microwave lens for line source application," IEEE Transaction on Antennas and Propagation, vol. AP-11, pp. 623-632, November 1963 (Rotman-Turner lens), which is characterized by one central focus, two symmetrical lateral foci and a flat front lens profile, has found several applications. Discrete two-dimensional lenses have been used for several applications including satellite applications. The main benefits of this type of discrete lens beamforming network are associated to the simple implementation in Printed Circuit Board Technology (PCB), excellent scanning capabilities, and the fact that the front aperture is completely flat (facilitating the interfacing with other devices and/or antennas). Also the quasi free-space beamforming and the true-time delay behavior represent two unique and fundamental advantages that justify the increasing utilization of this type of beamforming network in several applications.

Despite the fact that Rotman-Turner lenses have been used and discussed in the literature for a comparatively long time, an optimal and general procedure to dimension this class of lenses still appears to be lacking. The present disclosure proposed such generalized procedure for designing two-dimensional constrained discrete lens antennas, considering two-dimensional discrete lens beamforming networks and antennas characterized by one, two, three, or four focal points.

The R-2R lens defined for example in H. B. DeVore and H. Iams, "Microwave optics between parallel conducting sheets," RCA Rev., vol. 9, pp. 721-732, December 1948 is considered as a reference lens. It exhibits an infinite number of focal points, but its front profile is curved. One may wonder why the three-foci Rotman-Turner bootlace lens has gained huge popularity, while the R-2R lens with an infinite number of foci, is hardly used. Even though some publications mention that the R-2R lens would have a limited field of view, it has presently been found that the R-2R lens exhibits excellent scanning performance up to ~±60°, which represents a sufficiently large and acceptable field of view for a number of application, and which is larger than the field of view typically achievable with three-foci lenses. It may be the curved profile of the front lens in the R-2R configuration that limits its applicability as well as its compatibility and integration with other components. In addition, the R-2R lens cannot exhibit a magnification factor different from 1.

The present disclosure presents several new results: a) a procedure to minimize the lens optical aberrations, b) relationships between the constitutive parameters, and c) an accurate estimation of the optical aberrations achievable with these lenses as a function of the constitutive parameters (including the effects of the ratio between the focal distance over the diameter, and a possible arbitrary zooming or magnification factor). The analytical and heuristic relationships permit to quickly identify suitable configurations and achievable performances in terms of accommodation, volume, optical aberrations.

Notably, the present disclosure does not indicate the dimensions of the radiating elements constituting the focal feeding array, the back array, and the front array. This does not represent a limitation, since all of the presented results (e.g., the profiles, the phase shifters, the aberrations, and all equations) remain valid for any possible dimension for the radiating elements that an antenna designer may choose.

Degrees of Freedom, Number of Foci, Architecture Definition

Figure 17:
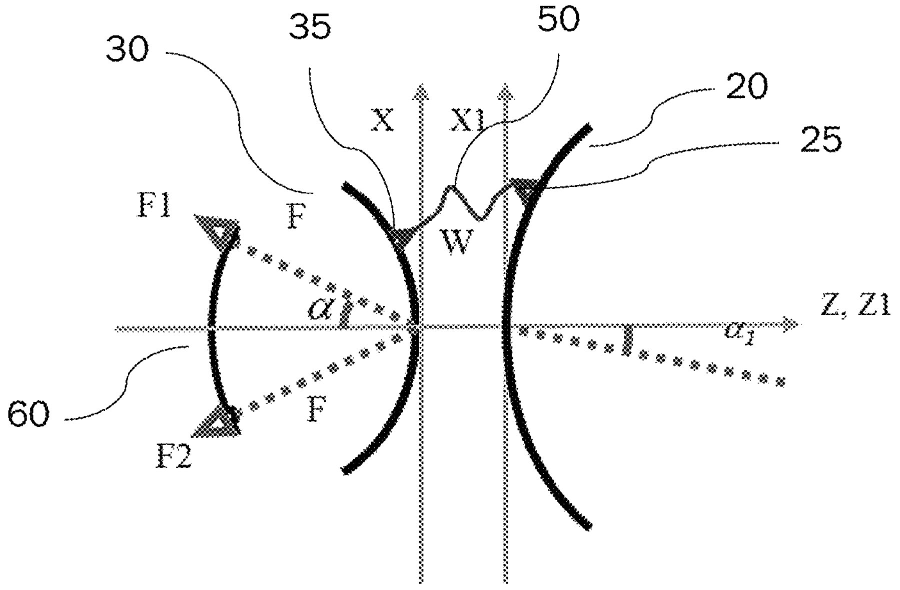
FIG. 17 schematically illustrates an example of the variables used to define the two-dimensional discrete lens architecture.

In the following, the constitutive parameters of two-dimensional bootlace lenses (discrete lenses) will be defined with reference to FIG. 17, adopting a Cartesian coordinate system. Similarly to the three-dimensional discrete lens, the two-dimensional discrete lens comprises a front aperture 20, a back aperture 30, and a plurality of transmission lines 50. Each of the front aperture 20 and the back aperture 30 comprises a plurality of discrete elements 25, 35, wherein each discrete element 35 of the back aperture 30 is homologous to a respective discrete element 25 of the front aperture 20. The transmission lines 50 connect respective pairs of homologous discrete elements 25, 35 of the front aperture 20 and the back aperture 30. The difference to the three-dimensional discrete lenses lies in the fact that two-dimensional discrete lenses are limited by parallel plates so that the front and back apertures 20, 30, as well as the feed array 60 are essentially two-dimensional.

The variables used for defining a two-dimensional lens are analogous to those used for defining a three-dimensional lens in one of the principal planes (e.g., the X-Z plane). Accordingly, the front lens profile (shape of the front aperture) is defined using the coordinates (X1, Z1) and the back lens profile (shape of the back aperture) is defined using the coordinates (X,Z). The lengths of the transmission lines is defined using the variable W. The foci are denoted by letters F1, F2, etc., and the focal distances with the letter f or h. The angles defining the positions of the foci in the X-Z plane are denoted by $\alpha$ or $\delta$. The homologous angles defining the pointing direction of the lens are denoted by $\alpha 1$ or $\delta 1$.

Bootlace lenses permit to generate plane waves pointing in directions characterized by the angle $\alpha 1$ which can be larger or smaller than the angle $\alpha$ defining the position of the corresponding focal point. In optics this property is indicated as magnification, zooming, or imaging. In 1967 Raytheon recognized that this property for 2D bootlace lenses constitutes a useful additional degree of freedom. When zooming is not used, $\alpha 1=\alpha$ and $\delta 1=\delta$. As above, the magnification or zooming factor is indicated by letter M and can be defined via $$\sin(\alpha 1)=\sin(\alpha)M,\ \cos(\alpha 1)=\left(1-(\sin(\alpha)M)^2\right)^{\frac{1}{2}} \quad \text{Eq. (114)}$$

$$\sin(\delta 1)=\sin(\delta)M,\ \cos(\delta 1)=\left(1-(\sin(\delta)M)^2\right)^{\frac{1}{2}} \quad \text{Eq. (115)}$$

When M<1 the pointing angles of the beams emerging from the lens are smaller than the angles defining the homologous feeding point. Vice versa, when M>1 the pointing angles of the beams emerging from the lens are larger than the angles defining the homologous feeding point.

Since an off-axis beam can emerge from the array at an angle greater than or less than the angle from the on-axis focus to the driven beam port, the zooming parameter M can also be referred to as expansion or compression factor. In order to achieve a discrete lens with a magnification factor M, the back lens diameter must be approximately equal to the diameter of the front lens multiplied by M. Possible three-dimensional discrete lens architecture allowing for zooming are given above.

To define a two-dimensional discrete lens the following five variables are needed: X,Z,W,X1 and Z1. Choosing one variable as an independent variable (usually, X1 is chosen), 5−1=4 free variables remain. They represent the degrees of freedom in the design and the maximum number of geometrical optics perfect foci. In fact, two-dimensional discrete lenses may exhibit up to four foci. The R-2R bootlace lens represents an exception because is a two-dimensional discrete lens with an infinite number of foci. The wavelength is denoted, as usual, by the symbol $\lambda$. The axial focal distance is denoted by G, the off-axis focal distances associated to perfect foci with F, and the focal distance associated with an arbitrary feed not coinciding with a perfect focus by the letter H.

Definition of Lens Architectures

In the following, different architectures for two-dimensional discrete lenses will be defined, adopting simple analytical formulations. The analytical expressions reported here in explicit form are especially useful for the below discussion.

Typically, these two-dimensional discrete lenses are realized in parallel-plate waveguides, optionally adopting a dielectric material in the lens cavity in order to miniaturize the cavity. The effects of the dielectric constant are not included in the formulation and the discussion of the present disclosure. However, this omission does not represent a limitation because the dielectric constant would simply imply a scaling factor on the dimensions of the back lens and focal arc, as the skilled person will appreciate.

O. Configuration with 1 Focal Point

A first two-dimensional discrete lens architecture is defined by the following equations:

$$Z1=0 \quad \text{Eq. (116)}$$

$$X=X1M \quad \text{Eq. (117)}$$

$$Z=-F+\left(F^2-X^2\right)^{\frac{1}{2}} \quad \text{Eq. (118)}$$

$$W=0 \quad \text{Eq. (119)}$$

P. Configuration with 2 Focal Points

A second two-dimensional discrete lens architecture is defined by the following equations:

$$Z1=0 \quad \text{Eq. (120)}$$

$$X=X1M \quad \text{Eq. (121)}$$

$$Z=-F\cos(\alpha)+\left((F\cos(\alpha))^2-(X\cos(\alpha))^2\right)^{\frac{1}{2}} \quad \text{Eq. (122)}$$

$$W=0 \quad \text{Eq. (123)}$$

Q. Configuration with 3 Focal Points

A third two-dimensional discrete lens architecture, better known as Rotman-Turner lens, is defined by the following equations:

$$\beta=F/G \quad \text{Eq. (124)}$$

$$M=\text{zoom}=\sin(\alpha 1)/\sin(\alpha) \quad \text{Eq. (125)}$$

$$\zeta=X1M/G \quad \text{Eq. (126)}$$

$$a=1-\frac{(1-\beta)^2}{(1-\beta ca)^2}-\zeta^2/\beta^2 \quad \text{Eq. (127)}$$

$$b=-2+2\frac{\zeta^2}{\beta}+2\frac{(1-\beta)}{(1-\beta ca)}-\zeta^2 sa^2(1-\beta)/(1-\beta ca)^2 \quad \text{Eq. (128)}$$

$$c=-\zeta^2+\zeta^2 sa^2/(1-\beta ca)-\zeta^4 sa^4/\left(4(1-\beta ca)^2\right) \quad \text{Eq. (129)}$$

$$W=G\left(-b-sqrt\left(b^2-4ac\right)\right)/(2a) \quad \text{Eq. (130)}$$

$$Z=G\left(-\left(0.5\zeta^2 sa^2+(1-\beta)W/G\right)/(1-\beta ca)\right) \quad \text{Eq. (131)}$$

$$X=G\zeta\left(1-W/G/\beta\right) \quad \text{Eq. (132)}$$

$$Z1=0 \quad \text{Eq. (133)}$$

R. Configuration with 4 Focal Points

A fourth two-dimensional discrete lens architecture is defined by the following equations:

$$X=X1M/F\left(\frac{4F^4-4F^2X1^2M^2(1+cacd)+X1^4M^4(ca+cd)^2}{F^2-X1^2M^2}\right)^{\frac{1}{2}}/2, \quad \text{Eq. (134)}$$

$$Z=-X1^2M^2(ca+cd)/(2F) \quad \text{Eq. (135)}$$

-continued $$W = F - \left(\frac{4F^4 - 4F^2X1^2M^2(1+cacd) + X1^4M^4(ca+cd)^2}{F^2 - X1^2M^2}\right)^{\frac{1}{2}} / 2, \quad \text{Eq. (136)}$$

$$Z1 = 0 \quad \text{Eq. (137)}$$

where sa=sin α, sd=sin δ, ca=cos α, and cd=cos δ.

The four foci are characterized by the angles +α, −α, +δ, −δ, so that there are two pairs of symmetrical foci. The four associated focal distances have to be identical in order to have a configuration characterized by real quantities. The equation defining Z represents a parabolic function with a curvature depending on the focal distance, magnification factor, and opening angles α and δ. However, the back profile is exactly parabolic as compared to the independent variable X1 but not as compared to the X variable. In practice, because the relation between X and X1 is quasi-linear, the back profile shape can be considered quasi-parabolic.

It is interesting to note that X1 is used as independent variable. When trying to use X as independent variable for deriving (X1,Z,W) instead of (X,Z,W), the solutions can be obtained as a function of the roots of an equation of $6^{th}$ degree.

S. Configuration with ∞ Focal Points

A fifth two-dimensional discrete lens architecture corresponding to the R-2R lens is defined by the following equations:

$$X = X1\frac{(G^2 - X1^2)^{\frac{1}{2}}}{G} \quad \text{Eq. (138)}$$

$$W = 0 \quad \text{Eq. (139)}$$

$$Z = -G/2 + \left(\left(\frac{G}{2}\right)^2 - X^2\right)^{\frac{1}{2}} \quad \text{Eq. (140)}$$

$$Z1 = -G + (G^2 - X1^2)^{\frac{1}{2}} \quad \text{Eq. (141)}$$

In case X is selected as the independent variable, it becomes possible to find the following explicit analytical equations:

$$W = 0 \quad \text{Eq. (142)}$$

$$Z = -G/2 + \left(\left(\frac{G}{2}\right)^2 - X^2\right)^{\frac{1}{2}} \quad \text{Eq. (143)}$$

$$Z1 = -G + (G^2 - X1^2)^{\frac{1}{2}} \quad \text{Eq. (144)}$$

$$X1 = \left(\frac{G\left(G - (G^2 - 4X^2)^{\frac{1}{2}}\right)}{2}\right)^{\frac{1}{2}} \quad \text{Eq. (145)}$$

This lens has an infinite number of focal points located in the same circle constituting the back lens profile. It is able to scan up to ~±60°.

Optimization of Three-Foci Lenses

Next, a procedure for optimizing three-foci lenses such that they exhibit minimized optical aberrations is proposed.

The analytical expressions presented in the preceding section permit defining a) the front lens profile (e.g., Z1 as a function of X1), b) the back lens profile (e.g., Z as a function of X or X1), c) the function W representing the constrained phase shift between the back and front lens (e.g., W as a function of X or X1), d) the relation between the front and the back transversal coordinates, or correspondingly, the relation between homologous discrete elements on the front and back apertures (e.g., X as a function of X1, or X1 as a function of X), and e) the magnification or zooming factor M (e.g., the relation between the pointing angle of the local beam versus the opening angle of the corresponding feed with reference to the central longitudinal axis of the lens). However, these analytical expressions permit to fully define only the R-2R lens, because for this lens the focal arc is defined as well and coincides with the circle representing the back lens profile. For the other configurations, the lens architecture is not complete yet, for instance for the three-foci lens with flat front aperture. For this lens, the optimal relation between the two focal distances G and F (associated, respectively, with the central on-axis focus and the two lateral foci in symmetrical positions) is not known. The first challenge, for the three-foci lens, therefore is the identification of the optimal F/G ratio.

The second challenge consists in identifying the focal arc shape based on different possible criteria. First of all, the focal arc should pass through the focal points, or close by, in order to guarantee minimized aberrations at least in the vicinity of the focal points. Then, a focal arc profile should be defined because the number of beams usually required is much higher than the number of focal points. In the literature, circular, elliptical, or parabolic focal arc profiles have been proposed. This type of choice implies advantages in terms of manufacturability. In the present disclosure it will be shown that a different type of focal arc profile should be adopted if the priority in the design is the minimization of the maximum aberrations versus the scanning angles for an assigned focal distance (e.g., for an assigned volumetric envelope of the lens architecture).

The opening angle α of the lens that is associated with the two symmetrical focal points is considered to be assigned. One of the two focal distances G (associated with the central focal point located on the lens axis), or F (associated with the lateral focal points) is considered to be assigned. The first step now would be to identify the second focal distance adopting a procedure more rigorous than the known procedures.

Step 1: Estimation of the Second Focal Distance

Instead of fixing as first target the minimization of the maximum aberration in the entire field of view comprised between the extreme angles (e.g., between −α and +α, it may be more effective to derive the second focal distance in such a way to minimize the minimum optical aberration inside the field of view. In practice, as a rule of thumb, the second focal distance can be derived trying to minimize the aberration in an intermediate angle Y, $$\sin\gamma \sim (\alpha \text{ in radians})/\pi = (\alpha \text{ in degrees})/180° \quad \text{Eq. (146)}$$

In this condition, the following expression represents a good approximation for the relation between the two focal distances G and f:

$$F = G\left(\alpha - \frac{\alpha^3}{6} - \frac{\alpha^5}{12}\right)/\sin(\alpha) \quad \text{Eq. (147)}$$

Eqs. (146) and (147) are heuristic equations and have been derived empirically after several optimizations. They have also been validated for different values of the angle α that defines the positions of the two lateral foci. Especially Eq. (147) represents a more general and more accurate relation compared to the rule of thumb relations presently known in the literature (that have been mainly validated for a specific angle, typically α=30°).

Step 2: Estimation of the Focal Arc

For every pointing direction associated with a generic angle δ, the local focal distance is derived by enforcing that the aberrations associated with the two extreme points (locations) of the lens, i.e., the points characterized by a minimum and maximum value for the transversal coordinate X1 (and X), are equal in terms of absolute value, but opposite in terms of sign. This assumption, combined with the Eqs. (146) and (147), is instrumental for obtaining a quasi-Chebyshev behavior for the optical aberrations as well as the possibility to obtain two additional quasi-foci in addition to the three assigned foci. This choice guarantees a locally optimum solution because small variations from the optimized values imply an increase of the aberrations. The focal distance associated with a generic angle δ can be expressed by $$Hz = -H(1-u^2)^{\frac{1}{2}},\ Hx = Hu,\ u = \sin(\delta) \qquad \text{Eq. (148)}$$

The aberrations in the positive and negative extremal points of the lens have to satisfy, respectively, the following two equations, $$\text{Aberration}(\text{in}+X) = \left((Hx-X)^2 + (Hz-Z)^2\right)^{\frac{1}{2}} + W + X1uM - g \qquad \text{Eq. (149)}$$

$$\text{Aberration}(\text{in}-X) = \left((Hx+X)^2 + (Hz-Z)^2\right)^{\frac{1}{2}} + W - X1uM - g \qquad \text{Eq. (150)}$$

Enforcing that these two aberrations assume opposite values will yield $$\sqrt{(Hx-X)^2 + (Hz-Z)^2} + \sqrt{(Hx+X)^2 + (Hz-Z)^2} = 2(H-W) \qquad \text{Eq. (151)}$$

It should be noted that all variables appearing in Eqs. (148) to (151) represent values evaluated at the edges of the lens. When solving Eq. (151) for the unknown H, the solution can be derived as a function of the solutions of a $3^{rd}$ degree equation. The acceptable solution can be derived in explicit analytical form, but is not reported here for reasons of conciseness. For u=sin δ=0, the solution takes a particularly simple form, $$H = (W^2 - X^2 - Z^2)/(2W + 2Z) \qquad \text{Eq. (152)}$$

where again W, X, Z are evaluated in the peripheral point of the lens with X1 and X maximum. This last solution can be derived also by the easier equation corresponding to a single focus on the lens axis. If it is preferred to avoid the above solution of the $3^{rd}$ degree equation, a simpler approximated analytical expression for the local focal distance can be obtained by adopting a perturbative approach. Assuming that H differs from the linear approximating value between the two extremes G and F by an addictive factor ΔH will yield $$H = G + u/sa(F-G) + \Delta H \qquad \text{Eq. (153)}$$

where again sa=sin α and u is the sine of the local angle. When solving Eq. (151) using Eq. (153) adopting a McLaurin expansion in ΔH, one obtains a linear equation in ΔH whose solution is given by $$\begin{aligned}
&\Delta H = -(2W - 2G + \qquad \text{Eq. (154)}\\
&\left(\left(Z + (1-u^2)^{\frac{1}{2}}\left(G + \frac{u(F-G)}{sa}\right)\right)^2 + \left(X + u\left(G + \frac{u(F-G)}{sa}\right)\right)^2\right)^{\frac{1}{2}} +\\
&\left(\left(Z + (1-u^2)^{\frac{1}{2}}\left(G + \frac{u(F-G)}{sa}\right)\right)^2 + \left(X - u\left(G + \frac{u(F-G)}{sa}\right)\right)^2\right)^{\frac{1}{2}} -\\
&\qquad\qquad (2u(F-G))/sa)/\\
&((\left(Z + (1-u^2)^{\frac{1}{2}}\left(G + \frac{u(F-G)}{sa}\right)\right)(1-u^2)^{\frac{1}{2}} +\\
&\qquad\qquad u(X + u(G + (u(F-G))/sa)))/\\
&\left(\left(Z + (1-u^2)^{\frac{1}{2}}\left(G + \frac{u(F-G)}{sa}\right)\right)^2 + \left(X + u\left(G + \frac{u(F-G)}{sa}\right)\right)^2\right)^{\frac{1}{2}} +\\
&\quad (\left(Z + (1-u^2)^{\frac{1}{2}}\left(G + \frac{u(F-G)}{sa}\right)\right)(1-u^2)^{\frac{1}{2}} -\\
&\qquad\qquad u(X - u(G + (u(F-G))/sa)))/\\
&\left(\left(Z + (1-u^2)^{\frac{1}{2}}\left(G + \frac{u(F-G)}{sa}\right)\right)^2 + \left(X - u\left(G + \frac{u(F-G)}{sa}\right)\right)^2\right)^{\frac{1}{2}} -\\
&\qquad\qquad 2)
\end{aligned}$$

One could also use a McLaurin expansion up to the $2^{nd}$ order and identify the acceptable solution among the resulting two solutions to find similar results. Also a graphical iterative solution could be applied to estimate H. In practice, in order to obtain a more accurate value for H, the $3^{rd}$ degree equation Eq. (151) could be rigorously solved. It is interesting to note that the resulting solution that gives the local optimized focal distance does not depend on the zoom parameter, because the two terms containing the zoom parameter cancel out when summing the aberrations on the two extreme points of the lens. Adopting an equation for the focal distance permits avoiding the evaluation of double loops extended to all the points of the lens. In addition it is not necessary to consider a high number of points on the lens profile to achieve a good convergence, since only two extreme points of the lens are required. On the overall, Step 2 permits to significantly speed up the design procedure, avoiding brute force optimization of the focal distance.

It may be observed that there is a second possible interpretation for Eq. (151). For every generic pointing direction (associated with the angle δ) the local focal distance H may be equivalently derived by enforcing that the aberration associated with the extreme rim point closest to the feed is equal in terms of absolute value, but opposite in terms of sign, to the aberration on the same extreme point when illuminated by the opposite feed (placed in Hz and −Hx) and creating a beam in the opposite direction (−δ).

Step 3: Iterative Refinement

Steps 1 and 2 can be repeated iteratively, for example adopting a gradient-like algorithm, in order to minimize the maximum aberrations in the entire field of view and to guarantee a Chebyshev-like equi-ripple profile for the maximum aberrations as function of the scanning angle. An efficient way to speed up convergence involves choosing, as local error, the difference between the two local maxima in the aberrations as they appear in the interval [0, $\alpha$] (the aberrations are of course symmetric in the interval [$-\alpha$, 0]). The iterative procedure can be considered completed when the differences between the two local maxima in the aberrations becomes smaller than an assigned (e.g., predefined) threshold, for example. Under this condition, quasi equi-ripples are obtained (e.g., a Chebyshev-like shape for the optical aberrations) and the discrete lens with three foci exhibits quasi five focal points. In fact, by refining the Chebyshev-like equi-ripple condition on the maxima likewise permits to push the maximum aberrations in two additional symmetric points associated with the new pseudo-foci to zero.

Notably, a five-foci Rotman lens has been proposed also in R. P. Singh Kushwah, P. K. Singhal, "Design of 2D-Bootlace Lens with Five Focal Feed for Multiple Beam Forming," J. Electromagnetic Analysis δ Applications, 2011, 3, 39-42 doi: 10.4236/jemaa.2011.32007 Published Online February 2011. However, it can be easily verified that a discrete lens with a flat front surface cannot exactly guarantee the presence of five perfect foci in terms of geometrical optics. It is interesting to note that a five-foci condition can be enforced numerically for a single point of the lens, but an analytically defined unique lens cannot guarantee five perfect geometrical optics foci for all the points of the lens. By contrast, the presently proposed solution converges to a five-foci lens architecture for all the points of the lens.

Figure 18A:
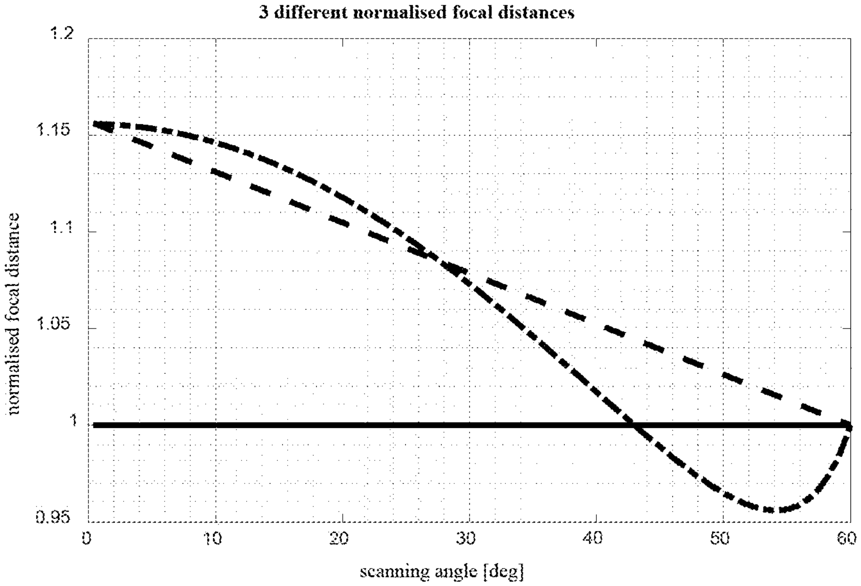
FIG. 18A and FIG. 18B are diagrams schematically illustrating examples of focal arcs and optical aberrations, respectively, for selected two-dimensional discrete lens configurations.
Figure 18B:
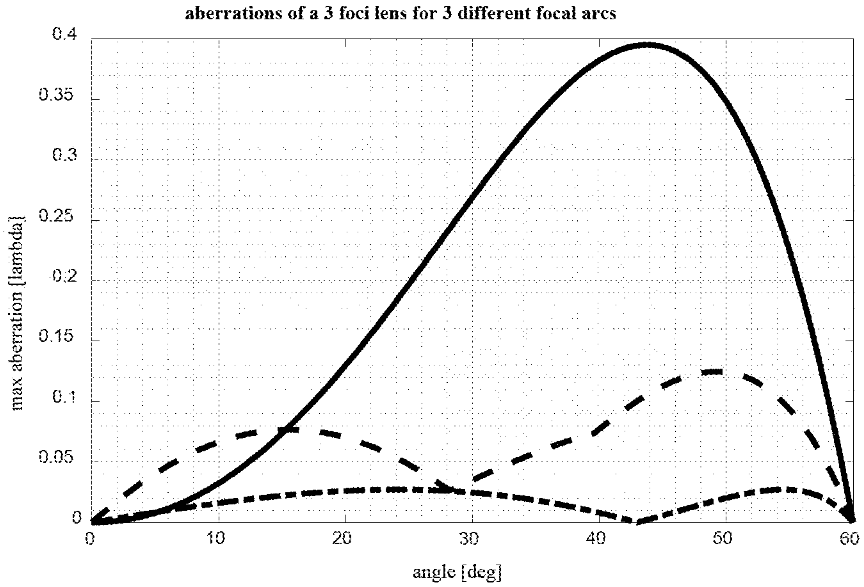
Figure 19:
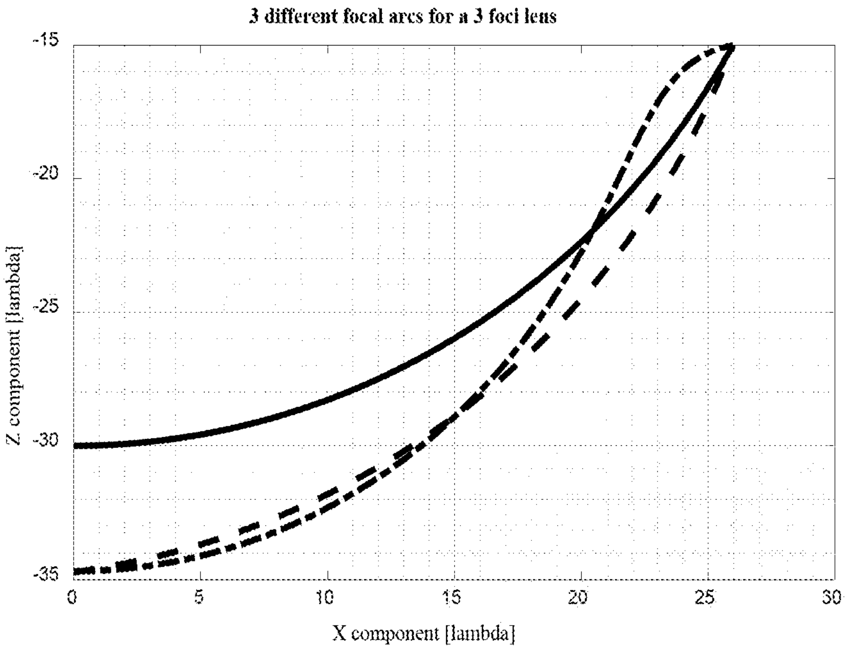
FIG. 19 is a diagram schematically illustrating an example of the x and z components of the optical aberration for one of the two-dimensional discrete lens configurations.

As an illustrative example, one can assume a lens characterized by a ratio between the external focal distance F (associated with the maximum scanning angle $\alpha$) and the diameter D of the front lens that is unitary, F/D=1. The example may further assume D=30 $\lambda$, $\alpha$=60°. The axial focal length is denoted by G. Three configurations can be compared. The first configuration is such that G=F=30$\lambda$ and for every angle comprised between the extreme angles ($-\alpha$ and $+\alpha$) the focal distance is assumed to be equal to F=G. In this case the arc is perfectly circular. The second configuration is such that the value of G versus F (or, vice versa, F versus G) is given by the heuristic expression of Eq. (147) presented in Step 1 above and, for every angle comprised between the extreme angles ($-\alpha$ and $+\alpha$), the focal distance is assumed to change linearly as compared to the extreme values F and G. Finally, the third configuration is such that the value of G versus F (or, vice versa, F versus G) is given again by the heuristic expression of Eq. (147) and, for every angle comprised between the extreme angles ($-\alpha$ and $+\alpha$), the focal distance is optimized by adopting the procedure detailed in the Step 2 and 3 above for achieving a Chebyshev-like envelope for the maximum aberration levels. The resulting focal arcs and associated aberrations are illustrated in FIG. 18. Specifically, FIG. 18A shows the three focal arcs, normalized as compared to F and represented in a Cartesian representation, as a function of the scanning angle (horizontal axis: scanning angle in degrees; vertical axis: normalized focal distance). FIG. 18B shows the maximum aberrations expressed in units of wavelength A as functions of the scanning angle (horizontal axis: angle in degrees; vertical axis: max aberration in degrees). As is typically done, for every scanning angle the associated maximum aberration represent the worst value for the entire lens. Only half of the scanning angle range is shown in FIG. 18 since the other half is perfectly symmetric. The curves relevant to the first configuration are black continuous lines, the curves relevant to the second configuration are black dashed lines, and the curves relevant to the third configuration are dash-dotted lines. The optimized focal distance in FIG. 18A in dash-dotted line exhibits a curved profile. FIG. 19 shows the same focal arcs using their x and z components, in order to present the curvature with a more correct perspective (horizontal axis: X component in units of $\lambda$; vertical axis: Z component in units of $\lambda$). It is important to note that the third configuration presents aberrations about 15 times lower than for the first configuration.

Two additional properties can be derived. In correspondence to the angle $\gamma$ satisfying $$\sin\gamma \sim (\alpha \text{ in radians})/\pi = (\alpha \text{ in degrees})/180° \quad \text{Eq. (155)}$$

(see also Eq. (146)), the optimized focal distance has a value which can be estimated using the linear interpolation between the extreme focal distances F and G. This focal distance is already quite well optimized. In correspondence to the angle $\delta$ satisfying $$\sin\delta \sim (\alpha \text{ in radians})2/\pi = (\alpha \text{ in degrees})/90° \quad \text{Eq. (156)}$$

the optimized focal distance has a value similar to F and the aberrations are practically negligible. This angle $\delta$ plays a pivotal role in this quasi five-foci lens design. The tri-focal lens, with initial foci in correspondence to the angles $-\alpha$, 0, $+\alpha$ exhibits at the end of Steps 2 and 3 two additional quasi perfect foci in correspondence of the angles $-\delta$ and $+\delta$. For $\alpha=\pi/4$ from the previous equations one derives $\delta=\pi/6=\frac{2}{3}\alpha$ and $\gamma\sim\pi/12$. The sines of the angles $\gamma$ and $\delta$ are related by a simple factor equal to 2.

Optimization of Four-Foci Lenses

Next, a procedure for optimizing four-foci lenses such that they exhibit minimized optical aberrations is proposed.

As starting point, a two-dimensional discrete four-foci lens with a flat profile, four identical focal distances, focal points associated to the opening angles $-\alpha$, $-\delta$, $+\delta$, $+\alpha$ (with $\delta<\alpha$) is considered. As anticipated in the preceding section, it is simple to verify that the four focal distances associated with the four focal points must be identical, since otherwise the four-foci lens with flat front profile would not satisfy the four geometrical optics equations associated with the path lengths. The first challenge in the design of this bootlace lens is the derivation of the ideal position of the two internal foci characterized by the angle $\delta$ as compared to the positions of the two external foci, characterized by the angle $\alpha$, assumed fixed. Any choice is allowed for $\delta$ but only one choice guarantees minimized optical aberrations. The second challenge is the derivation of the optimal focal arc.

Step 1: Estimation of the Internal Angle $\delta$

The equation derived in the previous section for the angle $\delta$ can be used here.

Step 2: Estimation of the Focal Arc

For every generic pointing direction, ranging from 0 to a, the local focal distance is derived enforcing that the aberrations associated to the two extreme points (locations) of the lens, i.e., the points characterized by a minimum and maximum value for the transversal coordinate X1 (and X), are equal in term of modulus and opposite in terms of sign. This step coincides with Step 2 proposed above for the three-foci lens. By solving a third degree equation, the local focal distance can be estimated in an analytical form (see Step 2 for the design for the three-foci lens).

Step 3: Iterative Refinement

Step 1 described above is repeated iteratively, e.g., adopting a gradient-like algorithm. The internal angle δ is slightly modified in order to minimize the maximum aberrations in the entire field of view and to guarantee a Chebyshev-like equi-ripple profile for the maximum aberrations versus the scanning angle. As done for the three-foci lens, an efficient way to speed up convergence involves choosing, as local error, the difference between the two local maxima in the absolute value of the aberrations. These two local maxima are located approximately in the angles γ1 and γ2, $$\sin\gamma 1 \sim (\alpha \text{ in radians})/\pi \qquad \text{Eq. (157)}$$

and $$\sin\gamma 2 \sim \left[(\alpha \text{ in radians})2/\pi + \sin\alpha\right]/2 \qquad \text{Eq. (158)}$$

The iterative procedure can be considered completed when the differences between the two local maxima in the aberrations tend to zero and becomes smaller than an assigned (e.g., predefined) threshold. Under this condition, quasi equi-ripples are obtained (e.g., a Chebyshev-like shape for the optical aberrations). The two-dimensional discrete lens antenna with four focal points, after applying Steps 1 to 3 above exhibits minimum aberrations with an equi-ripple shape and exhibits quasi five focal points. The additional quasi focal point is located in the lens axis. The optimized internal angle δ likewise satisfies the empirical relation identified for the three-foci lens, $$\sin\delta \sim (\alpha \text{ in radians})2/\pi = (\alpha \text{ in degrees})/90° \qquad \text{Eq. (159)}$$

For α=π/4, this heuristic equation gives an internal angle exactly equal to π/3 which seems particularly accurate.

Figure 20:
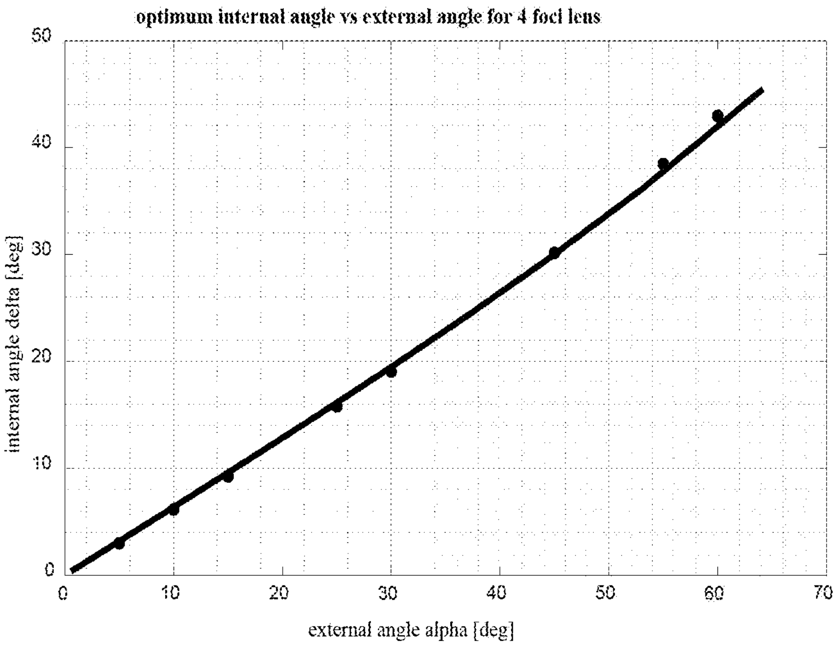
FIG. 20 is a diagram schematically illustrating an example of the internal angle δ as function of the internal angle α for a four-foci two-dimensional discrete lens.

In FIG. 20, the optimized internal angle δ (in degrees) for the four-foci lens is shown as a function of the external angle (in degrees) (horizontal axis: external angle α in degrees; vertical axis: internal angle δ in degrees). Therein, the dots represent the numerical optimized values and the black continuous line represents the interpolating heuristic curve as per Eq. (156). It has been verified numerically that similar results in terms of optical aberrations and focal arc shape can be obtained when the design procedure considers different starting points, including a) a three-foci lens with flat front profile, fixed external angle, fixed value for the external focal distance, and fixed diameter for the lens, b) a three-foci lens with flat front profile, fixed external angle, fixed value for the axial focal distance, and fixed diameter for the lens, and c) a four-foci lens with flat front profile, fixed external angle, fixed identical value for the four focal distances, and fixed diameter for the lens.

Figure 21:
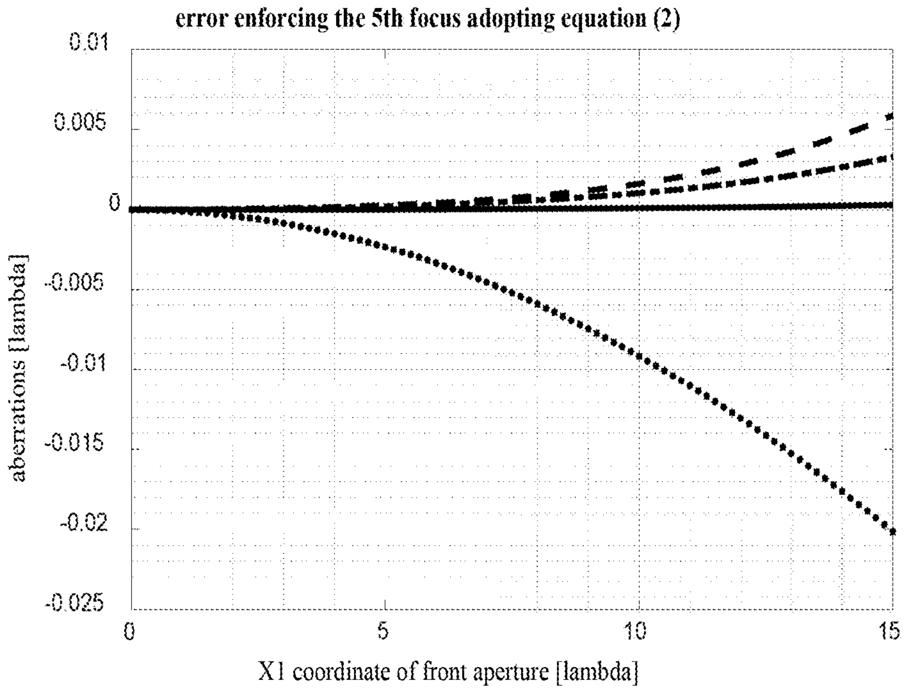
FIG. 21 is a diagram schematically illustrating an example of the optical aberrations of a pseudo five-foci lens as function of the lateral coordinate.

In order to estimate the accuracy of the $5^{th}$ focus in a four-foci lens designed with the above procedure(s) a four-foci lens with a focal distance F=30λ can be considered as an example. The angle α can take four possible values: 15°, 30°, 45°, and 60°. Further, the magnification factor in the example is given by M=1 and the diameter of the front lens is equal to F. With these inputs, the X, W, Z variables can be derived using the analytical equations for the four-foci lens. The internal angle of the four-foci lens can be estimated using Eq. (156). Adopting also Eq. (147) to approximate G as a function of F, the errors on the lens surface illuminated by the $5^{th}$ quasi-focus located on the lens axis in the point (0,−G) can be derived for the four possible values for the angle α and are shown in FIG. 21 (horizontal axis: X1 coordinate of front aperture in units of λ; vertical axis: aberrations in units of λ). In particular, the continuous line refers to the lens of α=15°, the dash-dotted line refers to the case of α=30°, the dashed line refers to the case of α=45°, and the dotted line refers to the case of α=60°.

It is important to note that these errors are evaluated at the beginning of the design procedure. At the end of the design procedure, the residual errors are by three to four orders of magnitude smaller. In fact, as a non-limiting example, for α=0.987 radians, using the following equation instead of Eq. (147) to link F and G, $$F = G\left(\alpha - \frac{\alpha^3}{6} - \frac{\alpha^5}{12} + \frac{\alpha^7}{454.3}\right)/\sin(\alpha) \qquad \text{Eq. (160)}$$

the maximum error at the edge of the aperture can be found to be about $7.36\cdot10^{-7}\lambda$.

General Optimization Procedure

Next, a general procedure for deriving the optimal focal arc of a two-dimensional bootlace lens and for minimizing optical aberrations will be described. This general procedure can be used for the three- and four-foci lenses considered above, but can likewise be applied to any type of (two-dimensional) discrete lens antennas. The procedures presented above (involving enforcing the aberrations in the two extreme points of the lens to be identical in absolute value but with opposite sign) is valid for lenses having two symmetric focal points at the beginning and at the end of the scanning region (i.e., in correspondence to the angles −α and +α. There may be lenses, for instance lenses having a unique central focal point located in the lens axis, for which the above design procedures cannot be applied. Without intended limitation, the general design procedure for identify the optimal focal arc as presented below may be useful for the following lenses:

1) a two-dimensional discrete lens antenna with a single focal point, flat front profile (i.e., Z1=0), spherical back profile, and identical phase shifter lines (i.e., W=0),
2) a two-dimensional discrete lens antenna with two focal points, flat front profile (i.e., Z1=0), elliptical back profile, and identical phase shifter lines (i.e., W=0), and
3) a two-dimensional discrete lens antenna obtained as an average of the single and dual focal points lenses (see the example presented in FIG. 25).

The proposed procedure is organized in the following steps:

Step A

For every generic pointing direction/feed angle (associated with the angle δ) and for every point on the lens there exists a focal distance which guarantees, only locally, the perfect cancellation in terms of geometrical optics of the optical aberrations. After defining the Cartesian coordinates of the unknown local feed, $$Hz = -H\cos(\delta),\ Hx = H\sin(\delta) \qquad \text{Eq. (161)}$$

by enforcing the aberrations to be null in a generic point of the lens, $$\left((-H\cos(\delta)-Z)^2+(H\sin(\delta)-X)^2\right)^{\frac{1}{2}}+W+X1\sin(\delta)M-Z1\left(1-(\sin(\delta)M)^2\right)^{\frac{1}{2}}-H=0 \quad \text{Eq. (162)}$$

The unknown H (feed distance) can be derived as $$H=-\left(X^2-(W+X1M\sin(\delta))^2+Z^2\right)/(2W+2Z\left(1-\sin(\delta)^2\right)^{\frac{1}{2}}-2X\sin(\delta)+2X1M\sin(\delta)) \quad \text{Eq. (163)}$$

This expression is valid for two-dimensional discrete lenses with flat front profile, i.e., Z1=0. For more generic lenses with a curved front profile (i.e., Z1≠0) the solution is given by $$H=-(X^2-W^2+Z^2-Z1^2-X1^2M^2\sin(\delta)^2+Z1^2M^2\sin(\delta)^2+2WZ1\left(1-M^2\sin(\delta)^2\right)^{\frac{1}{2}}-2WX1M\sin(\delta)+2X1Z1M\sin(\delta)\left(1-M^2\sin(\delta)^2\right)^{\frac{1}{2}})/(2W+2Z\cos(\delta)-2X\sin(\delta)-2Z1\left(1-M^2\sin(\delta)^2\right)^{\frac{1}{2}}+2X1M\sin(\delta)) \quad \text{Eq. (164)}$$

The optimum focal distance for every point of the lens and for the generic pointing angle δ is now available. However, this focal distance permits only to guarantee that the aberrations are null in the specific point considered and, by definition, in the center point of the lens located in the central axis.

Step B

Keeping fixed the generic angle δ, for every local focal distance evaluated at step A, the maximum aberration on the entire lens is evaluated. Of course every local focal distance guarantees zero aberrations only in the origin of the lens and on the single point where the local distance has been evaluated. After repeating this evaluation for every local focal distance, the local focal distance which guarantees the minimum value for the maximum aberration on the entire lens is identified as best focal distance for the local angle δ. It is important to note that in order to obtain accurate results, the lens should be sampled with a sufficiently small granularity. For this reason, the applicability of step B might be computationally more intensive especially when considering electrically large lenses.

Step C

The above procedure is repeated for all the pointing angles. When changing the pointing angle δ from 0 to α (maximum scanning angle of the lens), the point on the lens which gives the best local focal distance moves from the center of the lens towards the edge closer to the feed. At a certain point, when this point arrives close to the edge closer to the feed, this local point jumps to the other extreme and, when scanning further, the point moves towards the center of the lens from the other extreme. The function relating the local scanning angle to the local point characterizing the focal distance evaluated at step A may be highly nonlinear and therefore difficult to invert. In practice, the above procedure has to be repeated when changing a single parameter of the lens, using a sufficient number of points on the lens profile.

Step D

After applying the three previous steps, if the lens parameters are fixed and considered already optimized, the focal arc is defined. This is the case for instance for discrete two-dimensional lenses with a single focal point, two focal points or an infinite number of focal points. If on the other hand one or more parameters of the lens have to be further optimized, steps A to C may be included into an optimizer (e.g., a gradient optimizer or a Newton optimizer) and repeated until minimized aberrations are derived. This second possibility may occur, for instance, in the case of discrete lenses with three foci (where the optimum ratio between the central and lateral focal distance is not known a priori) or in the case of discrete lenses with four focal points (where the optimum position of the two inner focal points as compared to the two lateral ones is not known a priori). However, for the three- and four-foci lenses the dedicated design procedures presented above may be faster and more elegant.

The procedure proposed here is general and robust and can be easily implemented in numerical code. It can be applied also to the case of three-dimensional discrete lens architectures.

Figure 22:
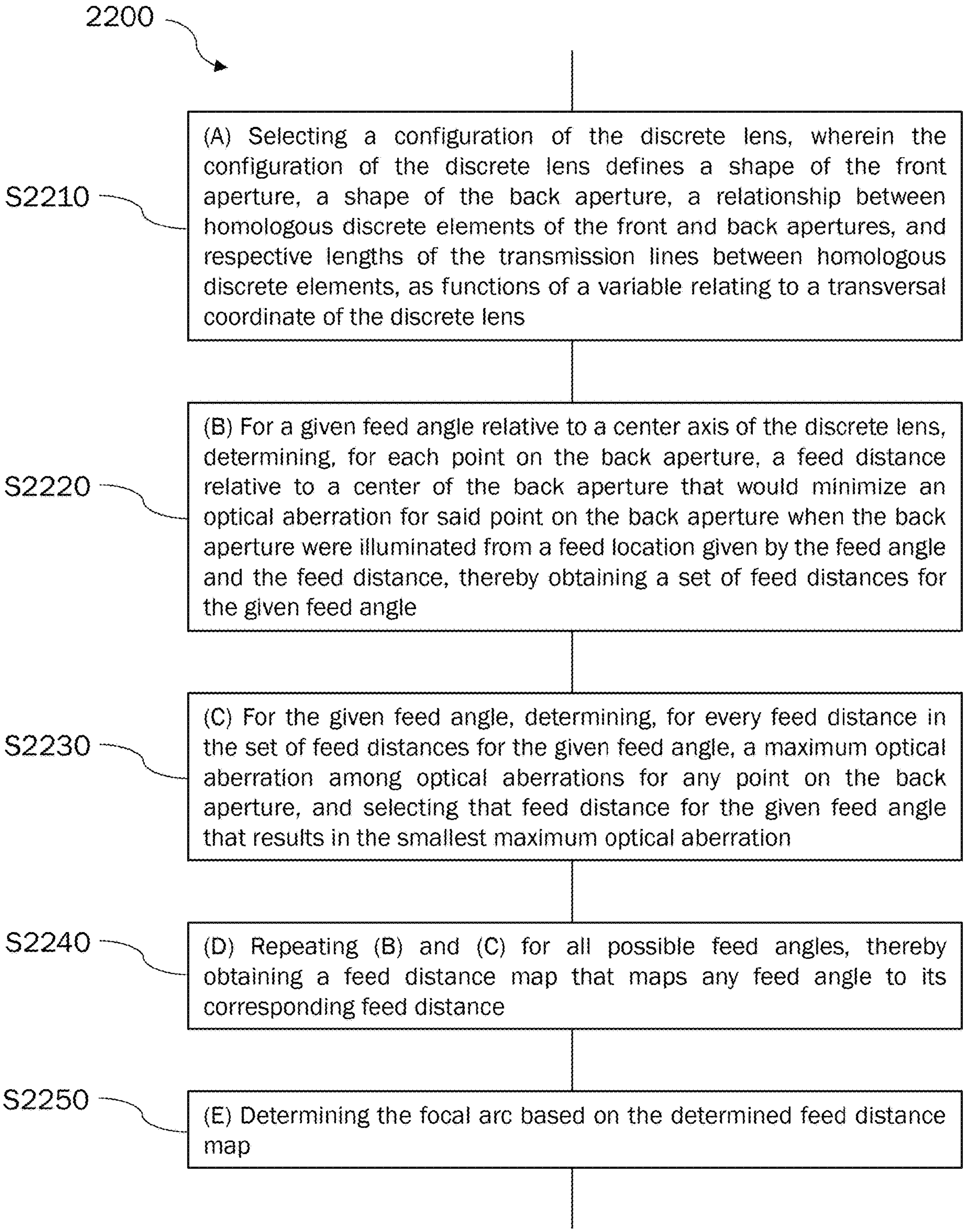
FIG. 22 is a flowchart schematically illustrating an example method of determining a focal arc for a two-dimensional (or three-dimensional) discrete lens.

In line with the above, FIG. 22 illustrates a method 2200 of determining a focal arc for a two-dimensional discrete lens, such as a two-dimensional discrete lens for a beamforming network, for example. The focal arc may be an optimum focal arc, for example in that it minimizes optical aberration. As described above, the discrete lens has a front aperture and a back aperture, each comprising a plurality of discrete elements. Each discrete element of the back aperture is homologous to a respective discrete element of the front aperture, and the discrete lens further comprises a plurality of transmission lines connecting respective pairs of homologous discrete elements of the front aperture and the back aperture. The method 2200 comprises method steps S2210 through S2250.

At step S2210, a configuration of the discrete lens is selected. The configuration of the discrete lens defines a shape of the front aperture, α shape of the back aperture, α relationship between homologous discrete elements of the front and back apertures, and/or respective lengths of the transmission lines between homologous discrete elements, as functions of a variable relating to a transversal coordinate of the discrete lens.

At step S2220, for a given feed angle relative to a center axis of the discrete lens, for each point on the back aperture, a feed distance relative to a center of the back aperture that would minimize an optical aberration for said point on the back aperture when the back aperture were illuminated from a feed location given by the feed angle and the feed distance is determined. This will yield a set of feed distances for the given feed angle. This step is in line with step A described above.

At step S2230, for the given feed angle, for every feed distance in the set of feed distances for the given feed angle, a maximum optical aberration among optical aberrations for any point on the back aperture is determined. Based thereon, that feed distance for the given feed angle is selected that results in the smallest maximum optical aberration. This step is in line with step B described above.

At step S2240, the operations of steps S2220 and S2230 are repeated for all possible feed angles. This will yield a feed distance map that maps any feed angle to its corresponding feed distance. The possible feed angles may be defined (e.g., bounded) by the maximum scanning angle. This step is in line with step C described above.

Finally, at step S2250, the focal arc is determined based on the determined feed distance map. For instance, for every feed angle, a respective point of the focal arc may be determined using the corresponding feed distance as given by the feed distance map. This is in line with step D described above.

As noted above, it has been found that the peripheral points (locations) of the lens give the highest contributions to the optical aberration. This allows for an alternative method of determining the focal arc, provided that the discrete lens has a pair of symmetrical off-axis focal points.

Figure 23:
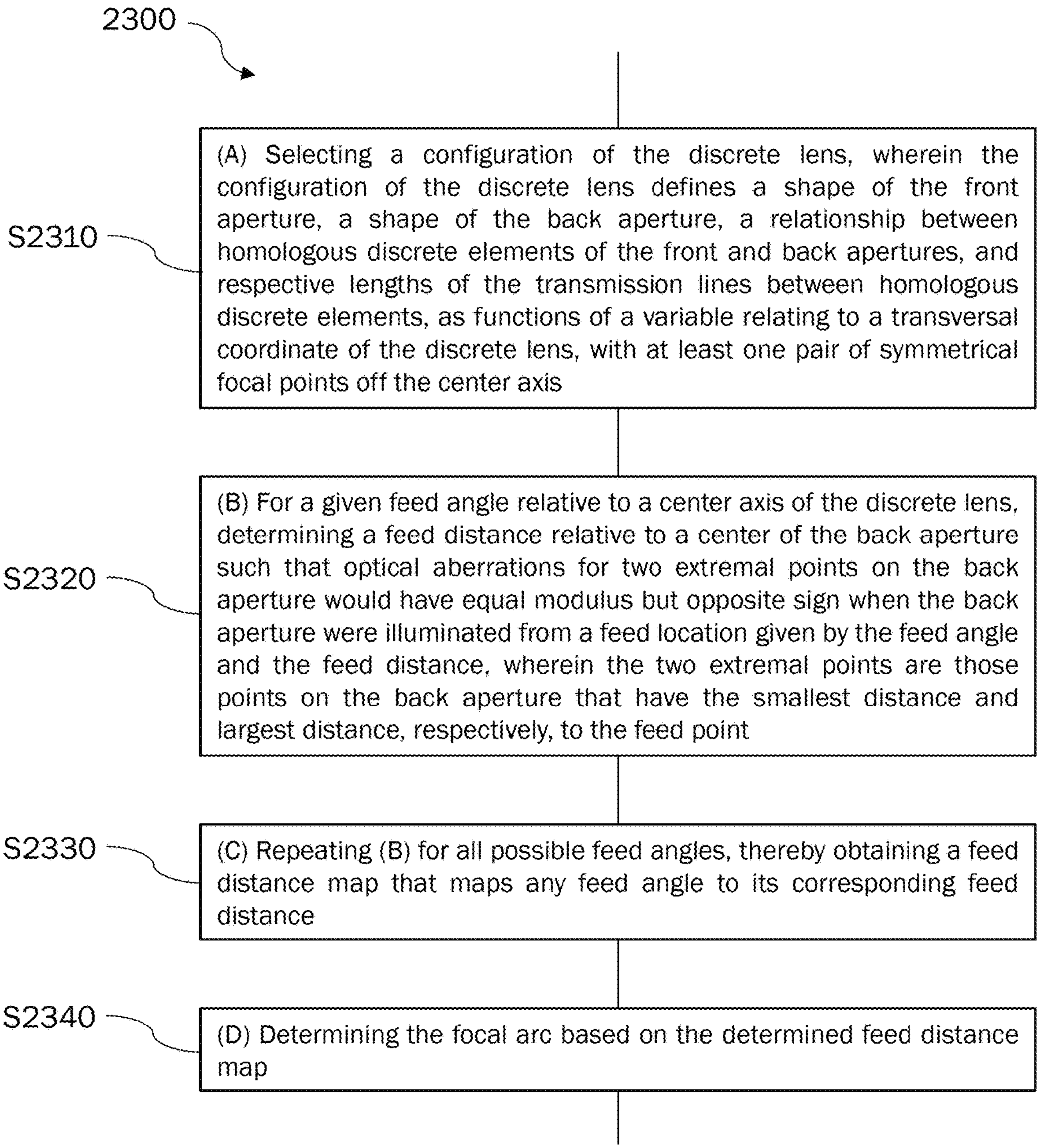
FIG. 23 is a flowchart schematically illustrating another example method of determining a focal arc for a two-dimensional (or three-dimensional) discrete lens.

Thus, FIG. 23 illustrates another method 2300 of determining a focal arc for a two-dimensional discrete lens, such as a two-dimensional discrete lens for a beamforming network, for example. The focal arc may be an optimum focal arc, for example in that it minimizes optical aberration. Again, as described above, the discrete lens has a front aperture and a back aperture, each comprising a plurality of discrete elements. Each discrete element of the back aperture is homologous to a respective discrete element of the front aperture, and the discrete lens further comprises a plurality of transmission lines connecting respective pairs of homologous discrete elements of the front aperture and the back aperture. The method 2300 comprises method steps S2310 through S2340.

At step S2310, a configuration of the discrete lens is selected. The configuration of the discrete lens defines a shape of the front aperture, α shape of the back aperture, α relationship between homologous discrete elements of the front and back apertures, and respective lengths of the transmission lines between homologous discrete elements, as functions of a variable relating to a transversal coordinate of the discrete lens, with at least one pair of symmetrical focal points off the center axis.

At step S2320, for a given feed angle relative to a center axis of the discrete lens, a feed distance relative to a center of the back aperture is determined such that optical aberrations for two extremal points on the back aperture would have equal modulus but opposite sign when the back aperture were illuminated from a feed location given by the feed angle and the feed distance. Therein, the two extremal points are those points on the back aperture that have the smallest distance and largest distance, respectively, to the feed point.

At step S2330, the operations of step S2320 are repeated for all possible feed angles. This will yield a feed distance map that maps any feed angle to its corresponding feed distance.

Finally, at step S2340 the focal arc is determined based on the determined feed distance map. For instance, for every feed angle, a respective point of the focal arc may be determined using the corresponding feed distance as given by the feed distance map.

The following considerations hold for both methods 2200 and 2300, as well as the method organized in steps A to D.

If the parameters of the discrete lens are not yet fully fixed or optimized, the configuration of the discrete lens (e.g., as defined in steps S2210, S2310) and the feed distance map (e.g., as defined in steps S2240, S2330) may depend on at least one (free) parameter. This parameter may be a parameter indicative of or relating to locations of one or more focal points of the discrete lens. Then, respective methods may further comprise a step of adjusting the at least one parameter to optimize optical aberration of the discrete lens. For example, this may be achieved by repeated execution of steps S2220 to S2240 or S2320 to S2330 in the framework of an optimization procedure for the free parameter, seeking to minimize optical aberrations. Examples of such cases are given below.

As an example, the configuration of the discrete lens may define a flat profile for the shape of the front aperture (i.e., Z1=0), with a first focal point of the discrete lens on the center axis and a pair of symmetrical second focal points off the center axis. For such lens, the ratio of focal distances h and f of the first and second focal points is not a priori fixed and thus can be optimized. As a starting point, it may be assumed that respective focal distances h and f of the first and second focal points, respectively, satisfy the relation $$f = \frac{h}{\sin(\alpha)} \cdot \left(\alpha - \alpha^{3/6} - \alpha^{5/12}\right),$$

where α is the inclination angle of the second focal points relative to the center axis. Then, the aforementioned methods may further comprise, after determining the feed distance map (e.g., at step S22224 or step S2330), adjusting at least one of the focal distances h and f to minimize optical aberration. As noted above, adjusting in the present context may mean or involve optimizing the at least one of the focal distances, for example by iterative optimization. For instance, adjusting the at least one of the focal distances h and f to minimize optical aberration may comprises, for at least one feed angle relative to the center axis, adjusting the at least one of the focal distances h and f such that a difference between optical aberrations for two extremal points on the back aperture would be smaller than a predefined threshold when the back aperture were illuminated from a feed location given by the at least one feed angle and a corresponding feed distance indicated by the feed distance map. Therein, the two extremal points are understood to be those points on the back aperture that have the smallest distance and largest distance, respectively, to the feed point.

Moreover, the aforementioned method(s) of determining or optimizing the focal arc may be applicable to a large number of possible lens configurations (e.g., as selected in steps S2210 or S2310). In particular, the aforementioned method(s) may be applicable to two-dimensional discrete lens architectures O through S defined above, as well as to the three-dimensional discrete lens architectures defined herein. Non-limiting examples will be given below.

As a first example, the configuration of the discrete lens may define a flat profile for the shape of the front aperture, α spherical profile for the shape of the back aperture, and equal lengths of the transmission lines, with a single focal point of the discrete lens on the center axis.

As a second example, the configuration of the discrete lens may define a flat profile for the shape of the front aperture, an elliptical profile for the shape of the back aperture, and equal lengths of the transmission lines, with a pair of symmetrical focal points off the center axis.

As a third example, the configuration of the discrete lens may be determined by averaging between a first intermediate configuration of the discrete lens and a second intermediate configuration of the discrete lens. Therein, the first intermediate configuration of the discrete lens may define a flat profile for the shape of the front aperture, a spherical profile for the shape of the back aperture, and equal lengths of the transmission lines, with a single focal point of the discrete lens on the center axis. The second intermediate configuration of the discrete lens may define a flat profile for the shape of the front aperture, an elliptical profile for the shape of the back aperture, and equal lengths of the transmission lines, with a pair of symmetrical focal points off the center axis.

As a fourth example, the configuration of the discrete lens may define a flat profile for the shape of the front aperture, with four focal points of the discrete lens, wherein the four focal points have identical focal distance.

As a fifth example, the configuration of the discrete lens has four focal points off the center axis. As noted above, in this case, when following the above optimization procedure(s) for the focal arc, the optical aberration for the discrete lens would, for the determined focal arc, follow a Chebyshev-like equi-ripple shape with five quasi-focal points, one of them on the center axis.

As a sixth example, the configuration of the discrete lens may have four focal points arranged in first and second pairs of symmetric focal points. The angles α and δ of the focal points may satisfy the relation sin $$(\delta) \approx \frac{2\alpha}{\pi},$$

where α is the inclination angle of the first pair of focal points satisfy the relation sin relative to the center axis, 8 is the inclination angle of the second pair of focal points relative to the center axis, and δ is smaller than α. As noted above, in this case, when following the above optimization procedure(s) for the focal arc, the optical aberration for the discrete lens would, for the determined focal arc, follow a Chebyshev-like equi-ripple shape with five quasi-focal points, one of them on the center axis.

In a seventh example, the configuration of the discrete lens may have three focal points, one of them on the center axis and the remaining two focal points forming a pair of symmetric focal points. As noted above, also in this case, when following the above optimization procedure(s) for the focal arc, the optical aberration for the discrete lens would, for the determined focal arc, follow a Chebyshev-like equi-ripple shape with five quasi-focal points, one of them on the center axis.

Moreover, in the selected configuration of the discrete lens for which the focal arc is to be optimized, a ratio of a size of the back aperture and a size of the front aperture may define a zooming factor that determines a relationship between an angle of incidence of electromagnetic radiation incident on the back aperture and an angle of emergence of a beam of electromagnetic radiation emitted by the front aperture in reaction to the electromagnetic radiation incident on the back aperture. The value of this zooming factor may be different from unity, which implies that angles of emergence of beams from the front aperture are either tilted towards a center axis of the discrete lens or tilted away from the center axis, compared to angles of incidence of corresponding beams on the back aperture. For instance, the size of the back aperture may be smaller than the size of the front aperture. In this case, beams emitted by the front aperture would have a reduced field of view compared to a range of angles of incidence of electromagnetic radiation incident on the back aperture. Alternatively, the size of the back aperture may be larger than the size of the front aperture. In this case, beams emitted by the front aperture would have an increased field of view compared to a range of angles of incidence of electromagnetic radiation incident on the back aperture.

Numerical Results

Here and in the followings, the three-foci and four-foci lenses optimized by adopting the design procedure proposed above are denoted "~five-foci lenses," considering the fact that they guarantee quasi five perfect foci. Two-dimensional lenses with flat profile can be used to scan beams up to approximately 45°-50° (e.g., for the case M=1 and the focal lengths comparable with the lens diameter). Examples with scanning angle α equal to 60° are also presented here, even though they may exhibit poor illumination efficiency, i.e., the orientation of the last feeds in the focal arc as compared to the orientation of the back lens elements may be significantly skew.

Figure 24A:
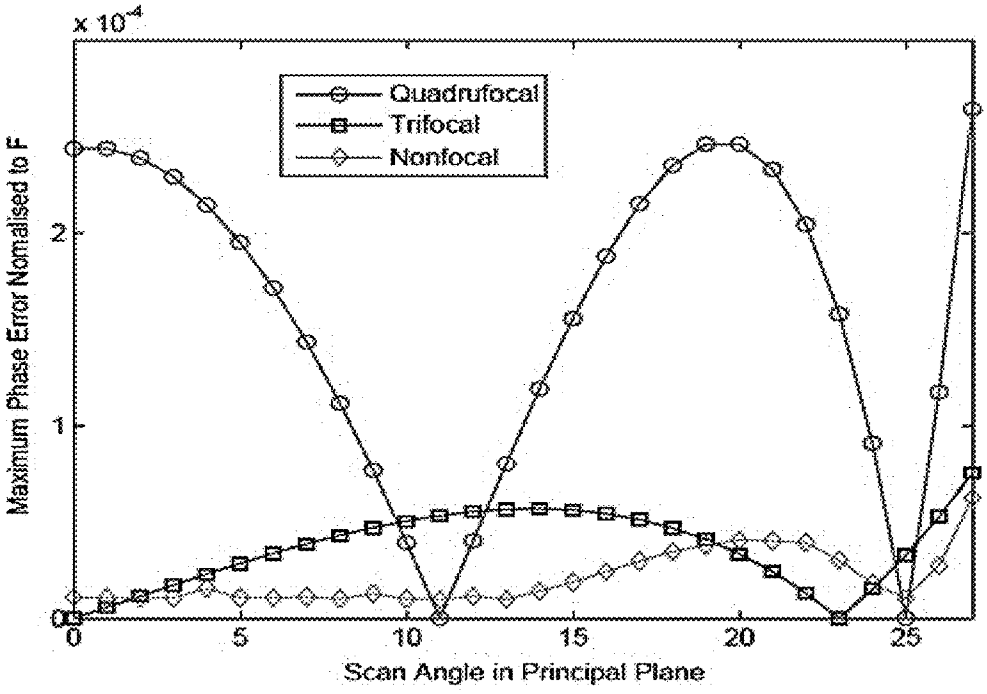
FIG. 24A and FIG. 24B are diagrams schematically illustrating examples of maximum phase error for different lens configurations.
Figure 24B:
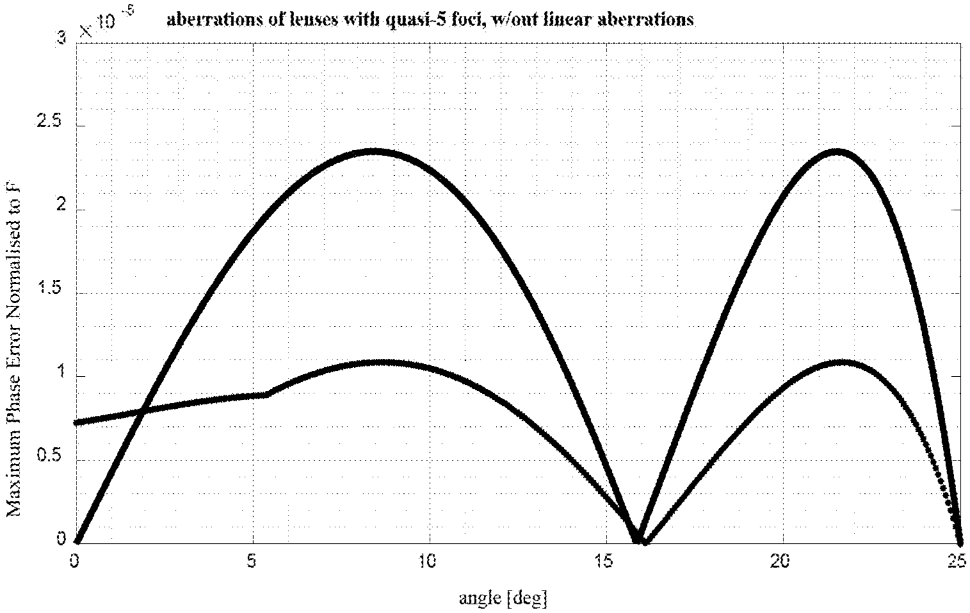
Figure 25A:
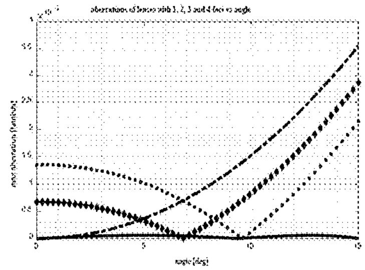
FIG. 25A to FIG. 25L are diagrams showing examples of numerical results for a group of two-dimensional discrete lenses according to the present disclosure for different maximum scanning angles.
Figure 25B:
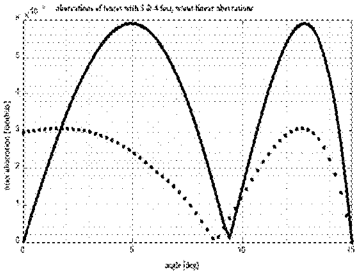
Figure 25C:
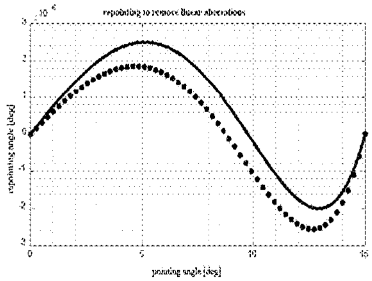
Figure 25D:
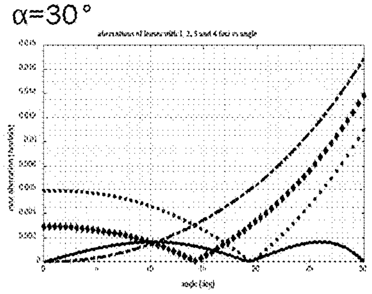
Figure 25E:
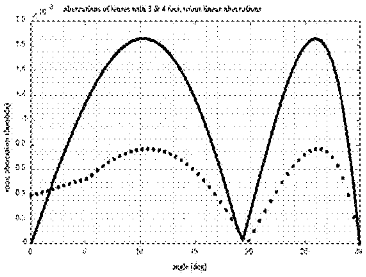
Figure 25F:
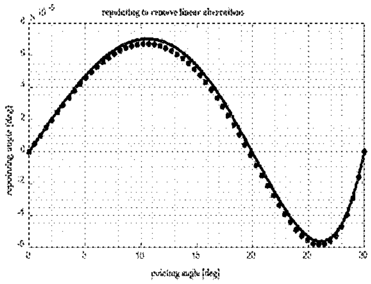
Figure 25G:
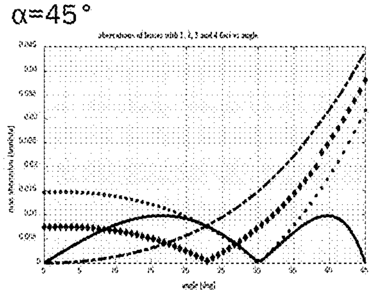
Figure 25H:
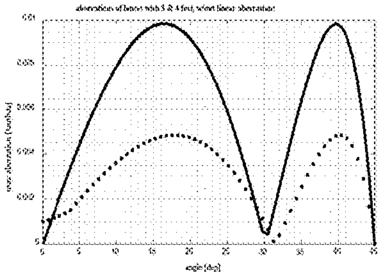
Figure 25I:
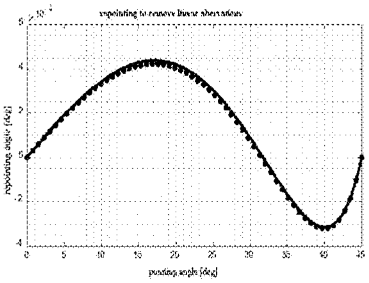
Figure 25J:
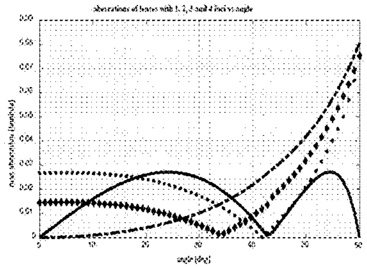
Figure 25K:
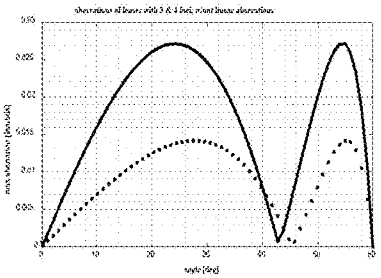
Figure 25L:
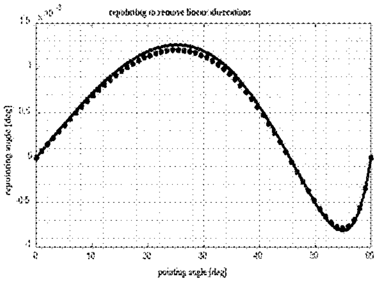

FIG. 24 shows a comparison between the results obtained in J. Dong, A. I. Zaghloul, R. Rotman, "Phase-error performance of multi-focal and non-focal two-dimensional Rotman lens designs IET Microwaves, Antennas δ Propagation, 2010, Vol. 4, Iss. 12, pp. 2097-2103, which relates to the implementation of a numerical procedure to optimize a bootlace lens without focal points, i.e., an afocal lens, and the present results. Specifically, FIG. 24A shows the normalized maximum phase error for the non-focal lens and a multiple-focal Rotman lens with F/D=1 proposed in Dong et al. (horizontal axis: scan angle in principal plane; vertical axis: maximum phase error normalized to F), and FIG. 24B shows the normalized maximum phase error for the ~five-foci lenses according to the present disclosure with F/D=1 before and after the removal of linear aberrations (horizontal axis: angle in degrees; vertical axis: maximum phase error normalized to F). It is important to note that there is exactly a factor of 10 difference, i.e., one order of magnitude, between the scale used for the aberrations in the FIG. 24A and FIG. 24B. In FIG. 24B, the continuous line represent the aberrations derived when applying the procedure presented above. A further reduction of the aberrations can be obtained, subsequent to the optimization of the lens parameters and the focal arc, by removing the linear aberrations. Removing the linear aberrations simply implies a minor tuning of the local orientation of the generic feed in the focal arc as compared to the direction of the correspondingly generated plane wave, possibly considering the magnification factor M. The dotted line in FIG. 24B represents the aberrations after the removal of the linear aberrations. As can be seen from these figures, this minor correction guarantees a further significant decrease in the maximum aberrations (typically, about 50% of improvement in the maximum value of the aberrations can be obtained). When comparing the aberrations achieved with a four-foci lens in these figures, an improvement factor of about 10 is visible on the result of the new four-foci lens. Both the lenses are characterized by α=25°. However, in FIG. 24A the internal angle seems to be exactly half of the external angle, while for the new ~five-foci lens the internal angle has a value of about 16° in line with Eq. (156). An improvement factor of about four between the dotted line (i.e., aberrations of the ~five-foci lens after removing the linear aberrations) and the three-foci lens presented in Dong et al. is visible. An improvement factor of about two between the continuous line (i.e., aberrations of the ~five-foci lens with linear aberrations) and the three-foci lens presented in Dong et al. can be observed as well as an improvement factor of about three between the dotted line (i.e., aberrations of the ~five-foci lens after removing linear aberrations) and the afocal lens results. With the proposed procedure, choosing the angle α=25°, the maximum aberrations normalised to F (without linear aberrations compensation) assume the value $2.3866 \cdot 10^{-5}$. Based on the comparison of FIG. 24, it may be concluded that the three- and four-foci lenses considered in Dong et al. have not been properly optimized and that the earlier conclusion that the afocal lens outperforms the performances achievable with multifocal lenses does not appear correct. In fact, the ~five-foci constrained lenses proposed in the present disclosure permit to significantly improve the previously published results.

Examples of the performance of the ~five-foci lenses are summarized in Table 2 appended to this disclosure, showing the maximum aberrations as a function of the F/D ratio (i.e., the ratio between the focal distance and the lens diameter) for different values of the maximum scanning angle α. Notably, F coincides with the focal distance used in the definition of both the three- and four-foci lenses and D represents the diameter of the front lens aperture. The magnification factor (or zooming factor M) is assumed to be unitary, i.e., M=1, and the lens diameter is assumed to be 30λ. In the first column the value of the external angle α of the lens defining the maximum scanning angle is given. In the $2^{nd}$ to $6^{th}$ columns, the maximum aberrations are reported for values of F/D ranging from 0.75 to 2. The diameter of the front lens is considered fixed. Therefore, when changing F/D, only the focal distances are scaled and the aberrations change according to this heuristic expression $$\text{Abberation}\left(\frac{F}{D}=\Omega\right)=\text{Aberration}\left(\frac{F}{D}=1\right)\cdot\Omega^2\cdot Q \qquad \text{Eq. (165)}$$

where Q ranges from about 1.05 (for large angles, e.g., a close to 60°), to 1.25 (for small angles, e.g., a close to 0°). The empirically derived Q factors are reported in the $7^{th}$ to $10^{th}$ columns. As can be seen from Eq. (165), aberrations change as a quadratic function of the F/D=Ω parameter. After evaluating the effects of the F/D ratio, two additional variations can be considered, viz., the evolutions of the optical aberrations as a function of the lens dimensions, and as a function of the magnification or zooming factor M.

Maintaining F/D=1 and M=1, when F (or likewise, D) is changed, the aberrations change linearly. For example, for F=D=60λ all the aberrations double as compared to the case of F=D=30λ given in Table 2.

By fixing the diameter of the front lens, when changing the zooming or magnification factor M, the aberrations change linearly as well: for M=0.5 the maximum aberrations are half the value obtained for the case of M=1, and for M=2 the maximum aberrations are twice the value obtained for the case of M=1.

Considering the three properties just described together with the numerical results for the case of F/D=1, the aberrations for discrete two-dimensional lenses with any dimension, magnification, and F/D parameter can be estimated.

It is of interest to also compare the ~five-foci lens with two other lens configurations defined above, viz., the discrete lens with a single focal point (discrete lens architecture ( ) defined above) and the discrete lens with two symmetric focal points (discrete lens architecture P defined above). Despite to the differences between these two lenses with one and two foci, the corresponding focal arcs, optimized with the optimization procedure according to the present disclosure, tend to be extremely similar. For this reason, an average between the two lenses has been considered as well. An example of achievable performances is presented in Table 3 appended to this disclosure with F/D=1, M=1, and D=30λ. Only the maximum aberration value is reported.

The same example (F/D=1, M=1, and D=30λ) is considered for FIG. 25. Therein, FIGS. 25A, 25D, 25G, and 25J show the optical aberrations as function of the scanning angle for values of the maximum scanning angels of α=15°, 30°, 45°, and 60°, respectively, for different lens types, viz., lenses with one focus (dash-dotted lines), lenses with two foci (small squares), lenses with ~five foci (continuous lines), and lenses obtained as the average between one and two foci (large rhomboidal dots) (horizontal axis: angle in degrees; vertical axis: max aberration in units of 1). FIGS. 25B, 25E, 25H, and 25K show the respective corresponding aberrations for the ~five-foci lens with (continuous lines) and without (dotted lines) the contributions from linear aberrations (horizontal axis: angle in degrees; vertical axis: max aberration in units of λ). Finally, FIGS. 25C, 25F, 25I, and 25L show the respective corresponding angular repointing that would be needed to remove the linear aberrations for the four-foci lens (continuous lines) and the three-foci lens (dotted lines) (horizontal axis: pointing angle in degrees; vertical axis: repointing angle in degrees). It is interesting to note that a local repointing of the feed by an angle that is a small fraction of 1° (e.g., as small as $10^{-3}$ to $10^{-6}$ degrees) can have such a significant impact on the evolution of aberrations. The lens with a single focus (dash-dotted line in FIGS. 25A, 25D, 25G, and 25J) permits to control the aberrations only close to the axial direction, as expected, and aberrations increase with the scanning angle. The lens with two foci (small square points in FIGS. 25A, 25D, 25G, and 25J) permits to perfectly cancel the aberrations in two symmetric angles, but its aberrations are worsening when approaching the lens axis. The configuration average between the one- and two-foci lenses (large rhomboidal points in FIGS. 25A, 25D, 25G, and 25J) presents intermediate results. The ~five-foci lens (continuous lines in FIGS. 25A, 25D, 25G, and 25J) performs much better for low values of a. For a approaching 60°, the performances are comparable up to a certain angle. However, for scanning angles approaching α, the ~five-foci lens remains significantly better because it is able to perfectly cancel the aberrations in the maximum scanning angle α.

Table 4 appended to this disclosure reports the maximum aberrations normalized to the focal distance for ~five-foci discrete lenses having F/D=1 and M=1.

Figure 26:
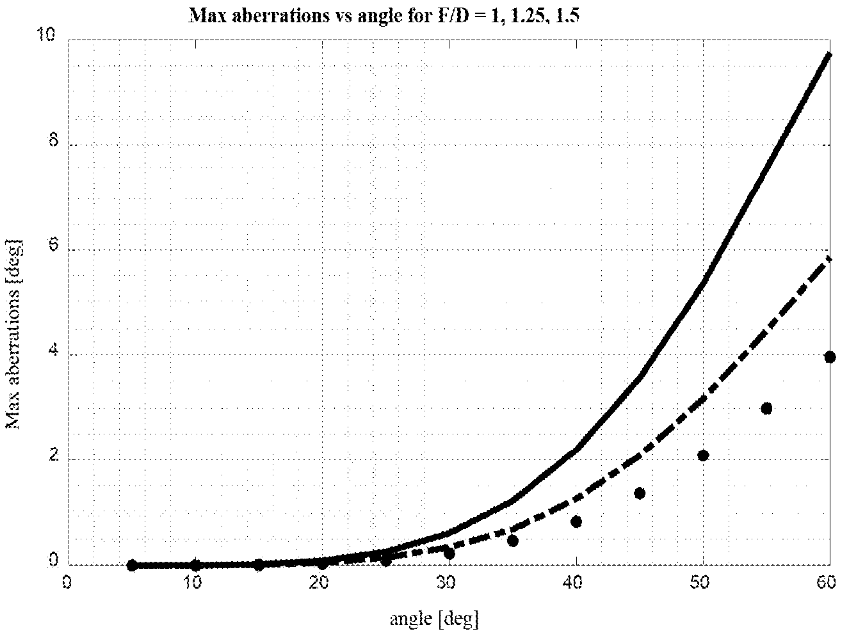
FIG. 26 is diagram schematically illustrating the maximum aberrations as function of the maximum scanning angle for different values of the ratio F/D.
Figure 27A:
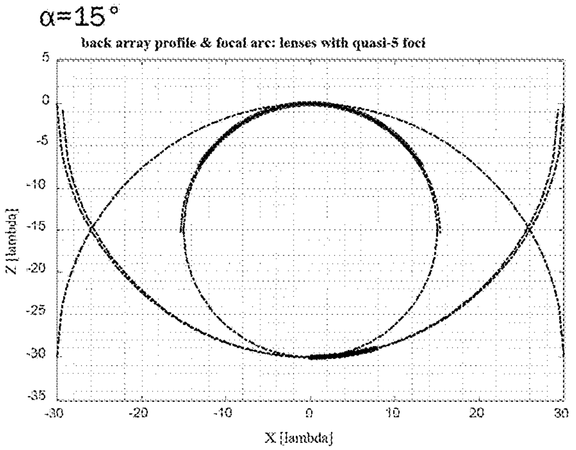
FIG. 27A to FIG. 27D are diagrams schematically illustrating shapes of the optimized focal arc compared to shapes of the back lens profile for different maximum scanning angles.
Figure 27B:
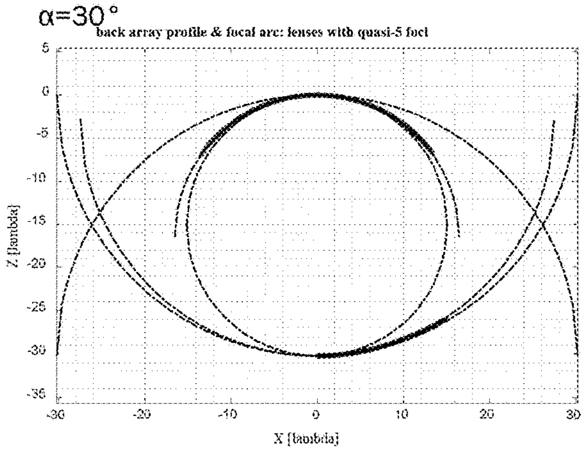
Figure 27C:
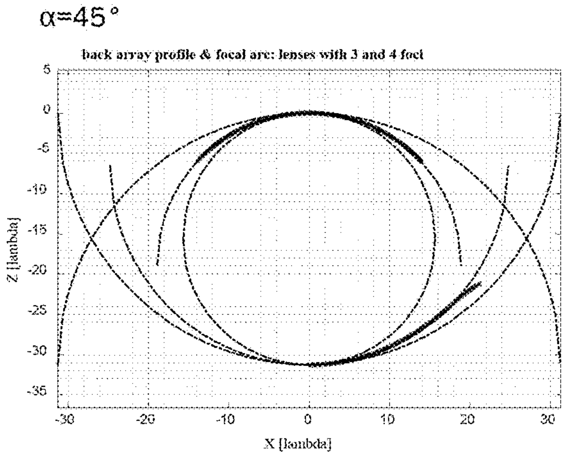
Figure 27D:
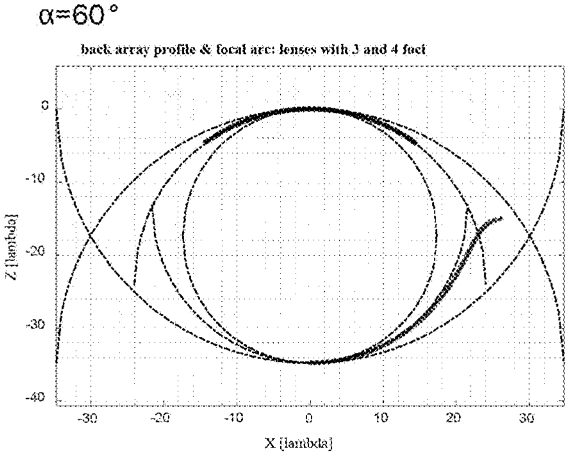

In FIG. 26 the maximum aberrations, expressed in degrees, are shown as a function of the maximum scanning angle, expressed in degrees, for three different values of the F/D parameter are plotted (horizontal axis: angle in degrees; vertical axis: max aberrations in degrees). The continuous line refers to the case of F/D=1, the dashed line refers to the case of F/D=1.25, and the dotted line refers to the case of F/D=1.5. The diameter of the front lens is again fixed to D=30λ. Removing the linear aberrations, a further improvement can be obtained in the maximum value of the aberrations.

Table 5 appended to this disclosure shows aberrations and lateral focal distances f for discrete lenses having h/D=10/3 (i.e., h=10λ, D=3λ) and M=1.

Another example with a lens having a diameter D=10λ is reported in Table 6 appended to this disclosure, giving aberrations and Q factors for lenses with M=1. The reported Q factors, numerically estimated, are well in line with the values predicted with the heuristic equation of Eq. (165) so that respective results presented in this disclosure can be considered validated also for electrically small lenses.

Also a visual comparison to the R-2R lens may be of interest. FIG. 27 shows the shapes of the back array profile and the focal arc (assuming the front array profile to be flat)

for different two-dimensional discrete lenses and for different values of the maximum scanning angle α (horizontal axis: X in units of λ; vertical axis: Z in units of λ). Specifically, solid black lines in FIG. 27A indicate the back array profile and the focal arc of a quasi-five-foci lens for α=15°, solid black lines in FIG. 27B indicate the back array profile and the focal arc of a quasi-five-foci lens for α=30°, solid black lines in FIG. 27C indicate the back array profile and the focal arc of lenses with three and four foci for α=45°, and solid black lines in FIG. 27D indicate the back array profile and the focal arc of lenses with three and four foci for α=60°. The thin dotted lines represented portions of circles characterized by a radius equal to G or G/2 and centered in the points (0,0), (0,–G/2), and (0,–G). As is well known, the R-2R lens has a back profile coinciding with a circle of radius G/2 and centered in the point (0,–G/2). The focal arc is defined in the opposite part of the same circle. The front profile for the R-2R lens coincides with a circle of radius centered in the point (0,–G).

Three asymptotic properties can be observed from FIG. 27. First of all, the back profile of the ~five-foci lenses optimized with the procedure proposed in the present disclosure can be approximated by a portion of a circle centered in the point $$\left(0, -\frac{F}{2}\frac{1}{\cos(\alpha\delta\_\text{average})}\right)$$

and with a radius equal to $$r_{back\_asympt} = \frac{F}{2}\frac{1}{\cos(\alpha\delta\_\text{average})} \quad \text{Eq. (166)}$$

where αδ_average defines the average between the two angles α and δ defining the external and internal foci, respectively, of the ~five-foci lens. Second, the focal curve of the ~five-foci lenses can be approximated by a portion of a circle centered in the point (0,–(G–G cos αδ_average)) and with a radius equal to $$r_{focal\_asympt} = G\cos(\alpha\delta\_\text{average}) \quad \text{Eq. (167)}$$

The two asymptotic circles are drawn with thin lines in FIG. 27 to allow comparison to the thick lines associated with the back profile and the derived focal curve. The first asymptotic property on the back array shape is particularly accurate. A third property concerns the shape of the focal arc and back profile for small values of the angle α. As becomes evident from FIG. 27, for small angles α the shape of the focal arc is well approximated by a portion of the circle with radius G and centered in the (0,0) point. The shape of the back lenses, always for small values of the angle α, is well approximated by a circle of radius G/2 (in line also with Eq. (167) considering cos(δ)~1). So for small angles α the ~five-foci lens can be considered a 2R-R-0 lens because the focal arc is similar to a circle of radius 2R=G and the back lens is similar to a circle of radius R=G/2, while the front profile is flat.

Summary of Properties of Two-Dimensional Discrete Lenses with Flat Front Profile Two-dimensional bootlace constrained lenses with flat profile with one, two, three, or four perfect foci can be defined analytically in explicit form (see section Definition of Lens Architectures). The R-2R lens exhibits an infinite number of foci, but its front profile is circular.

A five-foci bootlace lens with a flat profile cannot be defined analytically adopting the geometrical optics ray tracing laws. It is possible to numerically enforce five focal points when considering a single point on the lens. However, when considering a different point and enforcing again the same five foci, the numerically derived lens parameters change. This means that a bootlace lens satisfying the perfect five-foci conditions for all the points on the lens does not exist.

A two-dimensional discrete lens with ~five foci (quasi-five-foci) featuring minimum optical aberrations has been presented. The same identical configuration can be obtained from two completely different lens architectures as starting point: a three-foci lens with an axial focus and two symmetrical foci, and a four-foci lens with two pairs of symmetrical foci. The ~five-foci lens exhibits Chebyshev-like equi-ripple minimized aberrations.

The analytical relation between the two focal distances of the three-foci lens has been derived heuristically in Eq. (147). The angle defining the additional pair of foci in the three-foci lens coinciding with the position of the internal pair of foci in the four-foci lens has been estimated heuristically in Eq. (156). An analytical expression for the focal distance associated with a generic incidence angle has been found by solving a third degree equation. Simplifications for this expression have been proposed. A second more accurate but indirect way to derive an optimum value for G as a function of F comprises first optimizing a four-foci lens to find an improved value for δ as compared to the one defined in Eq. (156). At this point X, W, and Z are known together with F and 8. Now solving the geometrical optics equation that guarantees an additional focus in the lens axis in the point (–G,0) for G will yield $$G = -(X^2 + Z^2 - W^2)/(2W + 2Z) \quad \text{Eq. (168)}$$

Since G should assume a single real value, G can be estimated with Eq. (168) by adopting, for X, W and Z, their value in a single point possibly in the vicinity of the edge of the lens, where a single axial focus generates maximum aberrations. The values for G that is found in this way will provide very low aberrations.

It is important to note that the same equations remain valid also in case of magnification (i.e., zooming) different from unity.

It has been verified that the aberrations get worse when slightly modifying the ~five-foci configuration identified in the present disclosure, i.e., one of the two equiripple lobes will get higher while the other one will get lower, so that the overall maximum aberration associated with the lens worsens. Accordingly, the solution derived in the present disclosure is locally optimal.

Some advantages for the four-foci lens compared to the three-foci lens have been identified:

1) the optimized values for the four focal distances are already known a priori (being identical) while for the three-foci lens the relation between F and G is not known in advance
2) the profile of the four-foci lens is a simple parabolic profile (although this property is only true when representing Z as a function of X1, but not when representing Z as a function of X), while for the three-foci lens the profile is given in terms of a more complex analytical equation involving radicals 3) starting from the four-foci lens equations, the presence of a $5^{th}$ quasi-focus (satisfying the geometrical optics equipath condition in two symmetrical points of the lens in addition to the central point) can be easily added The evolutions of the maximum aberrations as a function of the lens dimensions, the F/D ratio, and the magnification factor M have been estimated. The results contained in the tables and figures permit to characterize the dimensions and maximum aberrations of an arbitrary two-dimensional discrete lens with a flat profile.

It has been found that removing the linear aberrations permits to approximately half the maximum aberrations independently of the opening angle $\alpha$ of the lens.

The back profile of the proposed ~five-foci lenses can be approximated extremely well by a portion of a circle of radius $$r_{back\_asympt} = \frac{F}{2}\frac{1}{\cos(\alpha\delta\_\text{average})} \quad \text{Eq. (169)}$$

where $\alpha\delta$_average defines the average between the two angles $\alpha$ and $\delta$ defining the external and internal foci in the lens, respectively.

The focal curve of the ~five-foci lenses can be approximated by a portion of a circle centered in the point (0,−(G−G cos($\alpha\delta$ _average)) and with radius equal to $$r_{focal\_asympt} = G\cos(\alpha\delta\_\text{average}) \quad \text{Eq. (170)}$$

For small values of the angle $\alpha$, the shape of the back lenses is well approximated by a circle of radius G/2, and the focal arc is well approximated by a portion of the circle with radius G and centered in the (0,0) point. So for small angles $\alpha$, the ~five-foci lens can be considered a 2R-R-0 lens because the focal arc is similar to a circle of radius 2R=G, the back lens is similar to a circle of radius R=G/2, while the front profile is flat.

It has been discovered that after optimally defining the focal distances, enforcing opposite values for the aberrations on the two extreme points of the lens represents the fundamental condition to analytically derive a locally optimal focal distance for arbitrary angles. This property applies to lenses like the three- and four-foci lenses. For other type of lenses, like the lens with a single focal point, a general procedure with steps A through D for deriving the focal arc is proposed above.

Finally, it is important to observe that the analytical solutions for multifocal constrained lenses tend to be extremely ill-conditioned from a mathematical point of view (i.e., the higher the number of foci, the more ill-defined). This means that small variations in one of the variable defining the lens can lead to significant changes in the optical aberrations. As a consequence, optimization based on brute force numerical techniques may be slow and ineffective.

The design procedure takes into account only the phase response and the associated optical aberrations. The behavior of the amplitude of the field, considering all possible losses and mismatches, may be important as well and should be considered in a second part of the design adopting full wave electromagnetic solvers as done for example in K. Tekkouk, M. Ettorre, R. Sauleau, "SIW Rotman Lens Antenna With Ridged Delay Lines and Reduced Footprint," IEEE Transactions on Microwave Theory and Techniques, vol 66, no. 6, 2018.

It is finally noted that the present disclosure not only relates to the proposed methods for designing two- or three-dimensional discrete lenses, but also to computing devices adapted for carrying out these methods, having appropriate control blocks or control units. Moreover, the present disclosure likewise relates to the resulting designs as well as discrete lenses manufactured based on these designs.

INTERPRETATION

It is understood that any control units or blocks described throughout the disclosure may be implemented by a digital controller, microcontroller (microprocessor), computer, computer processor or respective computer processors, or the like.

It should further be noted that the description and drawings merely illustrate the principles of the proposed apparatus (beamforming networks, discrete lenses, antennas, etc.) and methods. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed methods and apparatus. Furthermore, all statements herein providing principles, aspects, and embodiments of the disclosure, as well as specific examples thereof, are intended to encompass equivalents thereof.

TABLE 1

| Lenses with phase shifters W proportional to the distance of homologous points | | | | |
|---|---|---|---|---|
| $W = [(X - X1)^2 + (Y - Y1)^2 + (Z - Z1)^2]^{1/2} \cdot n$ | M = 1 | Z1 = 0 | by enforcing Eqs. (147) and (151) | R and Z can be derived numerically |
| $W = (Z - Z1) \cdot n$ (guarantees having Z1 > Z) | M = 1 | R = R 1 | by enforcing Eqs. (147) and (151) | $Z = (F^2 - R1^2)/(2nF) -$ $(F^2 + R1^2 sa^2 - 2R1^2)^{\frac{1}{2}}/(2n) + ((n + ca)(nR1^2 - nF^2 - F^2 ca +$ |

TABLE 1-continued

| Lenses with phase shifters W proportional to the distance of homologous points | | | | | |
|---|---|---|---|---|---|
| $W = [(X - X1)^2 + (Y - Y1)^2 + (Z - Z1)^2]^{1/2} \cdot n$ | M = 1 | Z1 = 0 | by enforcing Eqs. (147) and (151) | R and Z can be derived numerically | |
| | | | | $R1^2ca + nF(F^2 + R1^2sa^2 - 2R1^2)^{\frac{1}{2}} + Fca(F^2 + R1^2sa^2 - 2R1^2)^{\frac{1}{2}} + n^2F\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^2ca}\right)^{\frac{1}{2}} - 2n^2F^2ca + Fca^2\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^3}\right)^{\frac{1}{2}} + 2nFca\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^3}\right)^{\frac{1}{2}} - 2nF^2ca^2))/(2n(n^2F + Fca^2 + 2nFca))$ <br> $Z1 = (nR1^2 - nF^2 - F^2ca + R1^2ca + nF(F^2 + R1^2sa^2 - 2R1^2)^{\frac{1}{2}} + Fca(F^2 + R1^2sa^2 - 2R1^2)^{\frac{1}{2}} + n^2F\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^3}\right)^{\frac{1}{2}} - 2n^2F^2ca + Fca^2\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^3}\right)^{\frac{1}{2}} + 2nFca\left(\frac{(4n^2F^2ca^2 + 4n^2R1^2sa^2 - 4n^2R1^2)(ca^2 + 2nca + n^2)}{ca^4 + 6n^2ca^2 + 4n^3ca + n^4 + 4nca^3}\right)^{\frac{1}{2}} - 2nF^2ca^2)/(2n^2F + 2Fca^2 + 4nFca)$ | |
| $W = [(X - X1)^2 + (Y - Y1)^2 + (Z - Z1)^2]^{1/2}$ | Z1 = 0 | R = R1M | by enforcing a single focus on the axis in the point (−H, 0, 0) | $Z = (4H^2M^2 - 8H^2M + 4H^2 - 4R1^2M^2 + 4R1^2M - R1^2)/(4H(2M - 1))$ | Note: M can be <, =, > 1 |
| $W = \mathrm{sqrt}((R - R1)^2 + (Z - Z1)^2)\ n$ | Z1 = 0 | R = R1M M = 1 | by enforcing a single focus on the axis in the point (−H, 0, 0) | $Z = \left(H - \left(\frac{nH^2 + nR1^2 + H^2 - R1^2}{n + 1}\right)^{\frac{1}{2}}\right) \Big/ (n - 1)$ | Note 1: n can be > 1 or < 1 but not = 1. In practice n < 1 gives acceptable results. Note 2 if M ≠ 1, the $4^{th}$ degree equation to be solved has acceptable solutions for n < 1 |

Note for n approaching the value 1, the $4^{th}$ solution approaches the 3rd solution. The $3^{rd}$ solution permits to consider the zooming in and out (i.e., M > 1 or M < 1), but not varying n (refractive index). The 4th solution does not allow to consider zooming M different from 1, but permits including an equivalent refractive index n which has to be > 1 or < 1, but not = 1.

TABLE 2

Maximum aberrations [in λ] vs maximum scanning angle for M = 1, D = 30λ

| | F/D = 0.75 | F/D = 1 | F/D = 1.25 | F/D = 1.5 | F/D = 2 | Q for F/D = 0.75 | Q for F/D = 1.25 | Q for F/D = 1.5 | Q for F/D = 2 |
|---|---|---|---|---|---|---|---|---|---|
| α = 60° | | 0.0271 | 0.0163 | 0.011 | | | 1.064 | 1.095 | |
| α = 55° | | 0.021 | 0.0124 | 0.0083 | | | 1.083 | 1.124 | |
| α = 50° | | 0.0149 | 0.0088 | 0.0058 | | | 1.083 | 1.142 | |
| α = 45° | | 0.0098 | 0.0058 | 0.0038 | 0.0021 | | 1.083 | 1.157 | 1.166 |
| α = 40° | | 0.0061 | 0.0035 | 0.0023 | | | 1.115 | 1.178 | |
| α = 35° | | 0.0034 | 0.0019 | 0.0013 | | | 1.145 | 1.162 | |
| α = 30° | | 0.0017 | 9.584e–04 | 6.33e–04 | 3.4e–04 | | 1.135 | 1.192 | 1.232 |
| α = 25° | | 7.16e–04 | 4.126e–04 | 2.67e–04 | | | 1.11 | 1.188 | |
| α = 20° | 5.647e–04 | 2.46e–04 | 1.422e–04 | 9.14e–05 | | 1.29 | 1.107 | 1.195 | |
| α = 15° | 1.401e–04 | 5.94e–05 | 3.521e–05 | 2.24e–05 | 1.23e–05 | 1.32 | 1.08 | 1.177 | 1.207 |
| α = 10° | 1.902e–05 | 8.39e–06 | 4.805e–06 | 3.04e–06 | | 1.274 | 1.118 | 1.224 | |
| α = 5° | 6.058e–07 | 2.73e–07 | 1.547e–07 | 9.81e–08 | | 1.247 | 1.129 | 1.235 | |

TABLE 3

Comparison between maximum aberrations of lenses with 1, 2, and ~5 foci. F/D = 1, M = 1; D = 30λ

| | ~5 foci | 1 focus | 2 foci | average 1 vs. 2 foci |
|---|---|---|---|---|
| a = 60° | 0.0271 | 0.0825 | 0.0693 | 0.0765 |
| a = 45° | 0.0098 | 0.0426 | 0.0311 | 0.0366 |
| a = 30° | 0.0017 | 0.0167 | 0.0108 | 0.0138 |
| a = 15° | 5.945e–5 | 0.0036 | 0.0023 | 0.0029 |

TABLE 4

Maximum aberrations normalized to the focal distance for F/D = 1, M = 1, and ~5 foci

| | |
|---|---|
| 60° | 9.033e–04 |
| 55° | 0.0007 |
| 50° | 4.96e–04 |
| 45° | 3.26e–04 |
| 40° | 2.03e–04 |
| 35° | 1.13e–04 |
| 30° | 5.66e–05 |
| 25° | 2.38e–05 |
| 20° | 0.82e–05 |
| 15° | 1.98e–06 |
| 10° | 2.79e–07 |
| 5° | 9.10e–09 |

TABLE 5

Aberrations and lateral focal distance f for discrete lenses having h/D = 10/3 and M = 1

| h =10 λ<br>D = 3 λ | $F = G\left(\alpha - \frac{\alpha^3}{6} - \frac{\alpha^5}{12}\right) / \sin(\alpha)$ | Max aberration [λ]<br>D = G · 0.3 |
|---|---|---|
| α = 75° | F = G · 0.65533 | max aberration = 7.4e–4 |
| α = 60° | F = G · 0.87359 | max aberration = 2.8e–4 |
| α = 45° | F = G · 0.96196 | max aberration < 7.85e–5 |
| α = 30° | F = G · 0.99269 | max aberration < 1.2e–5 |
| α = 15° | F = G · 0.99955 | max aberration = 4.1e–7 |
| α = 5° | F = G · 0.99999 | max aberration = 8e–9 |

TABLE 6

Aberrations and Q factors for lenses with M = 1 and D = 10λ

| | Aberrations for ~5 foci, F/D = 1 | Aberrations for ~5 foci, F/D = 1.5 | Aberrations for ~5 foci, F/D = 2 | Factor Q (see (8)), for F/D = 1.5 | Factor Q (see (8)), for F/D = 2 |
|---|---|---|---|---|---|
| a = 60° | 0.009 | 0.0037 | 0.0021 | 1.081 | 1.071 |
| a = 45° | 0.0033 | 0.0013 | 0.000694 | 1.128 | 1.188 |
| a = 30° | 5.5e–0-4 | 2.1e–0-4 | 1.15e–0-4 | 1.144 | 1.199 |
| a = 15° | 1.9e–0-5 | 7.7e–0-6 | 4.1e–0-6 | 1.191 | 1.202 |

The various embodiments described above can be combined to provide further embodiments. All of the patents, applications and publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A beamforming network, comprising:

a three-dimensional discrete lens with a front aperture and a back aperture, each comprising a plurality of discrete elements; and a propagation part in which electromagnetic radiation can propagate and illuminate the back aperture of the discrete lens;

wherein:

each discrete element of the back aperture is homologous to a respective discrete element of the front aperture;

the discrete lens further comprises a plurality of transmission lines connecting respective pairs of homologous discrete elements of the front aperture and the back aperture;

a ratio of a size of the back aperture and a size of the front aperture defines a zooming factor that determines a relationship between an angle of incidence of electromagnetic radiation incident on the back aperture and an angle of emergence of a beam of electromagnetic radiation emitted by the front aperture in reaction to the electromagnetic radiation incident on the back aperture;

the value of the zooming factor is different from unity, so that angles of emergence of beams from the front aperture are either tilted towards a center axis of the discrete lens or tilted away from the center axis, compared to angles of incidence of corresponding beams on the back aperture;

the front aperture is shaped as a flat surface;

the back aperture is shaped as a portion of a sphere;

the lengths of the plurality of transmission lines are chosen to be equal;

for each pair of homologous discrete elements, a ratio between radial excursions of the respective homologous discrete elements of the back aperture and the front aperture in the pair from the center axis of the discrete lens is equal to the zooming factor; and the discrete lens has one focal point located in the propagation part on a center of the sphere.

2. The beamforming network according to claim 1, wherein:

the size of the back aperture is smaller than the size of the front aperture, so that beams emitted by the front aperture have a reduced field of view compared to a range of angles of incidence of electromagnetic radiation incident on the back aperture; or the size of the back aperture is larger than the size of the front aperture, so that beams emitted by the front aperture have an increased field of view compared to a range of angles of incidence of electromagnetic radiation incident on the back aperture.

3. A beamforming network, comprising:

a three-dimensional discrete lens with a front aperture and a back aperture, each comprising a plurality of discrete elements; and a propagation part in which electromagnetic radiation can propagate and illuminate the back aperture of the discrete lens;

wherein:

each discrete element of the back aperture is homologous to a respective discrete element of the front aperture;

the discrete lens further comprises a plurality of transmission lines connecting between respective pairs of homologous discrete elements of the front aperture and the back aperture;

the front aperture is shaped as a flat surface;

the back aperture is shaped as a portion of a sphere;

the lengths of the plurality of transmission lines are chosen to be equal;

for each pair of homologous discrete elements, a ratio between the radial excursions of the respective homologous discrete elements of the back aperture and the front aperture in the pair from a center axis of the discrete lens is equal to a ratio of a size of the back aperture and a size of the front aperture; and the discrete lens has one focal point located in the propagation part on a center of the sphere.

* * * * *